TELEPHONE SYSTEM REQUIRING DIFFERENT TYPES OF PULSES

Filed Dec. 29, 1949 33 Sheets-Sheet 1

INVENTORS B. McKIM
W. B. STRICKLER
BY C. Mattice
ATTORNEY

TELEPHONE SYSTEM REQUIRING DIFFERENT TYPES OF PULSES

Filed Dec. 29, 1949 33 Sheets-Sheet 2

INVENTORS B. McKIM
W. B. STRICKLER
BY C. Mattice
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 3

INVENTORS: B. McKIM
W. B. STRICKLER

BY C. Mattice

ATTORNEY

INVENTORS B. McKIM
W. B. STRICKLER
BY C. Mattice
ATTORNEY

TELEPHONE SYSTEM REQUIRING DIFFERENT TYPES OF PULSES

INVENTORS B. McKIM
W. B. STRICKLER
BY C. Mattice
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 6

INVENTORS B. McKIM
W. B. STRICKLER
BY C. Mathias
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 7

INVENTORS B. McKIM
W. B. STRICKLER
BY C. Mattice
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 8

INVENTORS B. McKIM
W. B. STRICKLER
BY C. Mattice
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 9

INVENTORS B. McKIM
W. B. STRICKLER
BY C. Mathie
ATTORNEY

INVENTORS: B McKIM
W. B. STRICKLER
BY C. Mattice
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 11

INVENTORS B. MC KIM
W. B. STRICKLER

BY C. Mattice

ATTORNEY

INVENTORS B. McKIM
W. B. STRICKLER
BY C. Mattice
ATTORNEY

TELEPHONE SYSTEM REQUIRING DIFFERENT TYPES OF PULSES

Filed Dec. 29, 1949 33 Sheets-Sheet 13

INVENTORS B. McKIM
W. B. STRICKLER
BY C. Mattise
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 14

INVENTORS B. McKIM
W. B. STRICKLER
BY C. Mattice
ATTORNEY

TELEPHONE SYSTEM REQUIRING DIFFERENT TYPES OF PULSES

Filed Dec. 29, 1949 33 Sheets-Sheet 15

INVENTORS: B. McKIM
W. B. STRICKLER
BY C. Mathie
ATTORNEY

Aug. 14, 1951    B. McKIM ET AL    2,564,441

TELEPHONE SYSTEM REQUIRING DIFFERENT TYPES OF PULSES

Filed Dec. 29, 1949    33 Sheets-Sheet 16

INVENTORS B. MC KIM
W. B. STRICKLER
BY C. Mattice
ATTORNEY

INVENTORS B. McKIM
W. B. STRICKLER
BY C. Mattice
ATTORNEY

TELEPHONE SYSTEM REQUIRING DIFFERENT TYPES OF PULSES

Filed Dec. 29, 1949 33 Sheets-Sheet 18

INVENTORS B. McKIM
W. B. STRICKLER
BY C. Mattice
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 19

INVENTORS B. McKIM
W. B. STRICKLER
BY C. Mathie
ATTORNEY

TELEPHONE SYSTEM REQUIRING DIFFERENT TYPES OF PULSES

Filed Dec. 29, 1949 33 Sheets-Sheet 20

INVENTORS B. McKIM
W. B. STRICKLER

BY C. Mattice

ATTORNEY

INVENTORS: B. McKIM
W. B. STRICKLER
BY C. Mattice
ATTORNEY

INVENTORS B. McKIM
W. B. STRICKLER
BY C. Mattice
ATTORNEY

INVENTORS B. McKIM
W. B. STRICKLER
BY C. Mattice
ATTORNEY

TELEPHONE SYSTEM REQUIRING DIFFERENT TYPES OF PULSES

Filed Dec. 29, 1949 33 Sheets-Sheet 24

INVENTORS B. McKIM
W. B. STRICKLER
BY C. Mattice
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 25

INVENTORS B. McKIM
W. B. STRICKLER
BY C. Mattice
ATTORNEY

TELEPHONE SYSTEM REQUIRING DIFFERENT TYPES OF PULSES

Filed Dec. 29, 1949 33 Sheets-Sheet 26

INVENTORS B. McKIM
W. B. STRICKLER
BY C. Mattice
ATTORNEY

TELEPHONE SYSTEM REQUIRING DIFFERENT TYPES OF PULSES

INVENTORS B. MC KIM
W. B. STRICKLER
BY C. Mattice
ATTORNEY

INVENTORS B. McKIM
W. B. STRICKLER
BY C. Mattice
ATTORNEY

TELEPHONE SYSTEM REQUIRING DIFFERENT TYPES OF PULSES

Filed Dec. 29, 1949 33 Sheets-Sheet 29

INVENTORS B. McKIM
W. B. STRICKLER
BY C. Mattice
ATTORNEY

Aug. 14, 1951 B. McKIM ET AL 2,564,441

TELEPHONE SYSTEM REQUIRING DIFFERENT TYPES OF PULSES

Filed Dec. 29, 1949 33 Sheets-Sheet 30

INVENTORS B. McKIM
W. B. STRICKLER
BY C. Mattice
ATTORNEY

TELEPHONE SYSTEM REQUIRING DIFFERENT TYPES OF PULSES

Filed Dec. 29, 1949 33 Sheets-Sheet 31

INVENTORS B. McKIM
W. B. STRICKLER
BY C. Mattice
ATTORNEY

INVENTORS: B. McKIM
W. B. STRICKLER
BY C. Mattice
ATTORNEY

Aug. 14, 1951 B. McKIM ET AL 2,564,441
TELEPHONE SYSTEM REQUIRING DIFFERENT TYPES OF PULSES
Filed Dec. 29, 1949 33 Sheets-Sheet 33

INVENTORS B. McKIM
W. B. STRICKLER
BY C. Mattice
ATTORNEY

Patented Aug. 14, 1951 2,564,441

UNITED STATES PATENT OFFICE 2,564,441

TELEPHONE SYSTEM REQUIRING DIFFERENT TYPES OF PULSES

Burton McKim and Walter B. Strickler, East Orange, N. J., assignors to Bell Telephone Laboratories, Incorporated, New York, N. Y., a corporation of New York Application December 29, 1949, Serial No. 135,721

9 Claims. (Cl. 179—18)

This invention relates to telephone systems and has for its object increased economy in the automatic establishment of toll connections.

Toll offices which serve congested areas may be called upon to extend calls either to other toll offices or to a variety of local offices in which connections are set up either manually or automatically, the automatic local offices also differing in the type of equipment employed.

Some toll offices are now being equipped with automatic cross-bar switching equipment, wherein incoming trunks are connected with control devices known as incoming senders. These incoming senders receive the telephone designations and call in and instruct switch-operating markers as to the designation of the called office. The marker selects an idle trunk outgoing to that office, connects the incoming trunk with the outgoing trunk, instructs the sender how it should proceed to complete the connection, and informs the sender when the connection between the incoming trunk and outgoing trunk has been completed.

Each outgoing trunk terminates in a trunk circuit at the distant office, which may appear in a plug or jack at an operator's position in a manual office, may be connected directly to a selector switch in some step-by-step offices or may require to be connected to a control device in other step-by-step offices, cross-bar offices or panel offices.

While the cross-bar switches and the trunk circuit of the toll office release quickly so that the outgoing trunk is immediately available for reselection, the equipment at the distant end may require an appreciable time to return to a condition to receive another call. To prevent reselecting a trunk circuit at the toll office before the distant equipment is completely released, it has been the custom heretofore to provide timing circuits within the outgoing toll trunk circuits to measure off a time interval between the time when the trunk is released and the time when it is made available for reselection.

In accordance with the present invention the necessity for these timing circuits is avoided in many cases by providing means in the control circuit for measuring a time interval following a signal from the marker before establishing a circuit for initiating the operation of the equipment at the distant office.

More specifically, when the marker receives the designation of the wanted office it determines from that designation not only the information which it uses in selecting the proper idle trunk but also the nature of the office and the nature of the trunks connecting with that office and transmits to the sender an indication of the type of pulsing and the class of time required. When it has selected an idle trunk it also indicates that fact to the sender to start the timing in the sender and proceeds to operate the switches to connect the incoming trunk with the selected outgoing trunk.

The sender, which includes means for generating different types of pulses and means for measuring a plurality of time intervals, responds to the indications received from the marker to select the indicated pulse generator and time interval, starts to measure the selected time interval when the marker indicates that it has selected a trunk and at the end of the interval, if the marker has released, sets up the pulsing circuit for transmitting the designation to the distant office.

These and other features of the invention will be more apparent from a consideration of the following description, read in connection with the drawing, in which.

Figure 1:
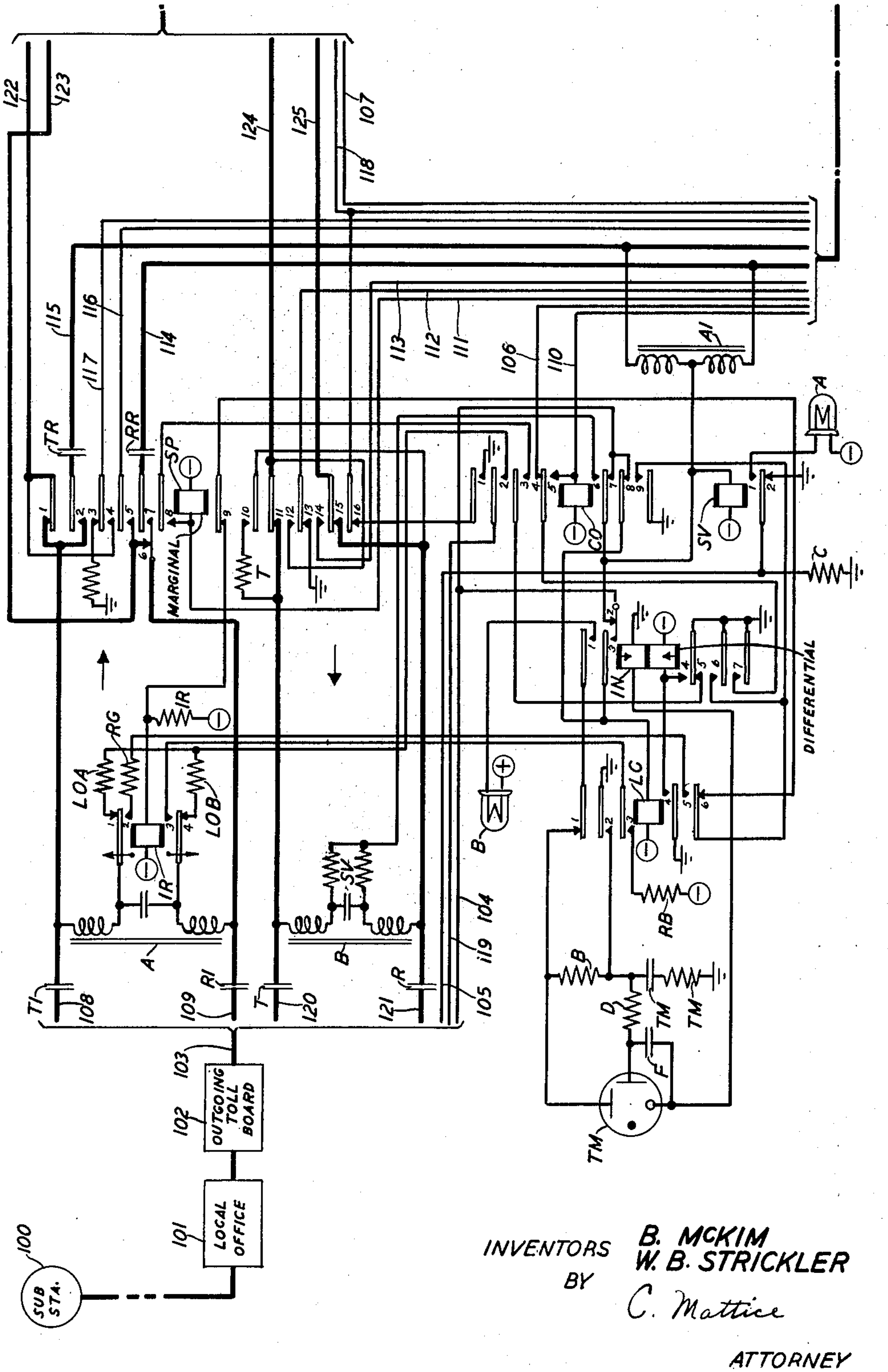
Fig. 1 shows an incoming trunk circuit.
Figure 2:
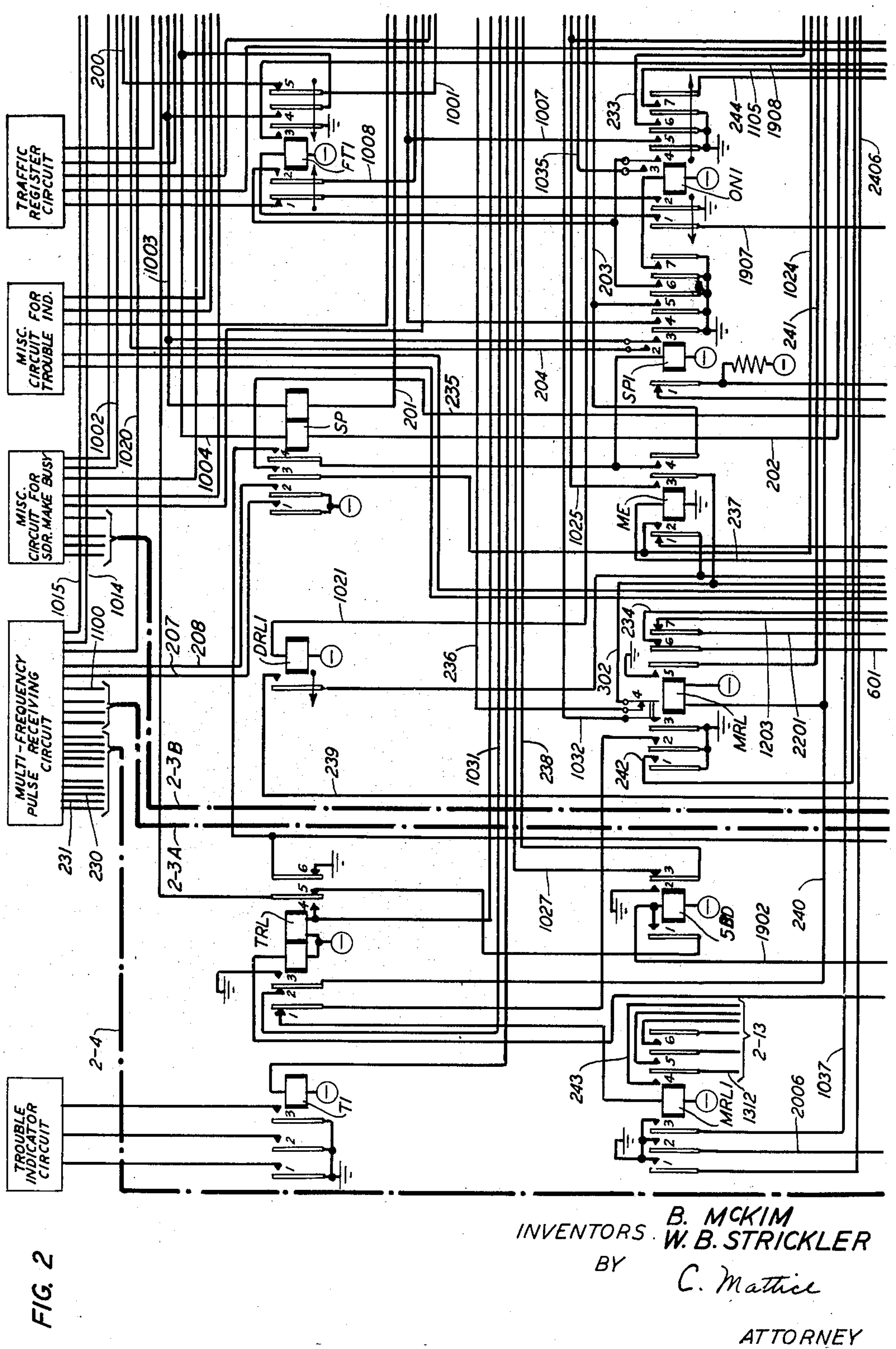
Figs. 2 to 8, 10 to 14, 19 to 22 and 24 to 31 show in detail an incoming sender.
Figure 3:
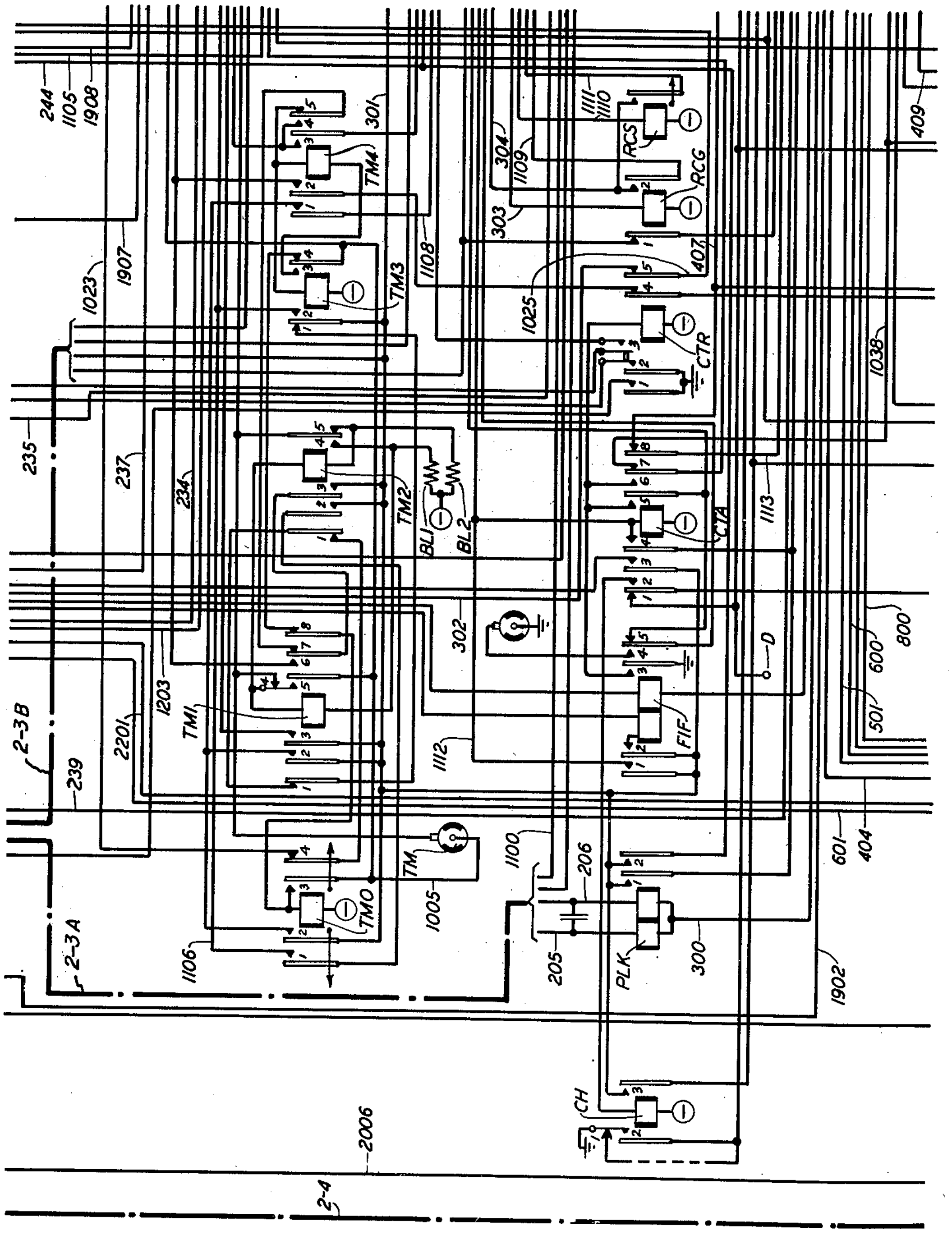
Figure 4:
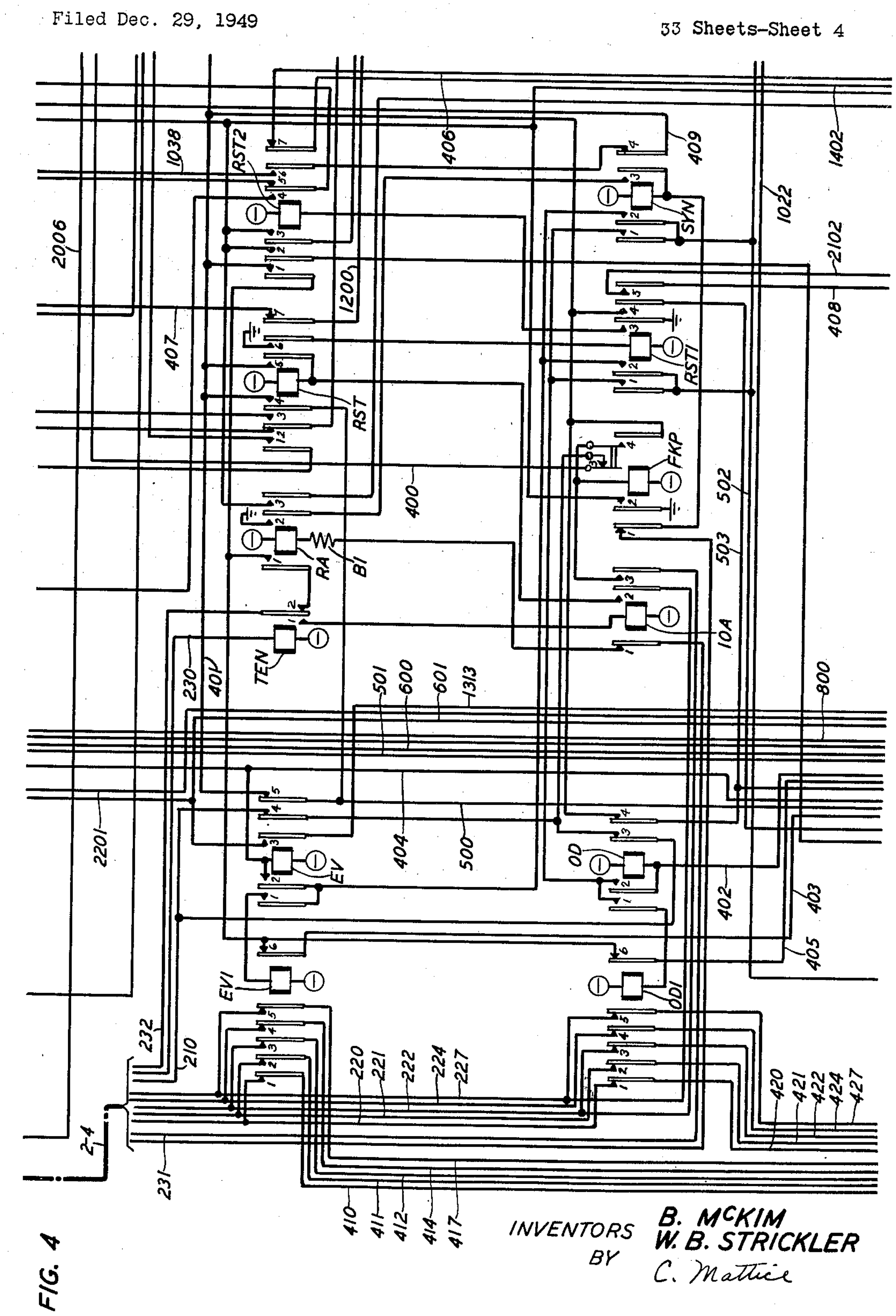

In general, functional designations have been employed but to facilitate the location of the equipment and to distinguish between the few circuit elements having the same designation, the functional designations have been followed by the number of the sheet of the drawing enclosed in parentheses.

GENERAL DESCRIPTION

Figure 32:
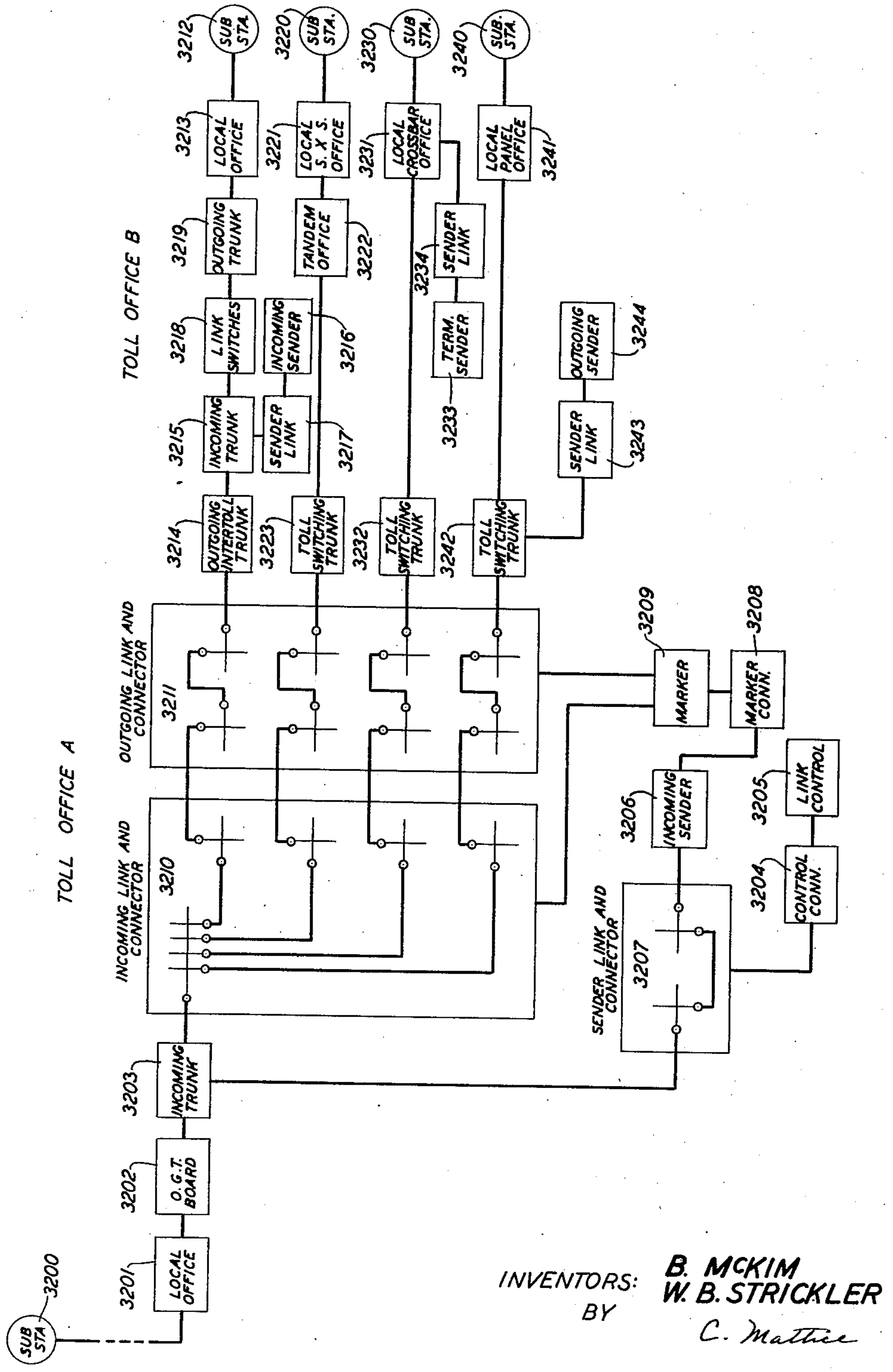
Fig. 32 is a diagrammatic showing of the system as a whole.
Figure 33:
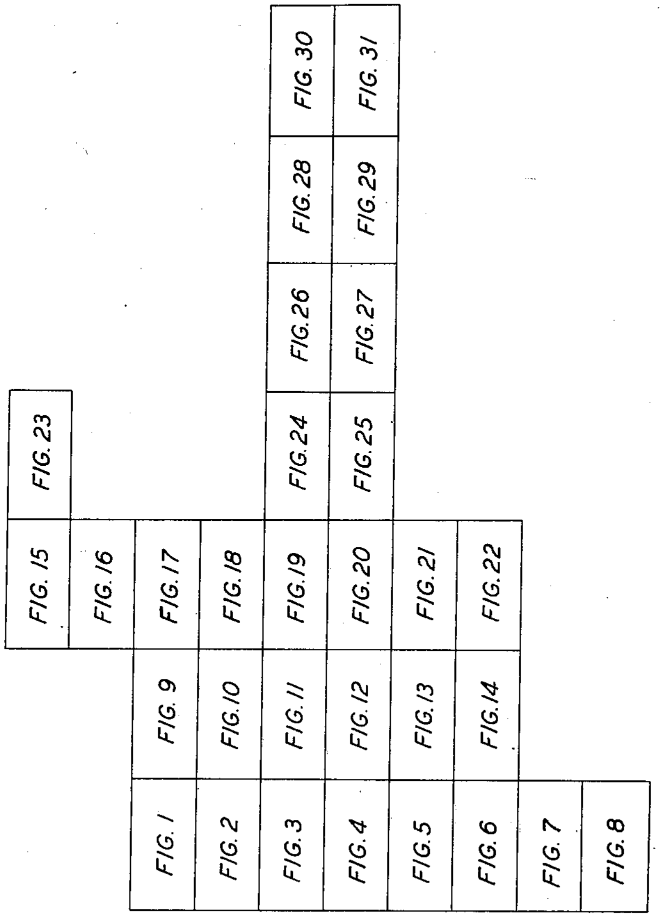
Fig. 33 shows the manner in which Figs. 1 to 31 should be arranged.

Referring first to Fig. 32, toll calls initiated by a calling subscriber at a substation such as substation 3200 are extended to the outgoing toll board 3202 by means of the equipment at the local office 3201. The operator at the toll board will seize a trunk outgoing to the toll office A, which appears at the toll office A in an incoming trunk circuit 3203. Seizure of trunk circuit 3203 starts the operation of a control connector 3204 which selects an idle link control circuit 3205. The link control circuit 3205 tests for an idle incoming sender such as sender 3206 and a path through the sender link and connector 3207 and operates the sender link switches to connect the selected sender with the incoming trunk circuit 3203.

When this connection is established, the operator at the toll board 3203 is signalled and she proceeds to pulse the designation of the wanted subscriber into sender 3206. Having received the office code, the sender 3206 operates the marker connector 3208 to connect with an idle marker 3209 and transfers the office code to the marker. The marker translates this code into a routing, selects an idle trunk according to the routing and operates the incoming link and connector 3210 and the outgoing link and connector 3211 to connect the selected trunk with the incoming trunk 3203.

The marker also transmits to the sender an indication of the class of the call, the type of trunk, the number of digits to be outpulsed, and, if necessary, provides a supplementary digit.

Four typical terminations for such a toll call have been shown. The first is to a substation 3212 associated with a local office which is reached from toll office A through a second toll office B. For such a termination the marker will select an outgoing intertoll trunk 3214 and will tell the sender that multifrequency pulses are required and that the trunk is of the guarded type. The outgoing trunk 3214 will be connected to an incoming trung 3215 at toll office B, where seizure of trunk 3215 will cause the connection of that trunk with an incoming sender 3216 by means of a sender link 3217, after which the designation will be transmitted from sender 3206 to sender 3216 and the call extended over link switches 3218 and an outgoing trunk 3219 to the local office 3213 for completion to substation 3212.

If the call is directed to substation 3220 located at a step-by-step office 3221 which is reached through a tandem step-by-step office 3222, the marker will select a toll switching trunk 3223 and will instruct the sender that loop dial pulses are required, that the trunk is of the unguarded type and that a delay may be expected between digits due to the nature of office 3221. It will also transmit to the sender a digit to be used for operating the selector at the tandem office 3222. The sender then transmits loop dial pulses to operate the selectors of offices 3222 and 3221 to complete the connection with substation 3220.

If the call is directed to substation 3230 associated with a local crossbar office 3231, the marker will select a toll switching trunk 3232 and tell the sender that multifrequency pulses are required and that the trunk is of the unguarded type. When a connection is established with the local crossbar office, a terminating of sender 3233 is connected with the interoffice trunk by means of a sender link 3234 and sender 3206 will transmit the designation by means of multifrequency pulses to the terminating sender 3233, the latter sender controlling the completion of the call to substation 3230.

If the call is directed to a substation 3240 associated with a panel type office 3241, since sender 3206 is not equipped to handle the revertive pulses required by a panel type office, the marker will select a toll switching trunk 3242 of a type arranged to be connected with an outgoing sender, and will tell the sender 3206 that it must send out direct current code pulses and that the trunk is guarded. The selection of trunk 3242 will cause the operation of sender link 3243 to connect the trunk with an outgoing sender 3244 which is equipped to handle revertive pulses. The sender 3206 transmits the designation to outgoing sender 3244 by means of direct current code pulses, after which sender 3244 controls the selectors at office 3241 by means of revertive pulses to complete the connection with substation 3240.

DETAILED DESCRIPTION

*Intertoll call*

Assume first that the subscriber at substation 100 which is connected with local office 101 wishes to talk to the subscriber at substation 2300 which is connected with local office 2301 reached from office 101 through two toll offices. Substation 100 will be connected in the usual manner with the outgoing toll board 102 where the operator seizes a trunk 103 outgoing to the first toll office where the trunk appears in the trunk circuit of Fig. 1.

Seizure of the trunk circuit of Fig. 1 is indicated to that circuit by the connection of ground to conductor 104, thereby completing a circuit over contact 2 of relay IN(1) or over contact 7 of relay CO(1) to battery through the winding of relay SV(1). A parallel circuit is also completed from ground on conductor 104, contact 8 of relay CO(1) to battery through the winding of relay LC(1). Relays SV(1) and LC(1) operate in these circuits.

Relays SV(1) at its contact 2 disconnects ground from conductor 105 and at its contact 1 extends conductor 105 to battery through resistance lamp A(1), as a signal to the calling office that the toll office is not ready to receive pulses.

Relay LC(1), at its contact 2 connects ground to condenser TM(1) to insure that it is completely discharged, and at contact 4 closes a circuit from ground to battery through the lower winding of relay IN(1) operating the latter relay.

Relay IN(1) locks over its contact 4 to ground independent of relay LC(1), at its contact 3 connects the winding of relay LC(1) to conductor 104, independent of relay CO(1) and connects ground over its contact 7 and contact 4 of relay CO(1) to start conductor 106 leading to the sender link.

Figure 10:
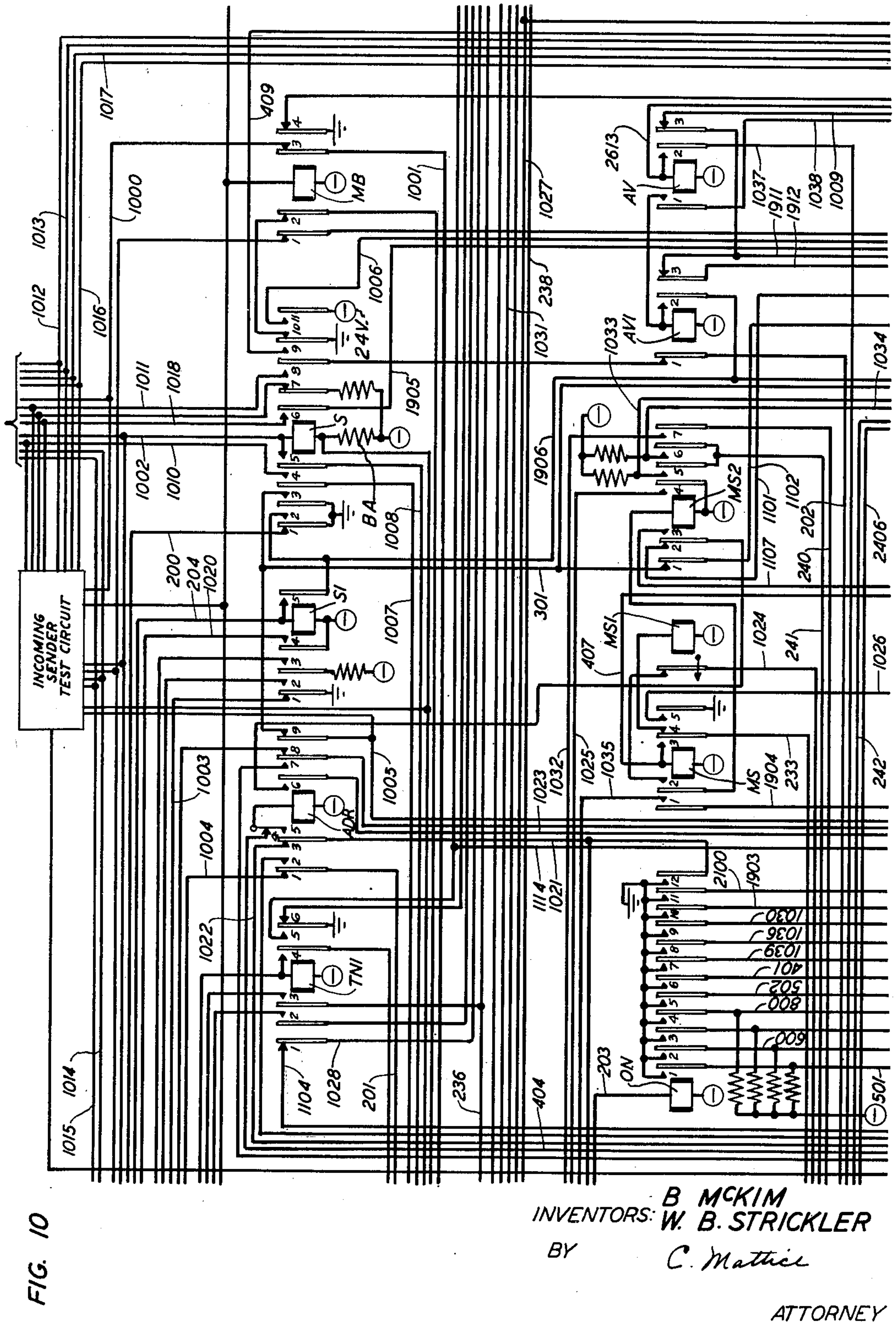
Figure 11:
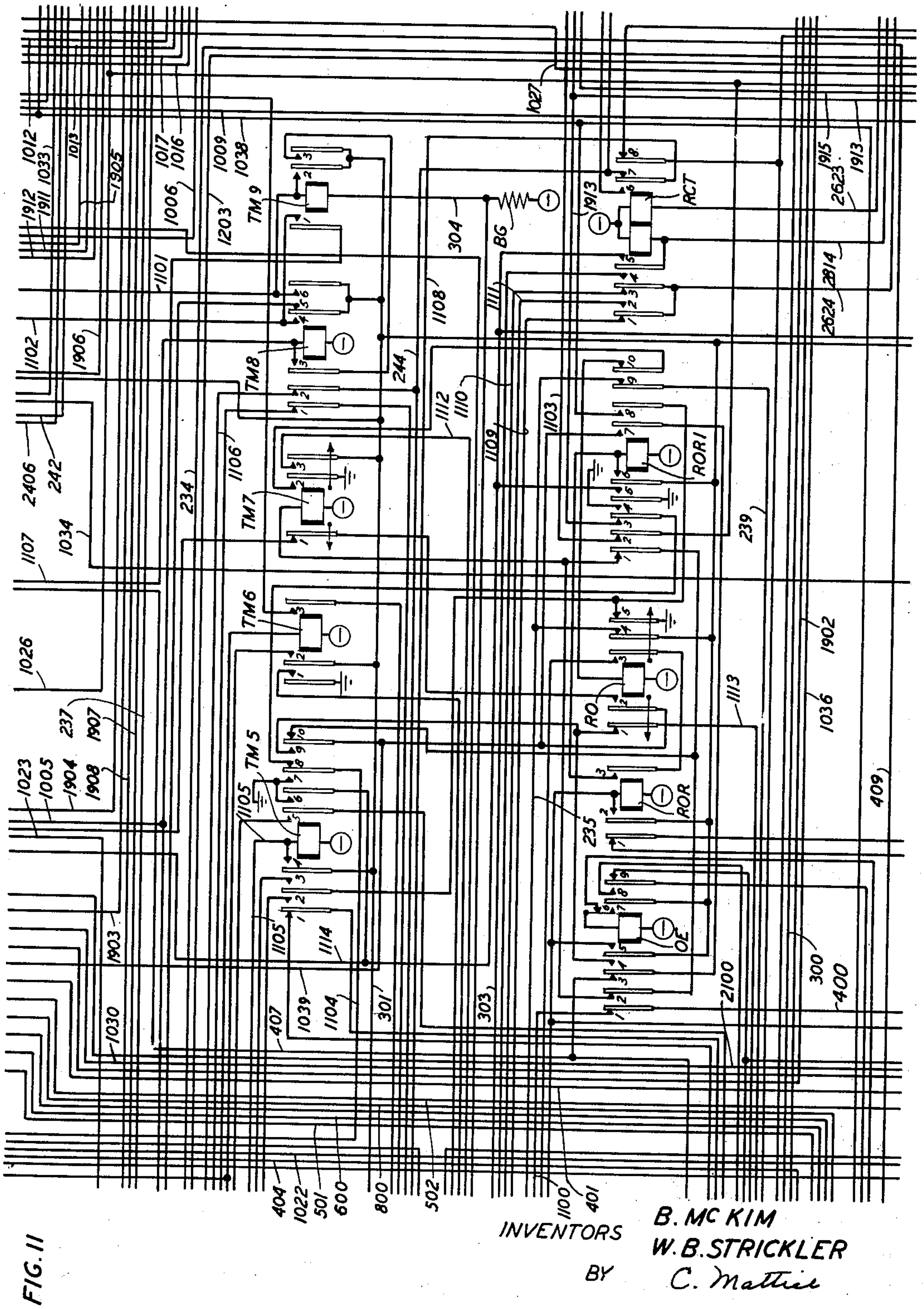
Figure 12:
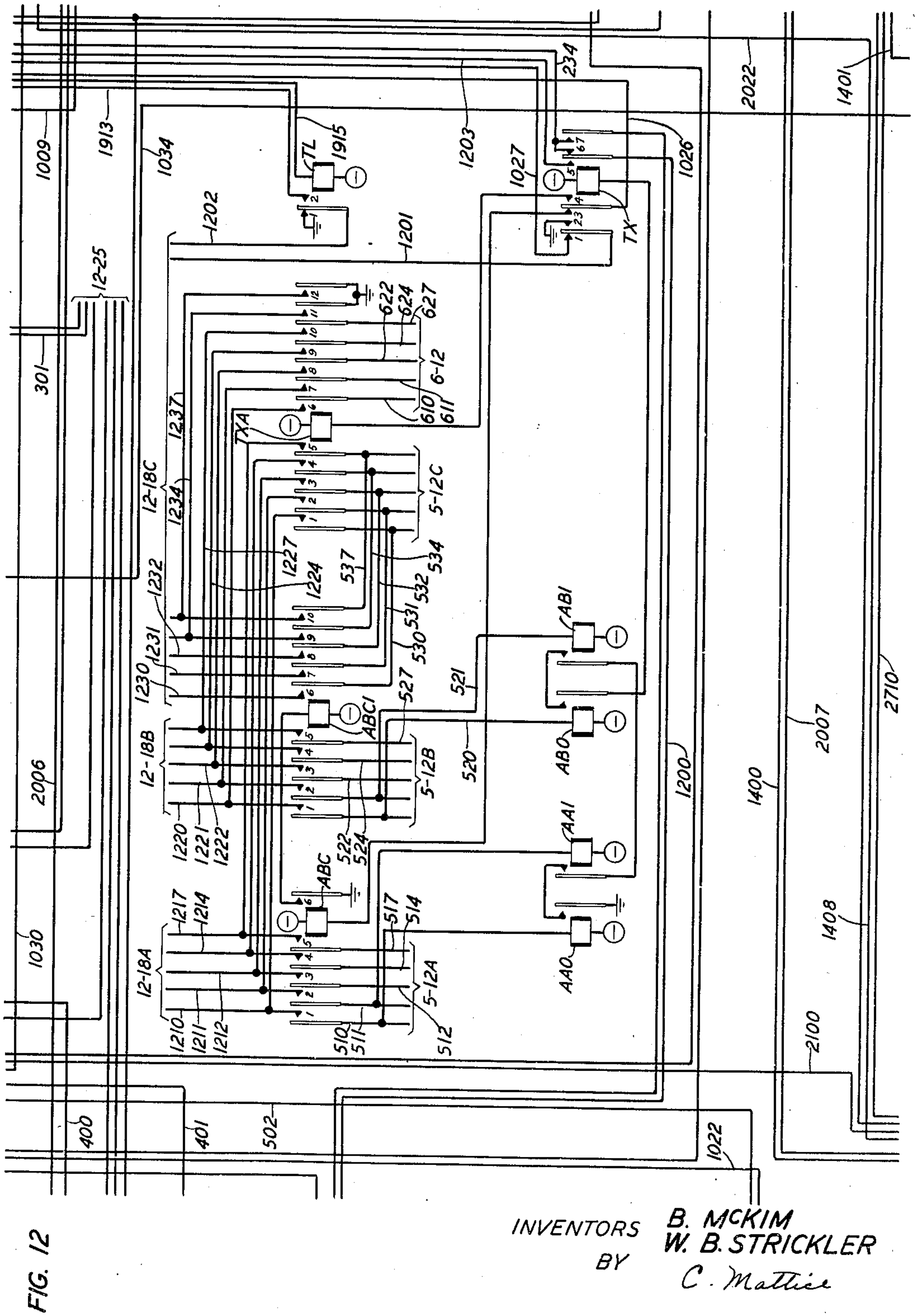

The sender link comprises a plurality of crossbar switches, operated under the control of a link control circuit, which selects an idle sender for use and is associated with the sender link by a control connector. These circuits are shown diagrammatically since they are essentially the same as shown in Patent No. 2,293,191, granted to A. J. Busch et al., August 18, 1942. For convenience in identifying the circuits connecting the sender with the trunk circuit the conductors leaving the trunk circuit and entering the sender will be given corresponding numerical designations in the hundred series of the respective figures, namely Fig. 1 and Fig. 10.

The link control circuit recognizes that the sender shown is idle by the presence of ground on conductor 1000, to which ground is connected over contact 3 of relay MB(10), conductor 1001, contact 5 of relay FT1(2), conductor 200, and contact 1 of relay S(10). After seizing a sender, for example the sender shown, the link control circuit then operates the select and hold magnets of the sender link switches to connect the trunk of Fig. 1 with the sender, thereby connecting conductors 110 to 118 with conductors 1010 to 1018 respectively. When the link hold magnets have operated, ground is connected to conductor 1002, through the winding of relay S(10) and resistance BA(10) to battery, operating relay S(10).

As soon as the link switches and relay S(1)

have operated, a circuit is also closed from ground over contact 1 of relay S1(10) conductor 1003, right winding of relay SP(2), conductor 201, contact 1 of relay ADR(10), conductor 1004, left winding of relay SP(2), conductor 202, contact 1 of relay AVI(19), contact 8 of relay S(10) conductor 1011 through the sender link to conductor 111, through the winding of relay SP(1) to battery. Relay SP(2) operates, but its resistance is so high that relay SP(1) in the trunk circuit cannot operate. Relay SP(2) closes a circuit from ground at contact 6 of relay TRL(2), contact 4 of relay SP(2), to battery through the winding of relay SP1(2). Relay SP1(2) operates and, at its contact 3, connects ground to conductor 1003 to provide a holding circuit for relay SP(2) independent of relay S1(10).

In addition, relay SP1(2), at its contact 7, closes an obvious circuit for relay ON1(2). At its contact 5, relay SP1(2) connects ground to conductor 203, completing a circuit through the winding of relay ON(10) to battery. At its contact 2, relay SP1(2) connects ground over conductor 204 to battery through the winding of relay S1(10). Relays ON1(2), ON(10) and S(10) operate in the above-traced circuits. With relay ON1(2) operated a circuit is closed from battery through the winding of relay C0(1), conductor 110, through the sender link to conductor 1010, contact 4 of relay S(10), conductor 1007, contact 5 of relay ON1(2) to ground. Relay C0(1) closes a locking circuit for itself over its contact 5 to ground at contact 7 of relay IN(1). At its contact 4, relay C0(1) opens the start circuit for the sender link.

When relay S(10) operated as above described it also disconnected ground from conductor 1000 to mark the sender busy to the link control circuit. In addition, relay S(10) also connects ground over its contact 3, contact 9 of relay ADR(10) and conductor 1005 to interrupter TM(3) to start a timing operation which will be described hereinafter. Ground on conductor 1005 also completes a circuit over contact 4 of relay TM3(3) and contact 8 of relay TM1(3) to battery through the winding of relay TM0(3). Relay TM0(3) operates and locks over its contact 3 to ground on conductor 1005 to mark the start of the timing cycle. Further, relay S(10), at its contact 11, connects 24-volt battery to conductor 1006 to prepare a circuit for relays TS(19), TM(19) and TP(19) for receiving class information from the trunk.

The sender receives class information from the trunk over conductors 1012 and 1017 and under certain circumstances over conductor 1016. At the time the sender is connected with the trunk, conductor 1012 extends over contact 1 of relay MT(19), conductor 1900, contact 3 of relay OP1(25), conductor 2500, contact 6 of relay RT(19), through the windings of relays TP(19), TM(19) and TS(19) to 24-volt battery supplied by relay S(10) as above traced. Conductor 1017 extends over contact 2 of relay RT(19), left winding of relay LIT(19), winding of relay NV(19), right winding of relay VO(19) to battery. Conductor 1016 extends over contact 1 of relay RT(19), conductor 1902 to battery through the winding of relay 5BD(2).

The various incoming trunk circuits are wired to connect class indications to conductors 1012 and 1017 over back contacts of the relay corresponding to relay SP(1). The information received over conductor 1017 is provided by connecting contact 3 of relay SP(1) to ground through different resistances or leaving it disconnected and relates to traffic separation at the switch frames and whether the trunk requires connection to via trunks only or may be used with any type of outgoing trunk. The information received over conductor 1012 is provided by connecting contact 13 of relay SP(1) to ground through different resistances or to battery and relates to the type of marker required. Assuming that the incoming trunk of Fig. 1 is not restricted to via calls and further assuming that there is no traffic separation, contact 3 of relay SP(1) will be connected to ground through a resistance of 2400 ohms and contact 13 of relay SP(1) will be connected directly to ground. The information received over conductor 1016 is provided by ground connected to conductor 116 over a back contact of a relay like relay SP(1) and indicates that the trunk originates at a particular type of office. Since the trunk of Fig. 1 is not assumed to originate at such an office, no such contact is shown.

Prior to the operation of relay SP(1) contact 3 of relay SP(1) is connected to conductor 117 and thence to conductor 1017 and, with ground through a resistance of 2400 ohms connected thereto, causes the operation of relay NV(19). Direct ground connected to contact 13 of relay SP(1) is extended over conductor 112 to conductor 1012, causing the operation of relays TS(19) and TM(19).

Relay NV(19) closes an obvious circuit for operating relay NV1(19) which locks over its contact 1 and conductor 1903 to ground at contact 11 of relay ON(10).

Relay TM(19) closes an obvious circuit for relay CM(19) which operates and locks over its contact 3, conductor 1906 to ground at contact 2 of relay S(10). Relay TS (19) closes a circuit from battery through the winding and over contact 3 of relay CTS(19), contact of relay TS(19), conductor 1904, contact 10 of relay MT(19), conductor 1905, contact 6 of relay S(10), conductor 1018 through the sender link to conductor 118, contact 16 of relay SP(1), to ground at contact 1 of relay C0(1). Relay CTS(19) operates in this circuit and locks over its contact 4 and conductor 1906 to ground at contact 2 of relay S(10). Relay CTS(19) extends its operating ground over its contact 2 to battery through the winding of relay FT(19) causing that relay to operate. Relay FT(19) closes a circuit from ground over its contact 1, conductor 1907, contact 1 of relay ON1(2) to battery through the winding of relay FT1(2), operating the latter relay. Relay FT1(2) closes a locking circuit for relay FT(19) which may be traced from battery through the winding of relay FT(19) over contact 2 of relay FT(19) through the winding of relay RT(19), conductor 1908 to ground at contact 3 of relay FT1(2). This locking ground extends back over contact 2 of relay FT(19) contact 2 of relay CTS(19) to conductor 1018 and brings about the release of the link control circuit and control connector. Relay RT(19) does not operate at this time being shunted by the operating ground for relay FT(19). In addition, relay FT1(2) closes a locking circuit for relay S(10), which may be traced from battery through resistance BA(10), winding of relay S(10), contact 5 of relay S(10), conductor 1008, contact 2 of relay FT1(2) and at contact 6 of relay SP1(2) and at contact 4 of relay ON1(2).

Relay FT1(2) also closes a shunt around the high resistance right winding of relay SP(2) so that the circuit above traced from battery through the winding of relay SP(1) to conductor 1011 now extends over contact 8 of relay S(10), contact 1 of relay AV1(10), conductor 202, low resistance left winding of relay SP(2), conductor 1004, contact 4 of relay FT1(2) conductor 1003 to ground at contact 3 of relay SP1(2). Relay SP(1) now operates, removing the class indications and connecting the trunk conductors to the sender. The removal of the class indications permits relays NV(19), TM(19) and TS(19) to release.

When relay TS(19) releases, the operating circuit of relay FT(19) is opened, permitting relay RT(19) to operate in the locking circuit of relay FT(19), previously traced. Relay RT(19) disconnects the class relays from the extended trunk conductors.

Relay CO(1) at its contact 7 disconnects relay SV(1) from conductor 104, but at this time relay SV(1) is held operated in a circuit extending from battery through its winding, in parallel through the windings of retard coil A1(1), over conductors 114 and 115, which extend through the sender link to conductors 1014 and 1015, to ground through the multifrequency pulse receiving circuit as traced below. For a complete showing of a multifrequency receiving circuit, reference may be made to U. S. Patent 2,382,893 to McKim et al., granted August 14, 1945.

With relay SP(1) operated, the upper pair of incoming conductors are extended to the sender, conductor 108 extending through condenser T1(1), contact 2 of relay SP(1), condenser TR(1), conductor 115, through the sender link to conductor 1015 through one winding of the input repeating coil of the multifrequency receiving circuit to conductor 205 through cable 2—3A to the left winding of relay PLK(3), while conductor 109 extends through condenser R1(1), contact 7 of relay SP(1), condenser RR(1), conductor 114, through the sender link to conductor 1014 through a second winding of the input repeating coil of the multifrequency receiving circuit to conductor 206 through cable 2—3A to the right winding of relay PLK(3). The two windings of relay PLK(3) are connected in parallel over conductor 300 to ground at contact 3 of relay RT(19), holding relay SV(1) operated until relay RT(19) operates.

The lower incoming conductors 120 and 121 are connected together through condenser T(1), resistance T(1), contact 10 of relay SP(1) and condenser R(1).

Both pairs of outgoing conductors are extended to the sender, conductor 122 extending over contact 4 of relay SP(1), conductor 117, through the sender link to conductor 1017, contact 6 of relay MT(19) to conductor 1909, and conductor 123 extending over contact 5 of relay SP(1), conductor 116, through the sender link to conductor 1016, contact 8 of relay MT(19) to conductor 1910. Conductors 1909 and 1910 are further extended to the particular outpulsing means as will be described hereinafter.

Conductor 124 is extended over contact 12 of relay SP(1), conductor 112, through the sender link to conductor 1012, contact 1 of relay MT(19), conductor 1900, contact 3 of relay OP1(25) to conductor 2500, and thence, following the operation of relay RT(19), over contact 5 of relay RT(19), conductor 1911, contact 3 of relay AV1(10) conductor 1009, contact 2 of relay OP(25) to the windings of relay SL(25). Conductor 125 is extended over contact 14 of relay SP(1), conductor 113, through the sender link to conductor 1013, contact 3 of relay MT(19), conductor 1901, contact 1 of relay OP1(25), conductor 2501, contact 4 of relay RT(19), conductor 1912, contact 3 of relay AV1(10) and contact 3 of relay AV(10) to conductor 1009 and thence as above traced to the winding of relay SL(25). This circuit is used for supervisory purposes after the trunk circuit has been connected to an outgoing trunk.

When relay RT(19) operates as above described, it disconnects ground from the circuit of relay SV(1), permitting that relay to release. Relay SV(1), in releasing, disconnects battery from conductor 105 and connects ground to that conductor as a start pulsing signal to the outgoing toll board.

When relay S1(10) operated it connected battery to conductor 1020 leading to the multifrequency receiving circuit to prepare that circuit for operation. When relay SP(2) operated it connected battery to conductors 207 and 208 leading to the receiving circuit to further prepare it for operation.

When a signal is received by the multifrequency receiving circuit it grounds conductor 210 as a signal present indication. Conductor 210 extends through cable 2—4, over contact 4 of relay EV(4) or contact 3 of relay OD(4), contact 3 of relay FKP(4), conductor 400, contact 1 of relay OE(11), and conductor 1100 through cable 2—3A back to the multifrequency receiving circuit to enable the channel relays in that circuit to operate.

When a code pulse of two frequencies is received, the corresponding channel relays operate and ground the corresponding two of the conductors 220, 221, 222, 224, 227 and 230. The code employed for this pulsing and the relays operated in the first register are shown in the following table:

| Digit | Frequencies | Conductors Grounded | Register Relays Operated |
|---|---|---|---|
| 0 | 1,300 | 224 | A4 |
|  | 1,500 | 227 | A7 |
| 1 | 700 | 220 | A0 |
|  | 900 | 221 | A1 |
| 2 | 700 | 220 | A0 |
|  | 1,100 | 222 | A2 |
| 3 | 900 | 221 | A1 |
|  | 1,100 | 222 | A2 |
| 4 | 700 | 220 | A0 |
|  | 1,300 | 224 | A4 |
| 5 | 900 | 221 | A1 |
|  | 1,300 | 224 | A4 |
| 6 | 1,100 | 222 | A2 |
|  | 1,300 | 224 | A4 |
| 7 | 700 | 220 | A0 |
|  | 1,500 | 227 | A7 |
| 8 | 900 | 221 | A1 |
|  | 1,500 | 227 | A7 |
| 9 | 1,100 | 222 | A2 |
|  | 1,500 | 227 | A7 |
| Key Pulse | 1,100 | 222 | ---------- |
|  | 1,700 | 230 | ---------- |
| Start | 1,500 | 227 | ---------- |
|  | 1,700 | 230 | ---------- |

When relay ON(10) operated it closed a circuit from ground over its contact 12 and conductor 1021 to battery through the winding of relay DRL1(2) and in parallel therewith over contact 3 of relay ADR(10), conductor 1022 to battery through the winding of relay AS(5). Relays DRL1(2) and AS(5) operate in these circuits.

Relay AS(5) closes two locking circuits for itself, one over its contact 6, conductor 500, contact 5 of relay EV(4), conductor 401 to ground at contact 6 of relay ON(10) and the other over its contact 7, contact 11 of relay BS(5), conductor 501, to ground at contact 1 of relay ON(10). At its contact 9, relay AS(5) closes a circuit from battery through the winding of relay OD(4), conductor 402, contact 9 of relay AS(5), conductor 502, to ground at contact 5 of relay ON(10). Relay OD(4) operates in this circuit and extends its operating ground over its contacts 1 and 2 to the winding of relay OD1(4) and battery, operating the latter relay.

With relay AS(5) operated, conductors 220, 221, 222, 224 and 227, to which ground is connected in code by the multifrequency receiving circuit, are extended over the normally closed contacts of relay EV1(4) to conductors 410, 411, 412, 414 and 417 and over front contacts of relay AS(5) to the windings of relays A0(5), A1(5), A2(5), A4(5) and A7(5) respectively. With relay OD1(4) operated conductors 220 to 227 are disconnected from conductors 420 to 427.

It may be noted at this time that conductors 410 to 417 also extend to contacts of relays CS(5), ES(6), GS(7), JS(7) and LS(8) so that when one of these relays is operated as described hereinafter, these conductors are extended to the relay windings of the corresponding register. Furthermore, when relay EV1(4) is operated and relay OD1(5) released, conductors 220 to 227 are extended to conductors 420 to 427 and with one of relays BS(5), DS(6), FS(6), HS(7) or KS(8) operated are extended to the corresponding register.

When a telephone designation is to be transmitted to the sender it is preceded by the key pulse signal which is used by the multifrequency receiver and without effect on the sender. Each subsequent digit causes the grounding of two of the conductors 220 to 227 according to the code set forth in the foregoing table. As soon as two channel relays have operated to ground two of the conductors 220 to 227, ground is connected to conductor 231 completing a circuit over contact 1 of relay 10A(4) through resistance BI(4) and the winding of relay RA(4) to battery. If no more than two channel relays operate, ground remains connected to conductor 232, and relay RA(4) completes a circuit from ground on conductor 232, over contact 2 of relay TEN(4), contact 1 of relay RA(4), contact 6 of relay EV1(4), conductor 403, contact 10 of relay AS(5) to battery through the winding of relay BS(5).

Relay BS(5) operates in this circuit, opening at its contact 11 one of the locking circuits for relay AS(5) and closing a locking circuit for itself, over its contact 7 and contact 11 of relay CS(5) to ground on conductor 501. Relay BS(5) connects conductors 420 to 427 to the windings of relays B0(5) to B7(5) constituting the B register. Relay BS(5) also closes a circuit from battery through the winding of relay EV(4), conductor 404, contact 8 of relay BS(5) to ground on conductor 502. In addition relay BS(5) extends ground from conductor 501 to conductor 504 to provide a locking circuit for those of relays AO(5) to A7(5) which may have been operated in response to the first digit received.

The circuit above traced for relay EV(3) extends in parallel with the winding of relay EV(3) over contact 4 of relay ADR(10) to battery through the winding of the latter relay. Relay ADR(10) operates in this circuit and locks over its contact 5 to ground on conductor 1021, at the same time opening its operating circuit. At its contact 1, relay ADR(10) opens the original operating circuit for relay SP(2) and at contact 3 opens the operating circuit for relay AS(5).

At its contact 9, relay ADR(10) disconnects ground from conductor 1005 and thereby releases relay TM0(3) and any of the operated timing relays TM1(3) to TM4(3) and removes ground from interrupter TM(3) to stop the timing operation. When the timing relays have released a circuit is closed from battery through resistance BC(11) and the winding of relay TM9(11), conductor 1101, contact 2 of relay MS2(10), contact 6 of relay ADR(10), conductor 1023, contact 4 of relay TM0(3), contact 1 of relay TM2(3), contact 1 of relay TM1(3), contact 1 of relay TM3(3), conductor 301 to ground at contact 3 of relay S(10). Relay TM9(11) operates in this circuit, and locks over its contact 2 to ground on conductor 301. At its contact 1, relay TM9(11) closes a circuit which extends from ground at contact 3 of relay S(10), conductor 301, contact 1 of relay MS2(10), conductor 1102, and contact 1 of relay TM9(11) to conductor 1005, thereby reoperating relay TM0(3) and grounding interrupter TM(3) to start a new timing cycle.

Relay EV(4) extends its operating ground over its contacts 2 and 1 to battery through the winding of relay EV1(4), which relay operates to disconnect conductors 220 to 227 from conductors 410 to 417 and thereby from the register relays. The operation of relay EV(4) opens the second locking circuit for relay AS(5) causing the latter relay to release and in turn to release relays OD(4) and OD1(4). With relay OD(4) released, conductors 220 to 227 are connected to conductors 420 to 427. In addition, a second locking circuit is closed for relay BS(5) extending from battery through the winding and over contact 6 of relay BS(5), conductor 503, contact 4 of relay OD(4), to ground over conductor 401. Relay AS(5), in releasing, at its contact 8 connects conductor 504 to grounded conductor 501 to hold the relays of the A register operated. At the end of the first digit pulse relay RA(4) is released. The sender is now ready to receive the second digit.

The second digit is registered on relays B0(5) to B7(5), after which ground is connected to conductor 231 operating relay RA(4) as previously described. If no more than two frequencies are received, ground on conductor 232 is extended over contact 2 of relay TEN(4), contact 1 of relay RA(4), contact 6 of relay OD1(4), conductor 405, contact 9 of relay BS(5) to battery through the winding of relay CS(5). Relay CS(5) locks over its contact 6, conductor 505, contact 10 of relay DS(6), conductor 600 to ground at contact 2 of relay ON(10). With relay CS(5) operated, conductors 410 to 417 are connected to the windings of relays C0(5) to C7(5) constituting the third or C register.

Relay CS(5), at its contact 10, connects conductor 506, to which the operated ones of the B register relays B0(5) to B7(5) lock, to ground on conductor 501 to complete the locking circuit for those relays. At its contact 11, relay CS(5) opens one of the locking circuits for relay BS(5). At its contact 9, relay CS(5) connects conductor 402 to conductor 502, thereby completing an operating circuit for relay OD(4). As before, relay OD(4) causes the operation of relay OD1(4), and opens the second locking circuit for relay BS(5), causing that relay to release and in turn release relays EV(4) and EV1(4). With relay EV(4) released, a second locking circuit is closed for relay CS(5) extending from battery through the winding and over contact 7 of relay CS(5), conductor 500, contact 5 of relay EV(4) to ground over conductor 401.

The operation of relay OD1(4) disconnects conductors 220 to 227 from conductors 420 to 427 while the release of relay EV(4) connects conductors 220 to 227 to conductors 410 to 427, which, because of the operation of relay CS(5) are now extended to the relays of the C register. With relay BS(5) released the operated relays of the B register lock over conductor 506 and contact 11 of relay BS(5) to ground on conductor 501. When the pulse of the second digit ends, relay RA(4) releases and opens the operating circuit for relay CS(4).

In a similar manner, the register steering relays DS(6), ES(6), etc. operate in succession, alternately operating relays EV(4) and OD(4), to register succeeding digits on the D, E, etc. registers.

If a full complement of eleven digits is recorded, the eleventh digit being recorded on relays L0(8) to L7(8) with relays LS(8), OD(4) and OD1(4) operated, the operation of relay RA(4) takes place as above described and closes a circuit from ground on conductor 232, contact 2 of relay TEN(4), contact 1 of relay RA(4), contact 6 of relay EV1(4), conductor 403, contact 8 of relay LS(8) to battery through the winding of relay MX(8). Relay MX(8) locks over its contact 6, conductor 800 to ground at contact 4 of relay ON(10). At its contact 7 relay MX(8) closes a locking circuit for the L register relays. At its contact 9, it connects conductor 404 to conductor 502 to operate relay EV(4) to open one locking circuit for relay LS(8) and at its contact 8 opens the other locking circuit for relay LS(8), which releases to close a locking circuit for the L register relays to conductor 800. Relay MX(8) also prepares circuits for registering an additional digit as an operator error.

If less than a complete set of digits is to be recorded, for example, a three-digit operator code, the keying of this code at the toll board must be followed by keying a start signal. After a complete designation, the start signal will be sent automatically. This signal, as set forth in the previous table causes the grounding of conductors 227 and 230, thereby operating the No. 7 relay in the next register or relay M7(8), and operating relay TEN(4). With relay TEN(4) operated, ground on conductor 232 is extended over contact 1 of relay TEN(4) to battery through the winding of relay 10A(4). Relay 10A(4) opens the circuit of relay RA(4) so that no additional digit steering relay will be operated. With ground on conductor 227 and relay 10A(4) operated a circuit is closed from conductor 227 over contact 2 of relay 10A(4), to battery through the winding of relay RST(4). Relay RST(4) locks over its contact 5, conductor 401 to ground at contact 6 of relay ON(10). Relay RST(4) operates relay RST1(4) which in turn operates relay RST2(4).

The designations registered in the sender are generally of four types, namely service codes which take the form of 1X1 in which X may be any digit from 2 to 9; special operator codes usually called TX codes which take the form of 11XX in which X has the same values as above; local designations which include an office code usually comprising three of the digits from 2 to 9 and a numerical designation comprising four or five digits of any value; toll designations which include a toll directing or area code followed by a local designation. In the last case, the toll code is identified by the use of the digit 0 or 1 as either the first or the second digit of the code, so that the toll codes may be said to take one of the forms 0XX, 1XX, X0X or X1X. In some areas the local code may include only two digits.

Since the call being traced is to be extended through a second automatic toll office, it will be assumed that the designation registered is 023–475 (Gramercy 5)–6981, resulting in the operation of register relays A4(5), A7(5), B0(5), B2(5), C1(5), C2(5), D0(6), D4(6), E0(6), E7(6), F1(6), F4(6), G2(7) G4(7), H2(7), H7(7), J1(7), J7(7), K0(8), K1(8), and L7(8) (start signal).

When relay ON(10) operated it operated relay DRL1(2) as previously described. Relay ON1(2) in operating closes a circuit from ground over its contact 6, conductor 233, contact 4 of relay MS(10) to battery through the winding of relay MS1(10), in which the latter relay operates. When relay DS(6) operates, following the registration of the third digit, it closes a circuit from ground over its contact 11, conductor 601, contact 6 of relay MRL(2), conductor 234, contact 6 of relay TX(12), conductor 1200, contact 7 of relay RST(4), conductor 407 to battery through the winding of marker start relay MS(10). Relay MS(10) operates in this circuit and locks over its contact 3 to ground on conductor 233.

At its contact 4, relay MS(10) opens the circuit of relay MS1(10) which is slow to release. When, after an interval, relay MS1(10) closes its back contact, a circuit is completed from battery through the winding of relay MS2(10), contact 2 of relay MS(10), contact of relay MS1(10), conductor 1024, contact 3 of relay SP(2), conductor 235, contact 4 of relay R0(11) to ground on conductor 301. The releasing time of relay MS1(10) allows for the additional time required for translating TX codes which will be discussed hereinafter.

Relay MS2(10) closes a start circuit for the marker connector, which may be traced from battery over contact 4 of relay MS2(10), conductor 1025, contact 5 of relay CTR(3), conductor 302, contact 4 of relay MRL(2), conductor 236 to ground through the start relay MS(18) of the marker connector. Such connectors being well known, no attempt has been made to show the details of the circuit. For a description of the operation of a suitable connector, reference may be made to Patent 2,236,246 to G. V. King et al., March 25, 1941. When the connector has operated, a plurality of conductors are extended from the sender to the marker over which information is transmitted to the marker and other information is transmitted back from the marker to the sender.

As soon as relay MS(10) operates it closes a circuit from ground over its contact 5, conductor 1026, contact 3 of relay TX(12) to battery through the winding of relay ABC(12). Relay ABC(12) operates and in turn operates relay ABC1(12). Relays ABC(12) and ABC1(12) connect conductors 510 to 517, grounded in code by the A register relays A0(5) to A7(5), conductors 520 to 527, grounded in code by the B register relays B0(5) to B7(5), and conductors 530 to 537, grounded in code by the C register relays C0(5) to C7(5), to conductors 1210 to 1217, 1220 to 1227 and 1230 to 1237 which lead to the marker connector where they are extended to the A, B and C registers of the marker which operate to register the digits as set up on the sender registers.

At the same time certain control information is transmitted to the marker and registered there on relays which have been combined and designated control register. With relay CM(19) operated ground is connected to conductor 1916 to indicate that the incoming trunk may serve either intertoll or toll completing calls. With relay V0(19) non-operated, ground through the winding of relay ME(2) is connected over conductor 237, contact 3 of relay V0(19) to conductor 1917 to indicate that the trunk is not limited to via calls. Certain other conductors which may be grounded under other circumstances are checked at this time by the marker. The marker does this by connecting ground to checking conductors 1027 and 1913. Conductor 1913 extends over contact 1 of relay LIT(19) and contact 2 of relay NV1(19) to conductor 1914, which is used for peg count purposes. Conductor 1913 is also connected over contact 3 of relay ROR1(11), contact 8 of relay TM5(11), conductor 1104, contact 1 of relay TN1(10) to conductor 1028 which is used for indicating to the marker that a connection to a reorder trunk is required. In addition, a branch of the circuit over which relay MS(10) operated relay ABC(12) extends from conductor 1026, over contact 2 of relay ROR1(11), conductor 1103, contact 4 of relay CM(19), contact 1 of relay CP(19), conductor 1915, to battery through the winding of relay TL(12). With relay TL(12) operated, conductor 1913 is connected to conductor 1202 over which the marker would receive an indication from trunks that can be used only for local calls.

Similarly, conductor 1027, which is grounded by the marker, is connected over contact 3 of relay 5BD(2) to conductor 238 over which the marker would receive an indication if a particular type of originating office were involved. Conductor 1027 is also connected over contact 1 of relay TX(12) to conductor 1201 which is used for indicating a TX code to the marker.

Relay ME(2) operates in series with the marker relay, closing, at its contact 4, a locking circuit for relay SP1(2). At its contact 3, relay ME(2) connects conductor 1025 to conductor 302 to hold the marker connector independent of relay CTR(3). At its contact 2, relay ME(2) closes a supplementary holding circuit for relay MS2(10) which extends as previously traced to conductor 1024 and thence over contact 2 of relay ME(2), contact of relay DRL1(2), conductor 239, contact 9 of relay ROR1(11), contact 4 of relay R0(11) to ground over conductor 301.

In the marker, control register relays are operated over both the conductors grounded by the sender and over those to which ground is supplied over conductors 1027 and 1913. When the marker has checked that two out of five relays have been operated in each of A, B and C registers and that indications have been received over each of the other conductors, it removes ground from conductors 1027 and 1913, leaving only the indications transmitted by the sender.

The registration set up on the A, B and C registers of the marker is then transmitted to the translator which operates that one of a plurality of route relays which corresponds to the registration. The route relay controls the operation of the trunk selection circuits which function to connect with and test the trunks which serve the selected route and select an idle one for use. Having selected a trunk, the channel selection, operation and test circuits connect with the channels which may be used to connect the incoming trunk and the selected outgoing trunk, select a channel, operate the switch magnets to complete the connection, test the connection for possible faults and if the results of these tests are satisfactory signal the sender to release the marker. For a detailed description of these operations of a marker, reference may be made to Patent 2,236,246 to G. V. King et al., March 25, 1941.

In addition to the operations above described, the route relay sets up a class registration and a code conversion registration for transfer to the sender.

Under the assumption that the call being set up is an intertoll call requiring multifrequency outpulsing and that the trunk to be selected is a guarded trunk, route relay INT(18) will be operated setting up a registration in the code conversion register which results in the grounding of conductor 1308 and a registration in the class register which results in the grounding of conductor 2400.

Ground on conductor 1308 operates skip-three relay SK3(13), while ground on conductor 2400 operates multifrequency relay MF(24). The operation of relay SK3(13) tells the sender that it is not to send out the toll code which was used by the marker in setting up the connection to the distant toll office. The operation of relay MF(24) informs the sender that it must send out the designation in the form of multifrequency pulses. Neither of these relays lock when first operated, since if the marker has to use an alternate route or has difficulty in setting up the connection, it may be necessary to operate other class or code conversion relays in the sender.

Relay MF(24) in operating closes a circuit from ground over its contact 3, conductor 2404 to battery through the winding of relay MF1(26). Relay MF1(26) operates, in turn closing a circuit from ground over its contact 10, conductor 2607, to battery through the windings of relays MF2(26) and MF3(26) in parallel, operating the latter relays.

As soon as the marker has selected an idle trunk the trunk selection circuits ground conductor 2603 through the marker connector, operating relay TKS(26). With relay TKS(26) operated, the sender starts to measure the required trunk guard time interval.

This time interval is measured by means of a plurality of pulses generated by the condenser timed pulse generating relay PG(20). Battery through resistance U(20) is connected to the right side of both windings of relay PG(20) over contact 3 of jack PG(20). Ground is connected over contact 9 of relay ON(10) and conductor 1030 to the armature of relay PG(20) and through condenser PG(20) and over contact 1 of jack PG(20) to the left side of the upper winding of relay PG(20). The left side of the lower winding of relay PG(20) is connected over contact 2 of jack PG(20), contact 1 of jack ADJ(20), winding of relay P(20), winding of relay PCK(20), contact 2 of jack ADJ(20), conductor 2000, contact 3 of relay KP(24), conductor 2403 to reduced battery potential provided by the potentiometer comprising a circuit from battery through resistances AA(27) and AB(27) to ground on conductor 1030. Initially, ground is connected in shunt of battery through resistance U(20) by way of conductor 2001, contact 2 of relay SY(27), conductor 2700, contact 2 of relay PA(31), conductor 3100, contact 5 of relay W(30), contact 2 of relay DE1(30) to ground on conductor 1030. With these circuits closed, relays PG(20), P(20) and PCK(20) are energized in a direction to close their contacts 1.

When relay TKS(26) operates as above described, it closes a circuit from ground over its contact 3, conductor 2604, contact 1 of relay TCA(26), conductor 2605, contact 1 of jack PCK(20), contact 1 of relay PCK(20), contact 2 of jack PCK(20), conductor 2002, contact 1 of relay PB(31) to battery through the winding of relay PA(31). Relay PA(31) operates in this circuit and locks in a circuit from battery through its winding, winding of relay PB(31), contact 3 of relay PA(31), conductor 3101, contact 2 of relay DE2(30), conductor 2605 and thence as above traced to ground at contact 3 of relay TKS(26). Relay PB(31) cannot operate in this circuit, its winding being shunted by the operating ground for relay PA(31).

Relay PA(31) opens the connection between ground and conductor 2001 so that the lower winding of relay PG(20), and the windings of relays P(20) and PCK(20) are energized in the reverse direction between the reduced battery furnished by the potentiometer and the full battery supplied through resistance U(20). Relays PCK(20) and P(20) immediately open their contacts 1 and close their contacts 2. Relay P(20) is ineffective at this time, but relay PCK(20) opens the operating circuit for relay PA(31) permitting relay PB(31) to operate in the locking circuit above traced. At its contact 2, relay PCK(20) closes a circuit from ground on conductor 2605, over its contact 2 and contact 3 of jack PCK(20) to conductor 2003 which extends over contact 4 of relay TKS1(28) to resistance T(28) and battery in shunt of the winding of relay TKS1(28) for a purpose to be described hereinafter.

However, the upper winding of relay PG(20) is also energized at this time by the charging current for condenser PG(20), which is in a direction to oppose the current now flowing in the lower winding of relay PG(20) and is, for a time, of sufficient strength to overcome the effect of the lower winding. When the charging current dies out, relay PG(20) also closes its contact 2, thereby connecting ground on conductor 1030 to conductor 2001 to again energize the lower winding of relay PG(20) and the windings of relays P(20) and PCK(20) in the original direction. Relays P(20) and PCK(20) at once open their contacts 2 and close their contacts 1, but condenser PG(20) now discharges and recharges in the opposite direction, delaying the effect of the reversed energization of the lower winding of relay PG(20). After an interval the current through the upper winding dies down and relay PG(20) opens its contact 2, the current flow in the lower winding is again reversed and after an interval determined by the charging and recharging of condenser PG(20), contact 2 is again closed. Relays PG(20), P(20) and PCK(20) continue to alternately close their contacts 1 and 2 at measured intervals until the pulsing is stopped as will be described.

Each time that relay PCK(20) closes its contact 1 it connects ground to conductor 2002 as above traced. The operation of relays PA(31) and PB(31) serve to absorb the first pulse generated by relay PCK(20) which may be of unstandard length. With relay PB(31) operated as above described, the first subsequent connection of ground to conductor 2002 completes a circuit over contact 2 of relay PB(31), conductor 3102, contact 4 of relay PE(31) to battery through the winding of relay PC(31). Relay PC(31) operates and closes a locking circuit for itself from battery through its winding, left winding of relay PE(31), contact of relay PD(31), contact 2 of relay PC(31), conductor 3103, contact 3 of relay DE2(30) to ground on conductor 2605. Relay PE(31) cannot operate, being shunted by the operating ground for relay PC(31). When relay PCK(20) opens its contact 1 to generate the first effective pulse, relay PE(31) also operates.

At the next closure of contact 1 of relay PCK(20), ground connected as above traced to conductor 3102 is extended over contact 3 of relay PE(31) through the right winding of that relay to battery through the winding of relay PD(31). Relay PE(31) is held operated in this circuit and relay PD(31) operates, opening the circuit of relay PC(31) which thereupon releases. When relay PCK(20) opens its contact 1 to generate the second pulse, relays PD(31) and PE(31) release. Therefore it will be apparent that following the first and other odd pulses generated by relay PCK(20), relay PE(31) will be operated and following the second and other even pulses relay PE(31) will be released.

Ground on conductor 2605 extends over contact 4 of relay DE2(30), conductor 3002, contact 2 of relay TSK1(28), conductor 2802, to contacts 1 and 2 of relay PE(31).

Relay PE(31) over its contacts 1 and 2 controls the counting relays PC1(31) to PC6(31) which may serve to count a maximum of ten pulses. While less than ten pulses are used for the timing operation now taking place, the complete operation of the counting relays in response to ten pulses will be described at this point. The operation of relay PE(31) in response to the first pulse, completes a circuit from ground connected as above traced to conductor 2802, over contact 1 or relay PE(31) to conductor 3104, contact 1 of relay PC4(31), contact 1 of relay PC2(31), contact 1 of relay PC3(31), contact 1 of relay PC5(31) to battery through the lower winding of relay PC1(31). Relay PC1(31) operates in this circuit and locks in a circuit from battery through its upper winding and over its contact 3, contacts 3 of relays PC2(31), PC3(31), PC4(31) and PC5(31), conductor 3002 to ground as previously traced.

When relay PE(31) releases in response to the second pulse from relay PCK(20), it completes a circuit from ground on conductor 2802, over its contact 2, conductor 3105, contact 2 of relay PC1(31) to battery through the winding of relay PC2(31). Relay PC2(31) operates and locks over its contact 4 and contacts 3 of relays PC3(31), PC4(31) and PC5(31) to ground on conductor 3002, opening at its contact 3 the locking circuit of relay PC1(31) which releases.

The operation of relay PE(31) in response to the third pulse connects ground to conductor 3104 which now extends over contact 1 of relay PC4(31) and contact 2 of relay PC2(31) to battery through the winding of relay PC3(31). Relay PC3(31) operates and locks over its contact 4 and contacts 3 of relays PC4(31) and PC5(31) to ground on conductor 3002. At its contact 3, relay PC3(31) opens the locking circuit of relay PC2(31) causing that relay to release. With relay PC3(31) operated the release of relay PE(31) in response to the fourth pulse, grounding conductor 3105, completes a circuit over contact 2 of relay PC3(31) to battery through the winding of relay PC4(31). Relay PC4(31) operates and locks over its contact 4 and contact 3 of relay PC5(31) to ground on conductor 3002. At its contact 3, relay PC4(31) opens the locking circuit of relay PC3(31) causing the latter relay to release.

The operation of relay PE(31) in response to the fifth pulse grounds conductor 3104, completing a circuit over contact 2 of relay PC4(31) to battery through the winding of relay PC5(31). Relay PC5(31) operates, closing a locking circuit for itself over contact 6 of relay PC1(31), contact 4 of relay PC5(31) to ground on conductor 3002 and opening at its contact 3 the locking circuit for relay PC4(31).

The release of relay PE(31) in response to the sixth pulse, grounding conductor 3105, completes a circuit over contact 2 of relay PC5(31) to battery through the lower winding of relay PC6(31). Relay PC6(31) operates and locks in a circuit from battery through its upper winding and over its contact 3 directly to conductor 3002, therefore remaining operated as long as that conductor is grounded. It may be noted that relay PC5(31) is not released by the operation of relay PC6(31).

The operation of relay PE(31) in response to the seventh pulse, grounding conductor 3104, completes a circuit over contact 1 of relay PC4(31), contact 1 of relay PC2(31), contact 1 of relay PC3(31), contact 1 of relay PC6(31) to battery through the lower winding of relay PC1(31). Relay PC1(31) operates and locks in a circuit from battery through its upper winding and over its contact 3, contacts 3 of relays PC2(31) and PC3(31), contact 1 of relay PC1(31), contact 2 of relay PC6(31) to ground on conductor 3002. Relay PC1(31) opens the locking circuit for relay PC5(31) and the latter relay releases.

The operation of relays PC2(31), PC3(31) and PC4(31) in response to the eighth, ninth and tenth pulses, followed in turn by the release of relays PC1(31), PC2(31) and PC3(31) is the same as described above in connection with the second, third and fourth pulses.

When relay PC2(31) operates in response to the second effective pulse from relay PCK(20), it closes a circuit from ground at contact 1 of relay TKS(26), conductor 2624, contact 4 of relay TCA(26), conductor 2606, contact 7 of relay PC2(31), conductor 3106 to battery through the winding of relay TC3(24). Relay TC3(24) operates in this circuit and locks over its contact 1 to ground over conductor 2606 as above traced. The operating time of relay PG(20) and therefore of relay PCK(20) for this timing operation is such that the operation of relay TC3(24) indicates that an interval of 300 milliseconds has elapsed.

When relay PC4(31) operates, a circuit is closed from ground on conductor 2606 over contact 7 of relay PC4(31), conductor 3107 to battery through the winding of relay TC5(24). Relay TC5(24) operates and locks over its contact 3 to ground on conductor 2606, indicating that an interval of 500 milliseconds has elapsed.

When relay PC6(31) operates at the end of an interval of 700 milliseconds, it closes a circuit from ground on conductor 2606, contact 6 of relay PC6(31), conductor 3108, contact 2 of relay TC5(24) to conductor 2405 to initiate a supplementary timing operation of 75 milliseconds. This supplementary timing may also be initiated by grounding conductor 2405 prior to the operation of relay PC6(31) as will be described hereinafter.

Ground connected to conductor 2405 completes a circuit over contact 5 of relay TKS(28), conductor 2803, contact 3 of relay PB(31), conductor 3109 to battery through the winding of relay DE1(30) and resistance AL30). Relay DE1(30) operates in this circuit and closes a circuit from ground on conductor 1030, over its contact 3, conductor 3003, contact 1 of relay TKS2(28) to battery through the winding of relay TKS1(28) and resistance T(28). However at this time, ground is connected to battery through resistance T(28) from contact 2 of relay PCK(20) as previously described. When relay PCK(20) opens its contact 2, relay TSK1(28) operates in the above-traced circuit, opening at its contact 2 the circuit over which the counting relays PC1(31) to PC6(31) were operated to stop the counting operation. Relay TKS1(28) closes a locking circuit for itself from battery through resistance T(28), winding of relay TKS1(28), winding of relay TKS2(28), contact 5 of relay TKS1(28), conductor 2805 to ground at contact 6 of relay TKS(26). Relay TKS2(28) cannot operate in this locking circuit, being shunted by the operating circuit of relay TKS1(28). At its contact 4, relay TKS1(28) disconnects conductor 2803 from resistance T(28) and extends that conductor over its contact 3, conductor 2804, contact 5 of relay DE1(30) to battery through the winding of relay DE2(30) and resistance AK(30). When, now, relay PCK(20) again closes its contact 2, relay DE2(30) operates in this circuit, opening the locking circuits for relays PC5(31), PC6(31), PA(31), PB(31), PC(31) and PE(31) and these relays release. The release of relay PB(31) opens the operating circuit of relay DE1(30), but relay DE2(30) in operating extends its operating circuit over its contact 1 to the winding of relay DE1(30) to hold the latter relay operated under the control of relay PCK(20).

When relay PCK(20) opens its contact 2, relays DE1(30) and DE2(30) release. With relay DE1(30) released and relay TKS1(28) operated ground on conductor 1030 is connected over contact 2 of relay DE1(30), contact 5 of relay W(30), conductor 3100, contact 1 of relay TKS1(28), conductor 2700, contact 2 of relay SY(27) to conductor 2001 to prevent the further pulsing operation of relay PG(20) and thereby to stop the timing. The release of relay DE1(30) opens the operating circuit for relay TKS1(30) allowing relay TKS2(28) to operate.

When the marker has operated the switches connecting the incoming trunk to the selected outgoing trunk, has tested the connection and is ready to release, it connects ground through the marker connector to conductor 1031, completing a circuit over contact 2 of relay TRL(2), conductor 240, to battery through the winding of relay MRL(2). Relay MRL(2) operates in this circuit and closes a locking circuit for itself from battery through its winding, conductor 240, contact 7 of relay MS2(10), conductor 1032 to ground at contact 3 of relay MRL(2). Relay MRL(2) closes a circuit from ground over its contact 2, contact 1 of relay TRL(2) to battery through the winding of relay MRL1(2) operating the latter relay. At its contact 5, relay MRL(2) connects ground to conductor 241 which extends over contacts 5 and 6 of relay MS2(10) to conductors 1033 and 1034 to supply locking ground for the relays operated by the marker, conductor 1033 supplying locking ground for relays MF(24) and TKS(26), conductor 1034 supplying locking ground for relay SK3(13). At its contact 6, relay MRL(2) opens the operating circuit for relay MS(10) and at its contact 4 opens the circuit of the marker start relay MS(18) in the marker connector causing the release of the marker connector and the marker. The release of the marker releases relay ME(2).

With relay MF1(26) operated and DLC(26) non-operated, the operation of relay MRL(2) closes a circuit from ground over its contact 1, conductor 242, contact 5 of relay DLC(26), conductor 2621, contact 7 of relay MF1(26), to conductor 2608. As soon as relay TC3(24) operates to indicate the measurement of 300 milliseconds, this ground is extended to conductor 2405 to initiate the measurement of the supplementary time period as above described. At the end of this time, the operation of relay TSK2(28) extends ground on conductor 2405 over contact 4 of relay TKS2(28), conductor 2806, to battery through the winding of relay TCA(26). Relay TCA(26) operates in this circuit and locks over its contact 5 and conductor 2624 to ground at contact 1 of relay TKS(26). The time measured in this case allows time for the transmission of the seizure signal to the distant office and response thereto as will be described hereinfter.

Relay TCA(26) at its contact 4 opens the locking circuits for relays TC3(24) and TC5(24) causing these relays to release.

The operation of relay TCA(26) prepares the sender for outpulsing. At its contact 6, relay TCA(26) connects ground to conductor 2609, over contact 1 of relay MF(24) to battery through the winding of relay KP(24). Relay KP(24) operates in this circuit and closes a supplementary circuit for grounding conductor 2001, which extends from conductor 2001 over contact 10 of relay KP(24), conductor 2704 and contact 5 of relay PS(27) to conductor 2700 and thence as previously traced to ground.

Figure 15:
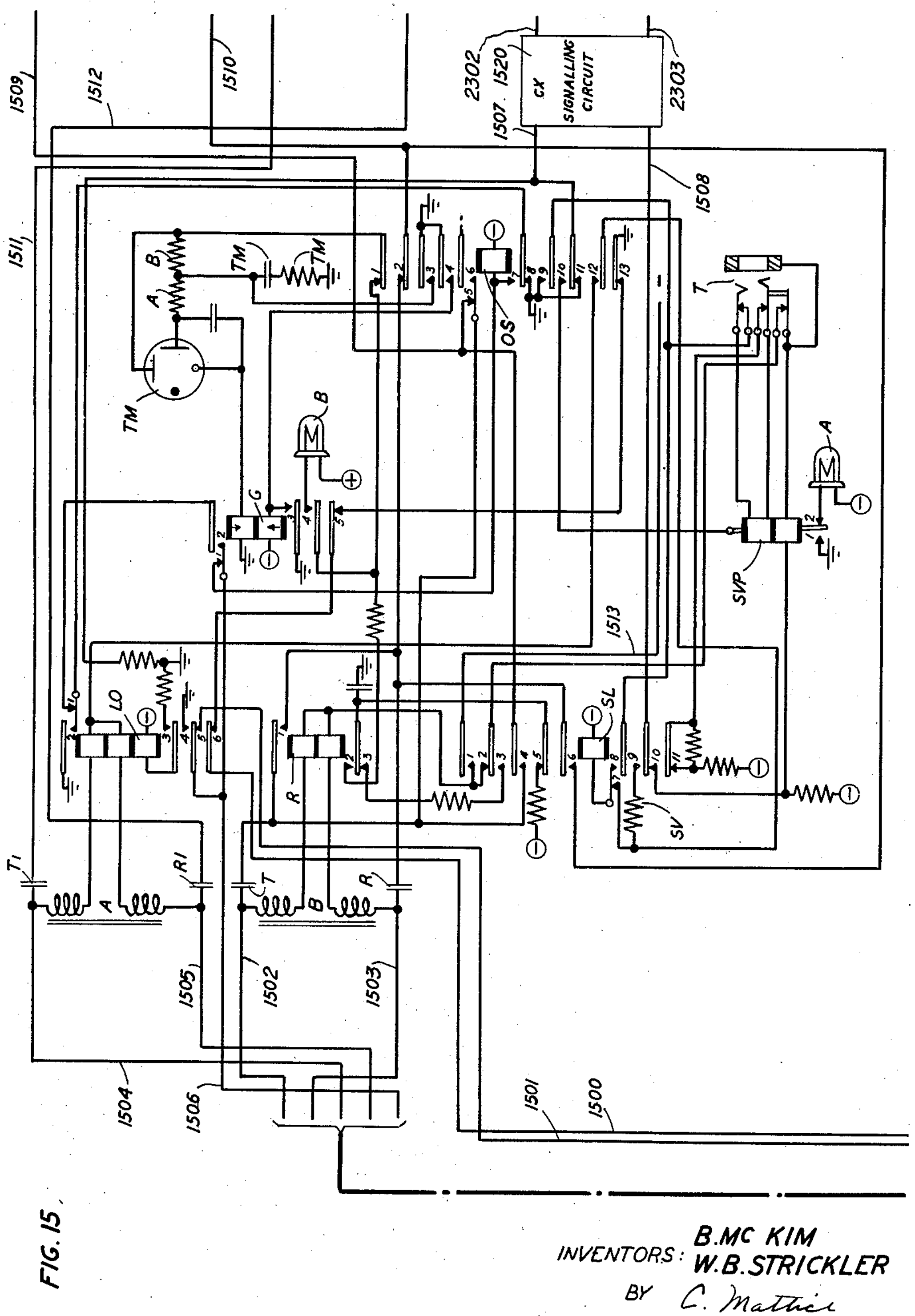
Fig. 15 shows an outgoing intertoll trunk.

Referring now to the outgoing trunk circuit of Fig. 15, this trunk circuit, when idle, connects ground over contact 13 of relay OS(15), contact 5 of relay G(15), and contact 6 of relay LO(15) to group busy conductor 1500 and connects battery through the winding of relay OS(15) over contact 1 of relay G(15) and contact 5 of relay LO(15) to individual trunk busy conductor 1501. The marker uses these conductors in selecting the trunk for use. Having selected the trunk, the marker grounds conductor 1501, operating relay OS(15). Relay OS(15) connects ground over its contact 3 to condenser TM(15) to remove any charge that may be present. At its contact 4, relay OS(15) connects ground to battery through the lower winding of relay G(15) operating the latter relay. Relay G(15) locks to ground at its contact 3 and closes a locking circuit for relay OS(15) which may be traced from battery through the winding and over contact 7 of relay OS(15), contact 1 of relay LO(15), contact 2 of relay G(15), conductor 1506, contact 5 of relay LO(15) to ground on conductor 1501.

Figure 9:
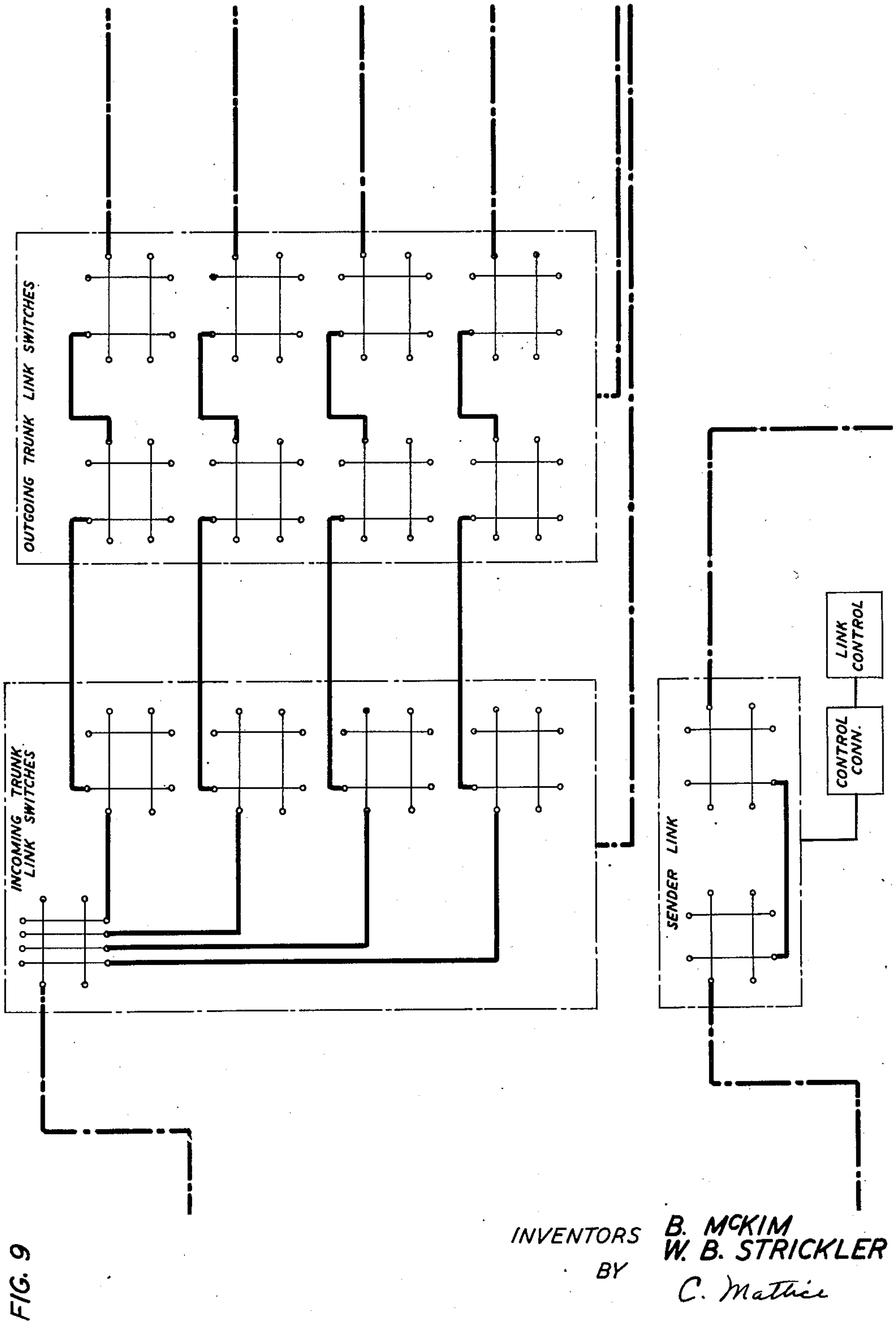
Fig. 9 shows diagrammatically the sender link switches and the incoming and outgoing trunk link switches.

As soon as the switches have been operated, conductors 1502 to 1506 of the trunk circuit are extended through the outgoing link switches and incoming link switches of Fig. 9 to conductors 122 to 125 and 118, respectively, of the incoming trunk circuit. Conductor 118 thence extends through the sender link switches to conductor 1018 of the sender and over contact 6 of relay S(10), conductor 1905, contact 10 of relay MT(19), conductor 1904, contact 1 of relay MS(10), conductor 1035 and over contacts 3 and 4 of relay ON1(2) to ground. The connection of this ground to conductor 1506 provides a locking circuit for relay OS(15) under the control of the sender and transmits a signal to the marker over conductor 1501 which initiates the release of the marker above described.

Figure 23:
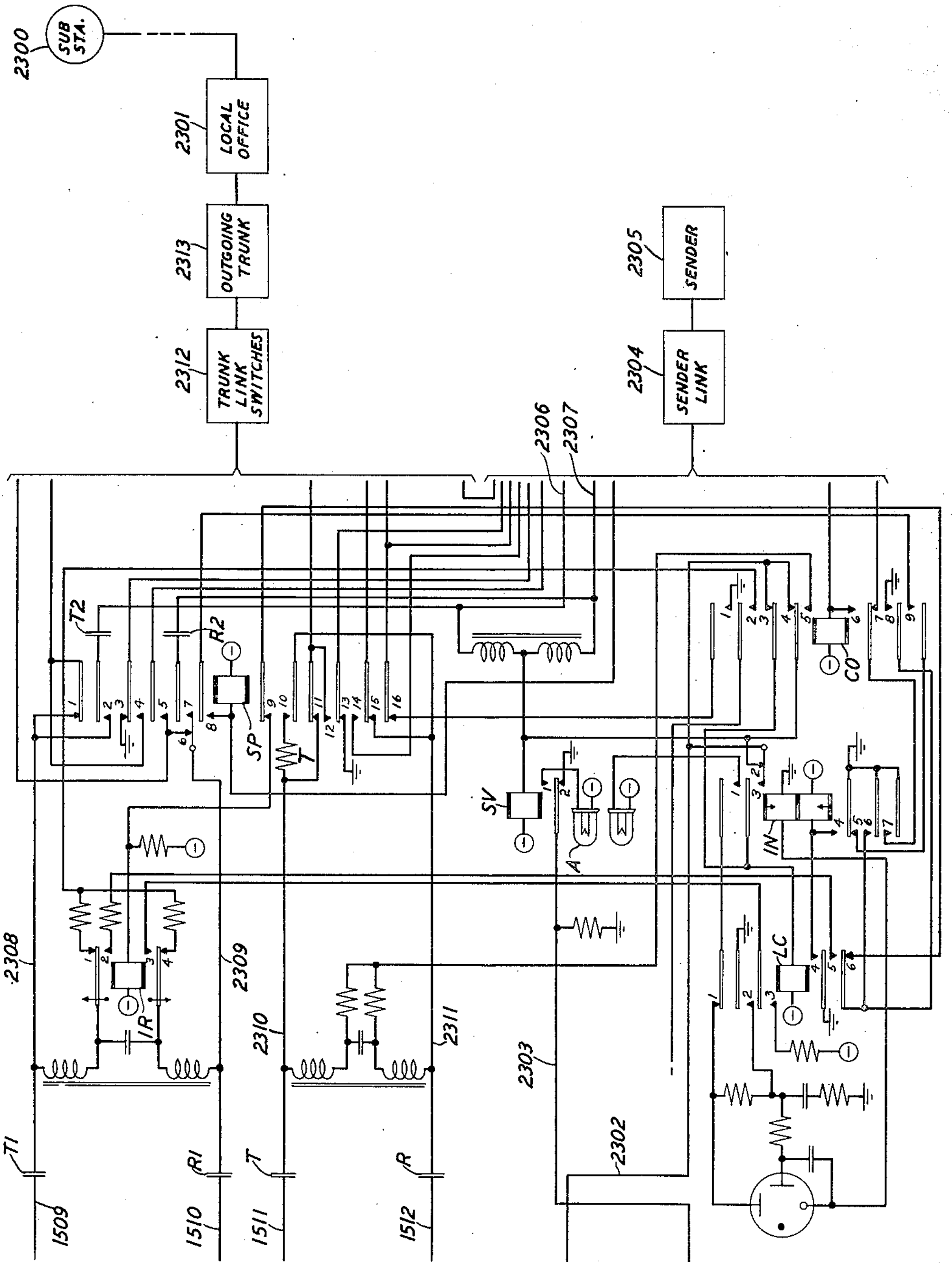
Fig. 23 shows an incoming intertoll trunk at a distant toll office.
Figure 24:
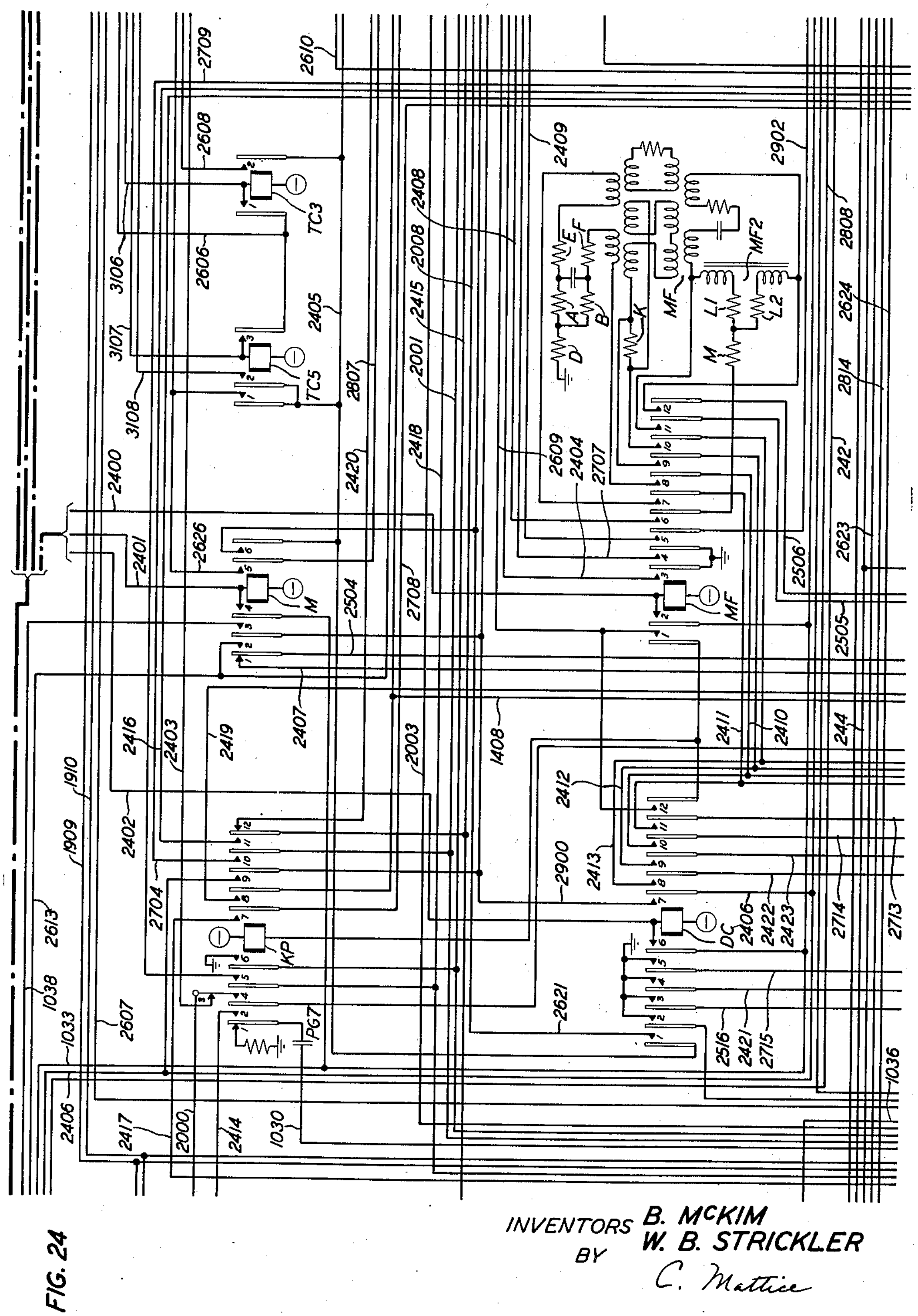
Figure 25:
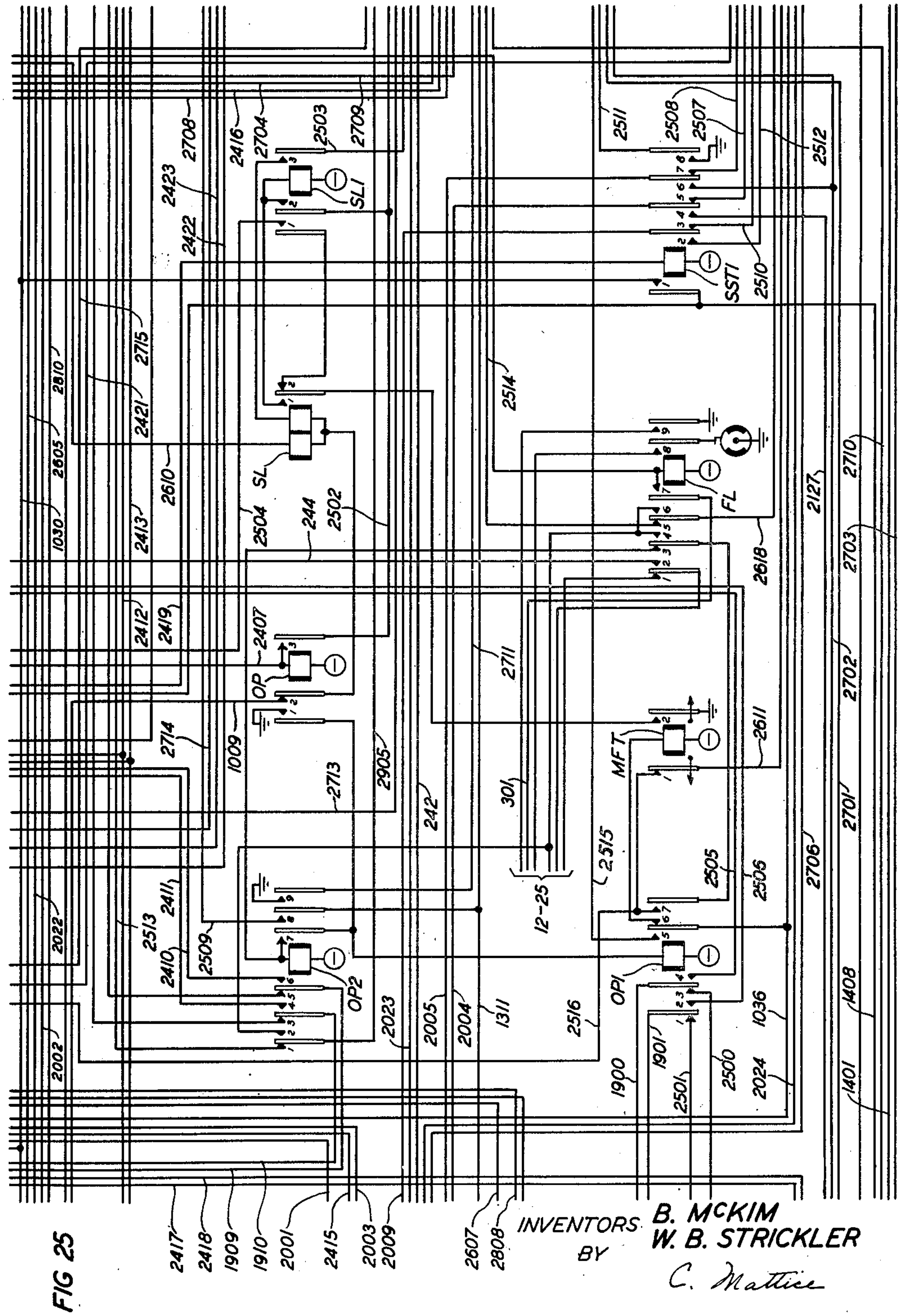
Figure 26:
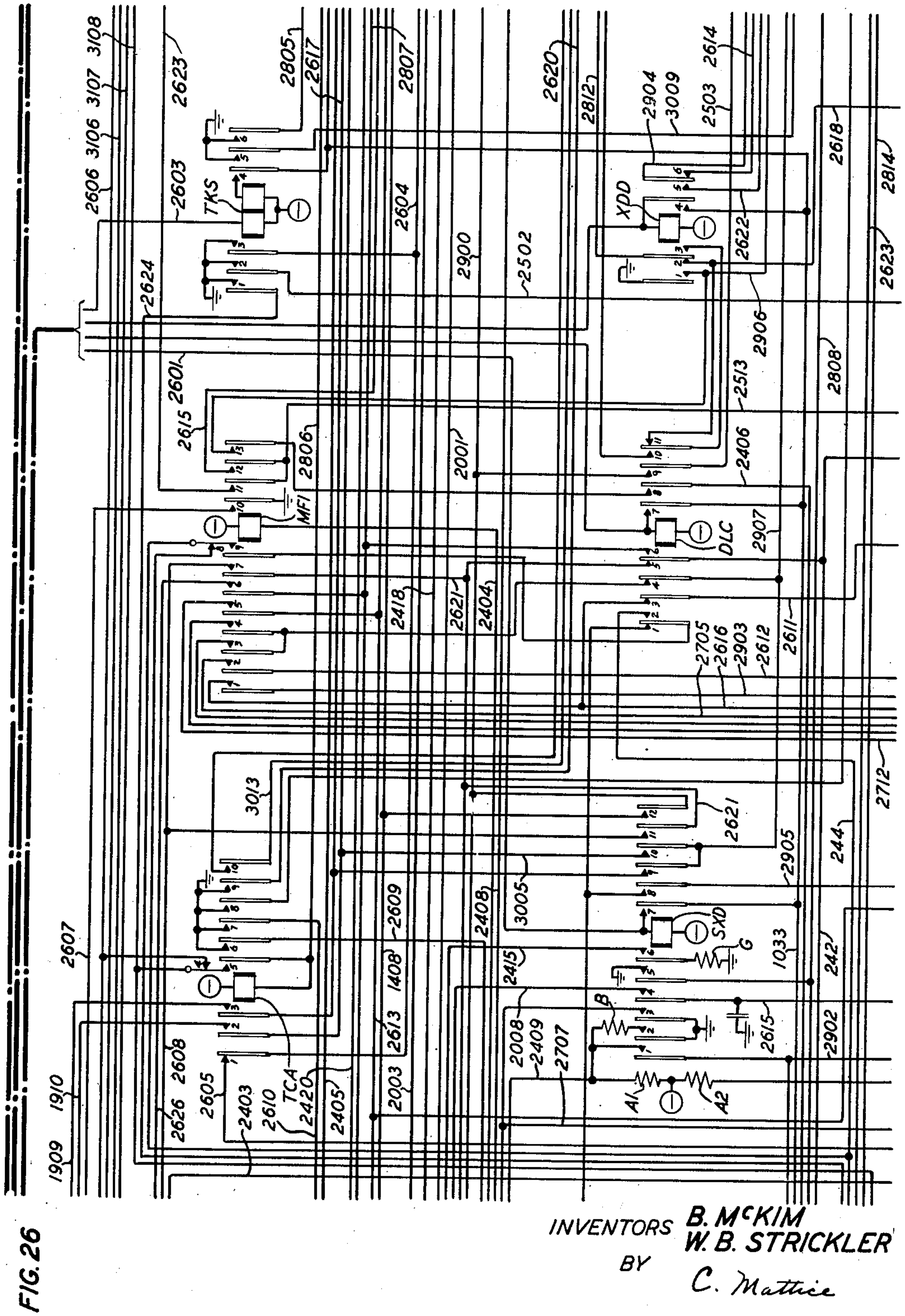
Figure 27:
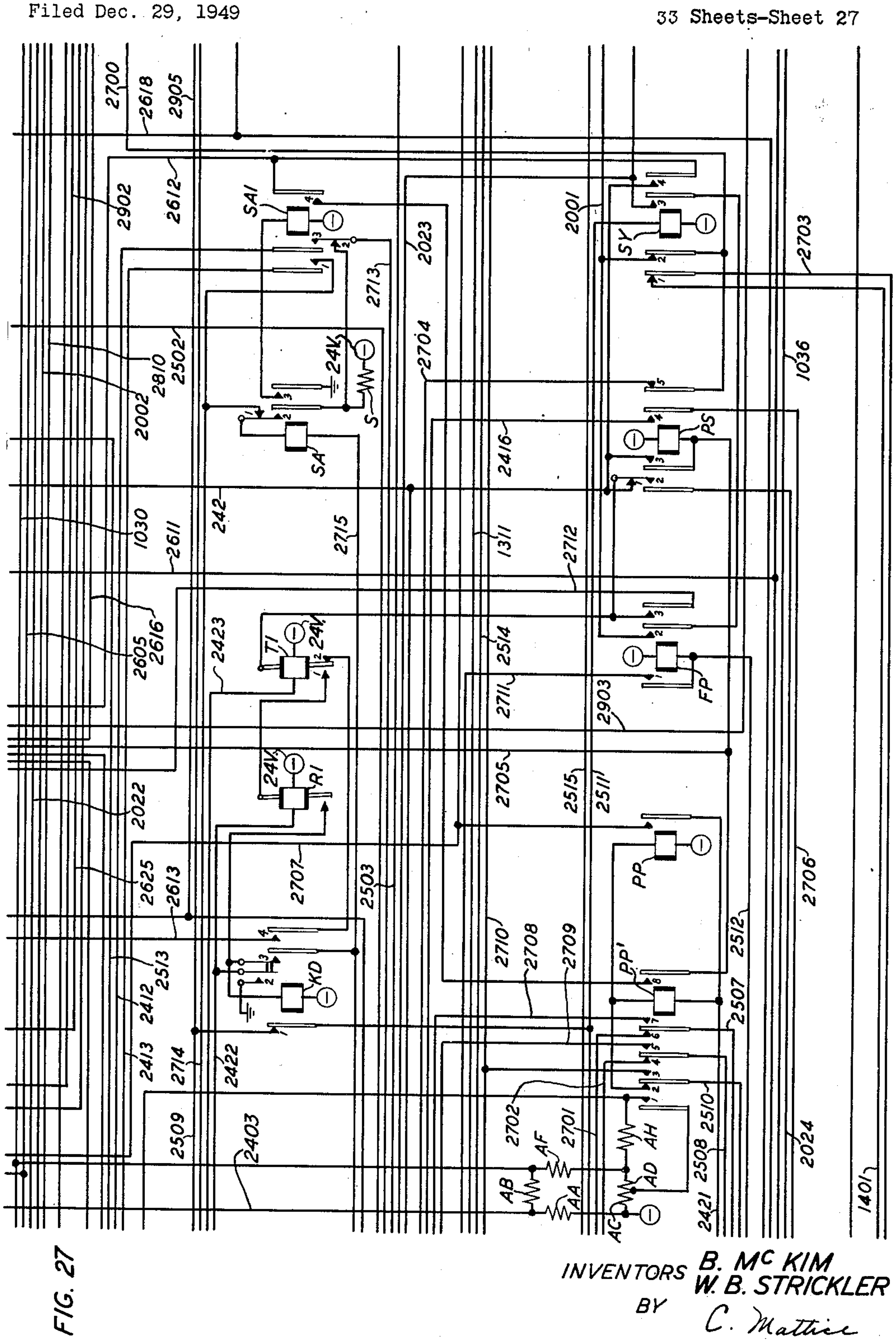
Figure 28:
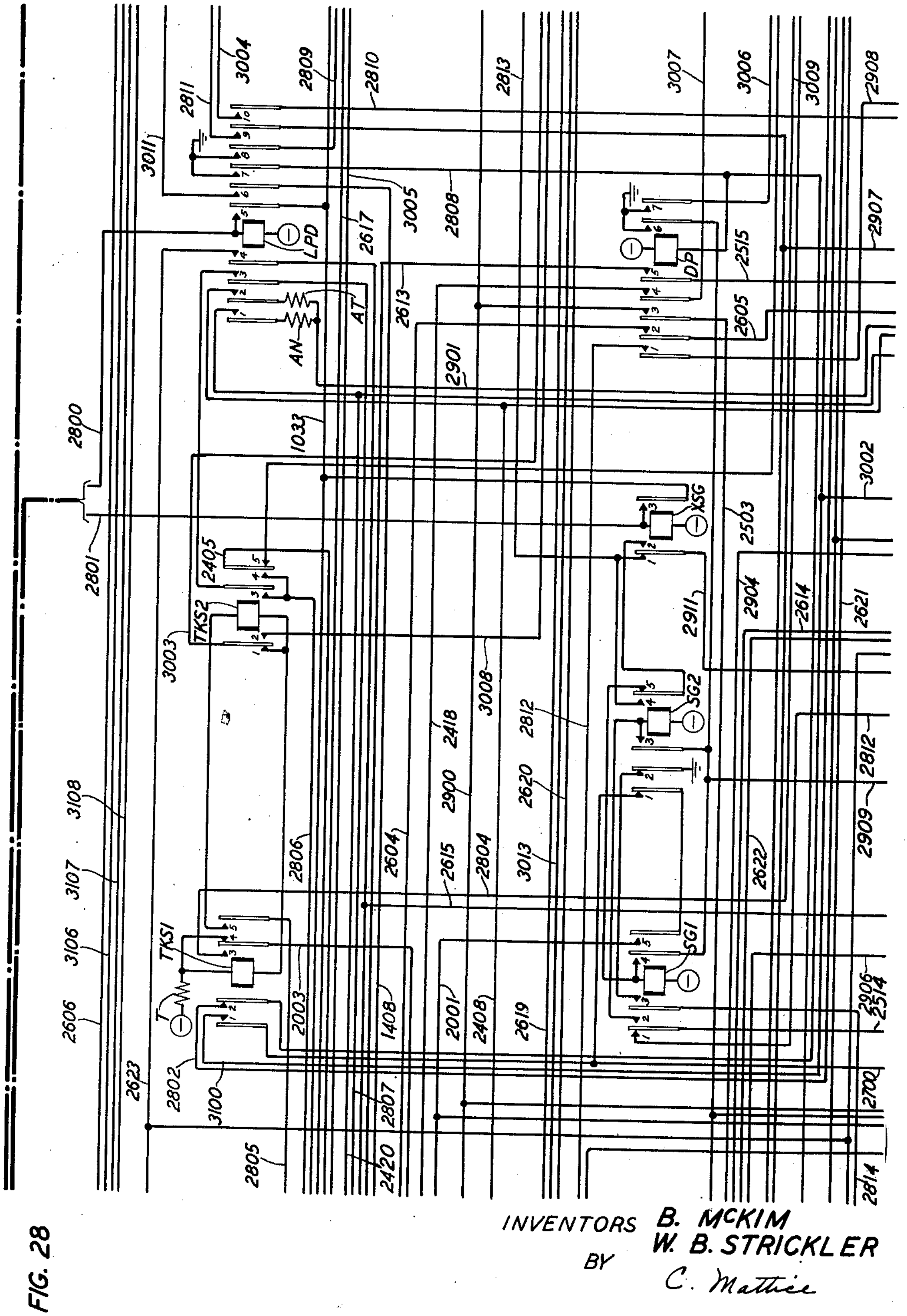
Figure 29:
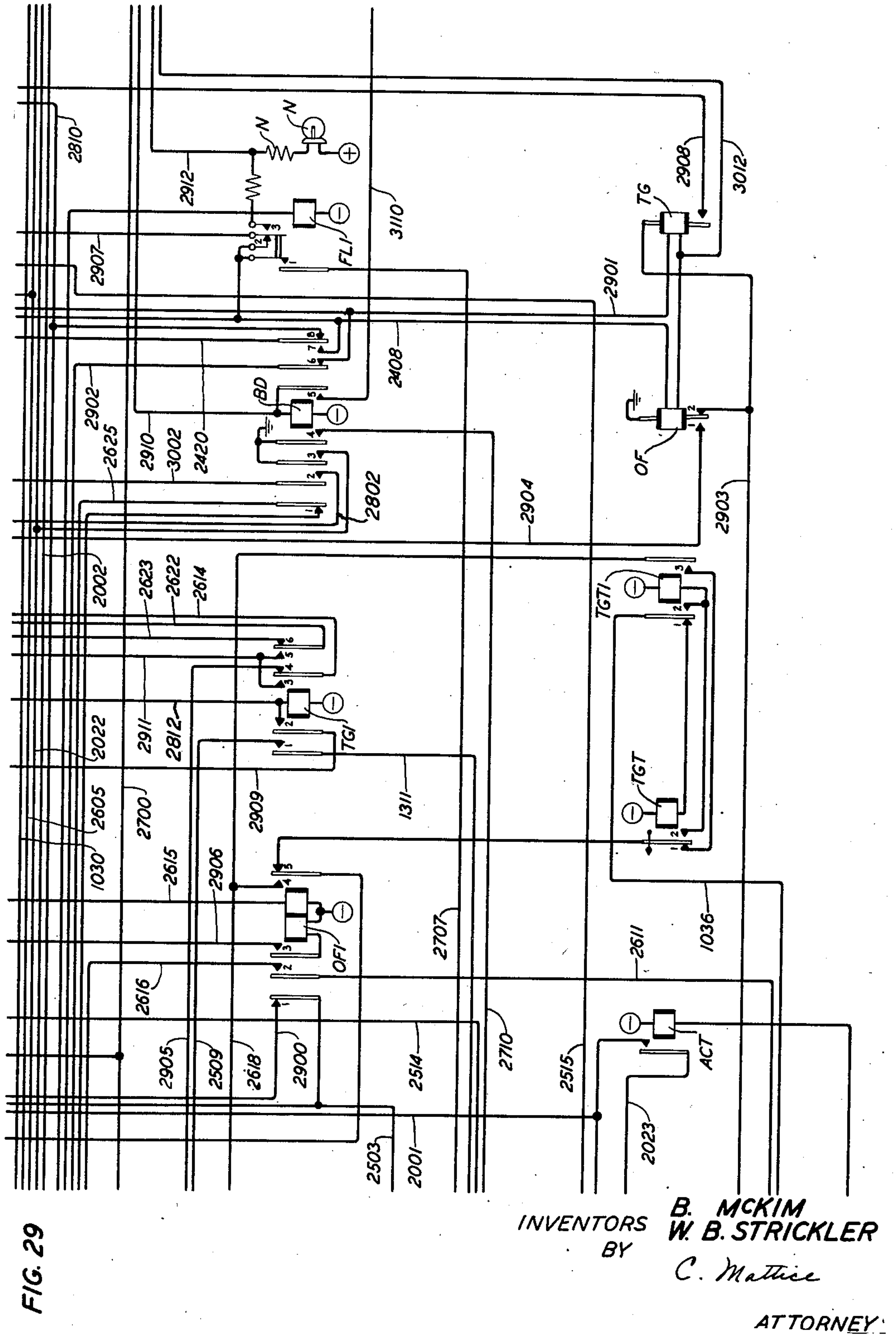
Figure 30:
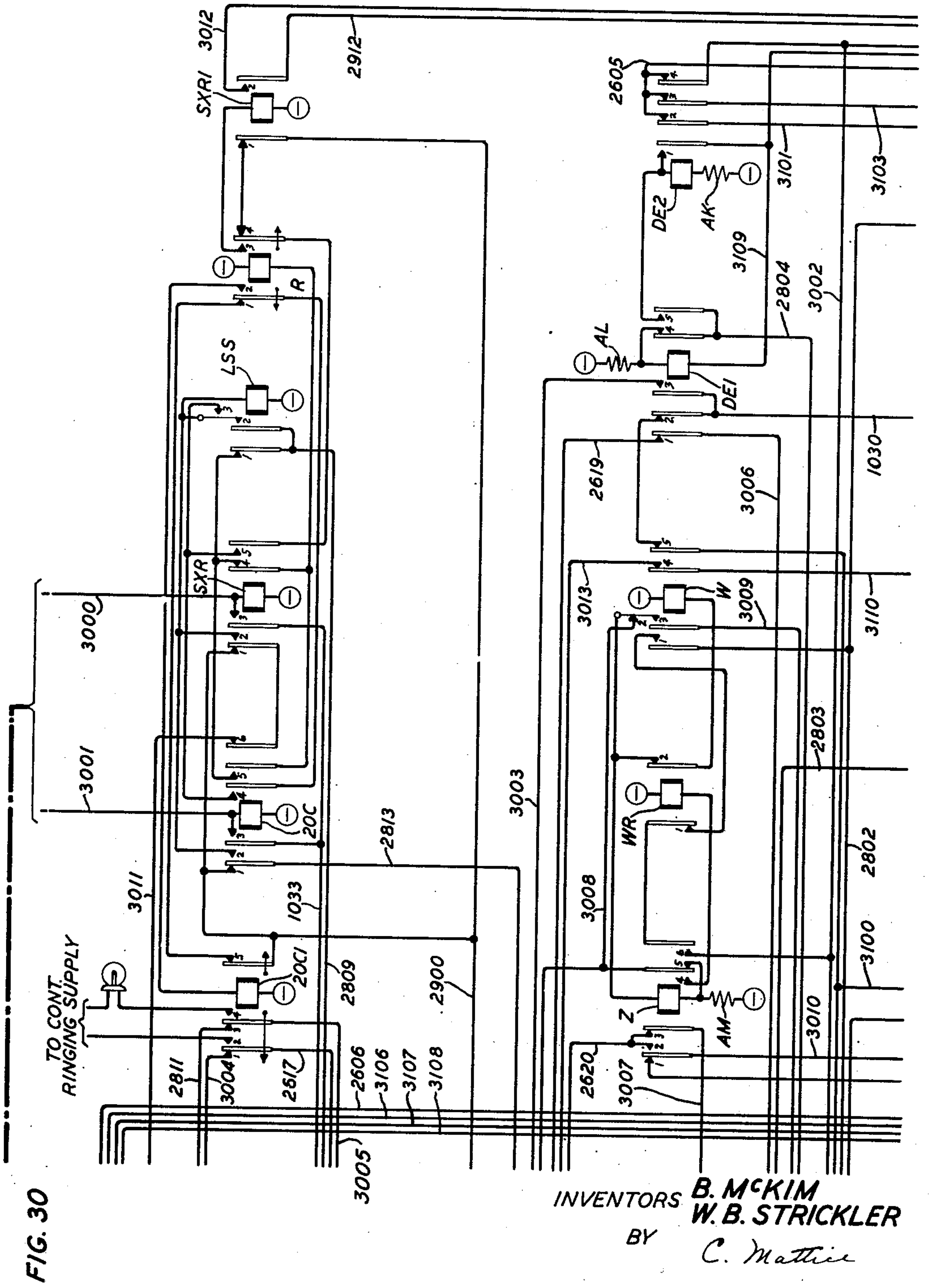

The outgoing trunk circuit of Fig. 15 is connected with the incoming trunk circuit of Fig. 23 located at the distant toll office by means of the talking conductors 1509 to 1512. Signaling between the offices takes place over conductors 1507, 1508, 2302 and 2203 through the medium of the composite signaling circuit 1520.

With relay OS(15) operated, at its contact 11 it disconnects ground from conductor 1507 leading to the composite signaling circuit 1520 and extends that conductor over its contact 10 and contact 2 of relay SVP(15) to battery through resistance lamp A(15). The composite signaling circuit 1520, in response to this signal, connects ground to conductor 2302, completing a circuit over contact 3 of relay CO(23) to battery through the winding of relay LC(23) and over contact 4 of relay CO(23) to battery through the winding of relay SV(23). Relay SV(23) at its contact 2 disconnects ground from conductor 2303 leading to the composite signaling circuit 1520 and, at its contact 1, connects that conductor to battery through resistance lamp A(23). The composite signaling circuit, in response to this signal, connects ground to conductor 1508 as a stop-dial signal.

Relay LC(23) operates relay IN(23) which initiates the connection of an idle sender 2305 through the sender link 2304 with the incoming trunk of Fig. 23 at the second intertoll office in the same manner as described for the incoming trunk of Fig. 1. Sender 2305 operates relay CO(23) and, later, relay SP(23) in the manner described for the trunk of Fig. 1. Relay CO(23) disconnects relay SV(23) from conductor 2302, but that relay is held operated from the sender over conductors 2306 and 2307 until the sender is ready to receive pulses. Relay SP(23) extends incoming conductors 1509 and 1510 to conductors 2306 and 2307 to provide a path for the multifrequency pulses to the sender and connects incoming conductors 1511 and 1512 together through resistance T(23). When sender 2305 is ready to receive pulses, it releases relay SV(23) and that relay disconnects battery from conductor 2303 and connects ground thereto. The composite signaling circuit responds, removing ground from conductor 1508 and connecting battery thereto.

When relay TCA(26) operates in the sender as above described, a circuit is closed from ground over contact 7 of relay TCA(26), conductor 2610, high resistance left-hand winding of relay SL(25), contact 2 of relay OP(25), conductor 1009, over contact 3 of relay AV(10) to conductor 1911 and in parallel therewith over contact 3 of relay AV1(10) to conductor 1912. These parallel circuits may be further traced over contacts 5 and 4 of relay RT(19), conductors 2500 and 2501, contacts 3 and 1 of relay OP1(25), conductors 1900 and 1901, contacts 1 and 3 of relay MT(19), conductors 1012 and 1013, extended through the sender link of Fig. 9 to conductors 112 and 113, contacts 12 and 14 of relay SP(1), conductors 124 and 125, through the incoming and outgoing trunk link switches to conductors 1504 and 1505, through the windings of retard coil A(15), and through the upper and middle windings of relay LO(15) and thence in common over contact 12 of relay OS(15), contact 7 and winding of relay SL(15) to battery. Relay SL(25) operates in this circuit but the resistance of relay SL(25) is such that relay SL(15) does not operate.

As soon as relay ON(10) operated following the seizure of the sender, a circuit was closed from ground over contact 8 of relay ON(10), conductor 1036, contact 6 of relay OP1(25) to battery through the winding of relay MFT(25). Therefore, when relay SL(25) operates, a circuit is closed from battery through the winding of relay SL1(25), contact 1 of relay SL(25), to ground at contact 2 of relay MFT(25). Relay SL1(25) operates and locks over its contact 2, conductor 2502 to ground at contact 2 of relay TKS(26). With relay SL1(25) operated, the low resistance right-hand winding of relay SL(25) is connected over contact 3 of relay SL1(25), conductor 2503, contact 1 of relay OF1(29), conductor 2900, contact 9 of relay KP(24), conductor 2406, to ground at contact 1 of relay MRL1(2).

The completion of this circuit reduces the resistance in the circuit of relay SL(15) sufficiently to permit that relay to operate. Relay SL(15) locks over its contact 8 to ground at contact 9 of relay OS(15), and at its contact 9 extends the circuit of relay SL(25) through resistance SV(15) to signaling conductor 1508 to which the composite signaling circuit 1520 has connected ground as above described. Relay SL(25) therefore now releases, completing a circuit from ground at contact 2 of relay MFT(25), contact 2 of relay SL(25), contact 1 of relay SL1(25), conductor 2504, contact 1 of relay M(24), conductor 2407 to battery through the winding of relay OP(25).

Relay OP(25) operates and locks over its contact 3 and conductor 2502 to ground at contact 2 of relay TKS(26). Relay OP(25) disconnects relay SL(25) from the circuit in which it previously operated. At its contact 1, relay OP(25) closes an obvious circuit for operating relay OP1(25).

Relay OP1(25), at its contacts 6, opens the circuit of relay MFT(25) which is slow to release and therefore releases after an interval. At its contacts 1 and 3, relay OP1(25) further opens the circuit of relay SL(25) and at its contacts 2 and 4 extends conductors 1900 and 1901 over conductors 2505 and 2506 and contacts 11 and 12 of relay MF(24) to the outer ends of the windings of retard coil MF2(24). The inner ends of the windings of retard coil MF2(24) are connected through resistances L1(24) and L2(24) in parallel to resistance M(24) and thence over contact 6 of relay MF(24), conductor 2408, winding of relay OF(29), winding of relay TG(29), conductor 2901, contact 6 of relay BD(29), conductor 2902, contact 5 of relay MF(24), conductor 2409 to battery through resistance A1(26).

This circuit extends from conductors 1900 and 1901 by way of the incoming and outgoing trunk circuits to conductor 1508 as above traced. The sender, by means of this circuit looks at the trunk and determines the on-hook and off-hook conditions set up by the distant office. Ground on conductor 1508 is an on-hook signal, and if present when relay OF(29) and TG(29) are connected to conductor 1508, relay OF(29) operates. The removal of ground from conductor 1508 as above described when the distant sender is ready to receive pulses, releases relay OF(29). Whether or not relay OF(29) operates, initially, the slow release of relay MFT(25) measures off a time interval and when it closes its back contact, with relay OF(29) released, closes a circuit from ground over contact 2 of relay OF(29), conductor 2903, contact 1 of relay MF1(26), contact 3 of relay DLC(26), conductor 2611, contact 1 of relay MFT(25), contact 7 of relay OP1(25), contact 3 of relay FL(25) to battery through the winding of relay OP2(25). Relay OP2(25) operates and locks over its contact 7 to ground at contact 1 of relay OP(25).

With relay OP2(25) operated, the multifrequency outpulsing circuit is established extending from ground through resistances D(24), A(24) and B(24), E(24) and F(24) through the upper windings of hybrid coil MF(24), contacts 7 and 8 of relay MF(24), conductors 2410 and 2411, contacts 6 and 4 of relay OP2(25), conductors 1909 and 1910, contacts 6 and 8 of relay MT(19), conductors 1017 and 1016 through the sender link to conductors 117 and 116, contacts 4 and 5 of relay SP(1), conductors 122 and 123 through the incoming and outgoing trunk link switches, to conductors 1502 and 1503, condensers T(15) and R(15), contacts 4 and 6 of relay SL(15), conductors 1509 and 1510, condensers T1(23) and R1(23), conductors 2308 and 2309, contacts 2 and 7 of relay SP(23), condensers T2(23) and R2(23), conductors 2306 and 2307 through the sender link 2304 to the sender 2305 and the multifrequency receiving circuit associated with that sender. To balance the transmission over the four-wire trunk, the supervisory circuit, previously traced from retard coil MF2(24) to conductor 1508, is also connected to the lower winding of hybrid coil MF(24) in the sender and conductors 1504 and 1505 incoming to the trunk circuit of Fig. 15 are connected through condensers T1(15) and R1(15), conductors 1511 and 1512, condensers T(23) and R(23) to conductors 2310 and 2311 which are connected together through resistance T(23) over contact 10 of relay SP(23).

The multifrequency pulses are transmitted from the output of the multifrequency supply to the input, center windings of hybrid coil MF(24) which are bridged by resistance K(24), over circuits which will be traced hereinafter.

The nature of the pulses to be transmitted is determined by the recapture circuit, comprising relays RT0(21) to RT7(21) and RR0(21) to RR7(21), which is set from the incoming registers in turn, being connected thereto by the out steering circuit including relays OD0(14), EV0(14) and steering relays PA0(14) to LS0(22).

To prepare for sending out the first digit, the first steering relay is operated as soon as the marker releases. It will be remembered that only the complete local designation, registered on the registers D to K, is to be sent out as directed by the operation of relay SK3(13) under the control of the marker. Therefore when relay MRL(2) operates, a circuit is closed from battery through the winding of relay DS0(22), conductor 2200, contact 6 of relay CC(13), contact 7 of relay CC1(13), contact 6 of relay CB(13), contact 7 of relay CB1(13), contact 6 of relay CA(13), contact 7 of relay CA1(13), contact 7 of relay SK3(13), contact 6 of relay NSK(13), conductor 1310, contact 5 of relay OSC(14), conductor 1400, contact 3 of relay MF2(20), conductor 2006 to ground at contact 2 of relay MRL1(2).

Relay DS0(22) operates in this circuit and closes a locking circuit for itself over its contact 6, conductor 2202, contact 10 of relay ES0(14), conductor 2100 to ground at contact 11 of relay ON(10).

At the time that relay ON(10) operates, a circuit is closed checking that the recapture circuit is normal, which may be traced from battery through the winding of relay RCD(14), conductor 1401, contact 1 of relay SY(27), conductor 2703, contact 2 of relay RT0(21), contact 4 of relay RT1(21), contact 4 of relay RT2(21), contact 5 of relay RT4(21), contact 5 of relay RT7(21), contact 5 of relay RR(21), contact 6 of relay RR4(21), contact 7 of relay RR2(21), contact 4 of relay RR1(21), contact 1 of relay RR0(21), conductor 2100 to ground at contact 11 of relay ON(10). Relay RCD(14) operates in this circuit and, if there has been any delay in the reception of the D incoming digit locks over its contact 3, conductor 1402, contact 7 of relay RST2(4), conductor 406 contact 1 of relay DS0(22), conductor 2201, contact 9 of relay SK3(13), conductor 1313, contact 3 of relay EV(4), conductor 601 to ground at contact 11 of relay DS(6). A parallel circuit extends from conductor 2201 to ground at contact 11 of relay ES(6) thereby insuring that relay RSD(14) cannot release until the E digit, that is the digit following the one corresponding to the operated steering relay, has been received.

As soon as relay RSD(14) and relay DS0(22) are operated, a circuit is closed from battery through the winding of relay EV0(14), contact 4 of relay OD0(14), contact 2 of relay RCD(14), conductor 1403, contact 3 of relay DS0(22) to ground over conductor 2100. Relay EV0(14) operates in this circuit and locks over its contact 3, conductor 1403, contact 3 of relay DS0(22) to ground on conductor 2100.

With relays EV0(14) and DS0(22) operated, conductors 610 to 617 which have been grounded selectively by the D register are connected by way of brackets 6—22, over contacts 11 to 7 of relay DS0(22), conductors 2210 to 2217, contacts 5 to 9 of relay EV0(14), conductors 1410 to 1417, to the windings of relays RT0 to RT7(21) and RR0(21) to RR7(21), the similarly numbered RT and RR relays being connected in parallel. Since it was assumed that relays D0(6) and D4(6) were operated to register the digit 4, conductors 610 and 614 will be grounded, so that relays RT0(21), RT4(21), RR0(21) and RR4(21) are operated.

As soon as an RR or RT relay operates, the operating circuit of relay RCD(14) is opened and, if the E digit has been registered on the E register, that relay releases.

With relays RT0(21), RT4(21), RR0(21) and RT4(21) operated, a circuit is closed to check that two of the RT relays have been operated and that only two of the RR relays have been operated, this circuit extending from ground on conductor 2100, contact 2 of relay RR0(21), contact 1 of relay RT0(21), contact 1 of RR1(21), contact 1 of relay RR2(21), contact 3 of relay RT4(21), contact 5 of relay RR4(21), contact 7 of relay RR7(21), conductor 2101, contact 2 of relay MF3(20), contact 11 of relay MF2(20), conductor 2007, contact 3 and the winding of relay OSC(14) to battery. Relay OSC(14) operates in this circuit, closing a locking circuit for itself over its contact 4 to conductor 1400 and as above traced to ground at contact 2 of relay MRL1(2).

At its contact 5, relay OSC(14) opens the operating circuit for relay DS0(22) but that relay remains operated over its locking circuit above traced. At its contact 3, relay OSC(22) opens its own operating circuit and at contact 6, extends its operating ground over contact 4 of relay RCD(14), conductor 1404, contact 10 of relay SK3(13), conductor 1311, contact 8 of relay OP2(25), conductor 2509, contact 1 of relay KD(27), conductor 2511 to battery through the winding of relay SY(27). Relay SY(27) operates to indicate that the sender is ready to send out the first pulse.

Relay SY(27) at its contact 2 opens one of the previously traced connections between conductors 2700 and 2001. At its contact 4, relay SY(27) closes a circuit from battery through the winding of relay PS(27), conductor 2705, contact 2 of relay MF1(26), conductor 2612, contact 4 of relay SY(27), conductor 242 to ground at contact 1 of relay MRL(2). Relay PS(27) operates in this circuit and locks over its contact 3 directly to ground on conductor 242. With relay PS(27) operated, ground is disconnected from conductor 2001, permitting pulse generating relay PG(20) to start pulsing. With relay KP(24) operated, the condenser PG7(24) is connected over contact 2 of relay KP(24) and conductor 2414 in parallel with condenser PG(20) and the reduced battery connected to the windings of relays PCK(20) and P(20) and the lower winding of relay PG(20) is transferred from the potentiometer formed by resistances AA(27) and AB(27) to that formed by resistances AC(27), AD(27) and AF(27), with resistance AH(27) connected in series with the reduced potential in order to reduce the speed of operation of relay PG(20).

Each time that relay P(20) closes its contact 2, a circuit is closed from ground at contact 6 of relay KP(24), conductor 2415, contact 3 of jack P(20), contact 2 of relay P(20), contact 1 of jack P(20), conductor 2008, contact 11 of relay KP(24), conductor 2416, contact 4 of relay PS(27), conductor 2706, to battery through the winding of relay PG1(20).

At the first operation of relay PG1(20), the input windings of the hybrid coil MF(24) are extended over contacts 9 and 10 of relay MF(24), conductors 2412 and 2413, contacts 1 and 2 of relay PG1(20), conductors 2004 and 2005, contacts 5 and 7 of relay SST1(25), conductors 2507 and 2508, contacts 6 and 4 of relay PP1(27), conductors 2701 and 2702, contacts 6 and 7 of relay MF2(20) to conductors 2012 and 2020 leading to the multifrequency current supply.

Following is a table showing the conductor and frequency combinations for the various digits:

| Conductor | Frequency | Digit | | | | | | | | | | | |
|---|---|---|---|---|---|---|---|---|---|---|---|---|---|
| | | 0 | 1 | 2 | 3 | 4 | 5 | 6 | 7 | 8 | 9 | ST | KP |
| 2010 | 700~ | -- | x | x | -- | x | -- | -- | x | -- | -- | -- | -- |
| 2011 | 900~ | -- | x | -- | x | -- | x | -- | -- | x | -- | -- | -- |
| 2012 | 1,100~ | -- | -- | x | x | -- | -- | x | -- | -- | x | -- | x |
| 2014 | 1,300~ | x | -- | -- | -- | x | x | x | -- | -- | -- | -- | -- |
| 2017 | 1,500~ | x | -- | -- | -- | -- | -- | -- | x | x | x | x | -- |
| 2020 | 1,700~ | -- | -- | -- | -- | -- | -- | -- | -- | -- | -- | x | x |

The circuit above traced provides for the transmission of the preliminary key pulse signal to prepare the distant sender for receiving the remaining digits.

At its first operation, relay PG1(20) also closes a circuit from ground over its contact 6, conductor 2009, contact 3 of relay SST1(25), conductor 2510, contact 2 of relay PP'(27), to battery through the winding of relay PP(27). Relay PP(27) operates in this circuit and closes a locking circuit for itself from battery through its winding and the winding of relay PP'(27), contact of relay PP(27), conductor 2707 to ground at contact 4 of relay MF(24). Relay PP'(27) does not operate, being shunted by the operating circuit of relay PP(27) until relay PG1(20) releases.

At each operation of relay PG1(20) a locking circuit is closed for the operated steering relay which may be traced from ground on conductor 242 over contact 4 of relay PG1(20) and conductor 2022 to contacts 1 of relays OD0(14) and EV0(14). With relays EV0(14) and DS0(22) operated at the time of the first operation of relay PG1(20), this circuit extends over contact 1 of relay EV0(14), conductor 1405, contact 5 of relay DS0(22), to battery through the winding of relay DS0(14).

When relay PG1(20) releases at the end of the first pulse period, relay PP1(27) operates in the locking circuit of relay PP(27). With relay PP'(27) operated, resistance AH(27) is connected in parallel with resistance AD(27) to shorten the subsequent pulse periods.

When relay PG1(20) operates for the next pulse period, the input windings of the hybrid coil MF(24) are extended as previously traced to conductors 2507 and 2508, and with relay PP'(27) now operated are further extended over contacts 7 and 5 of relay PP'(27), conductors 2708 and 2709, contacts 7 and 5 of relays KP(24), and conductors 2417 and 2418, to the recapture circuit. With relays RT0(21) and RT4(21) operated, conductor 2417 extends over contact 4 of relay RT0(21), contact 4 of relay RT4(21) conductor 2110, contact 4 of relay MF2(20) to conductor 2014 leading to the multifrequency supply circuit. With relays RR0(21) and RR4(21) operated, conductor 2418 extends over contact 4 of relay RR0(21), contact 3 of relay RR4(21), conductor 2124, contact 7 of relay MF3(20) to conductor 2010 leading to the multifrequency supply circuit.

Therefore during this operated period of relay PG1(20), a pulse of 1300~ and 700~ current is transmitted to the distant office.

With relay PP'(27) operated, the operation of relay PG1(20) closes a circuit from ground over contact 6 of relay PG1(20), conductor 2009, contact 3 of relay SST1(25), conductor 2510, contact 3 of relay PP'(27), conductor 2710, contact 2 of relay EV0(14), conductor 1406, contact 4 of relay DS0(22), conductor 2203 to battery through the winding of relay ES0(14). Relay ES0(14) operates in this circuit and locks over its contact 6 and contact 10 of relay FS0(14) to ground on conductor 2100. Relay ES0(14) at its contact 10 opens one locking circuit for relay DS0(22), but relay DS0(22) is held operated under the control of relay PG1(20).

When relay PG1(20) releases at the end of the second pulse period, relay DS0(22) releases, disconnecting the recapture circuit from the D register. The release of relay DS0(22) opens the locking circuit of relay EV0(14) and that relay also releases.

The recapture circuit returns to normal opening the circuit of relay SY(27), which also releases, connecting ground to conductor 2001 to stop the pulsing circuit. With the recapture circuit normal and relay SY(27) released, the circuit previously traced for relay RCD(14) is again closed and that relay reoperates. As before, a locking circuit is provided to insure that the next digit has been received, which circuit extends as previously traced to conductor 406 and thence over contact 11 of relay ES0(14) and conductor 1407 to ground at contact 11 of relay FS(6).

With relay RCD(14) operated, a circuit is closed from battery through the winding of relay OD0(14), contact 4 of relay EV0(14), contact 1 of relay RCD(14), contact 9 of relay ES0(14) to ground on conductor 2100. Relay OD0(14) operates, locking over its contact 3 and contact 9 of relay ES0(14) to ground on conductor 2100. With relays OD0(14) and ES0(14) operated the recapture circuit is connected by way of brackets 6—14A to the E register and, since relays E0(6) and E7(6) are operated, relays RT0(21), RT7(21), RR0(21) and RR7(21) will be operated. As soon as the recapture relays operate and the F digit has been registered, relay RCD(14) releases and the circuit for relay SY(27) is again closed and that relay operates and permits the pulsing circuit to operate.

When relay PG1(20) operates, the input windings of the hybrid coil MF(24) are again connected to conductors 2417 and 2418, conductor 2417 extending over contact 3 of relay RT0(21), contact 4 of relay RT7(21), conductor 2112, contact 8 of relay MF2(20) to conductor 2710 and conductor 2418 extending over contact 3 of relay RR0(21), contact 8 of relay RR7(21), conductor 2127, contact 8 of relay MF3(20) to conductor 2017, thereby transmitting a pulse of 700~ and 1500~ current.

Relay PG1(20) closes a locking circuit for relay ES0(14) extending from ground on conductor 242 over contact 4 of relay PG1(20), conductor 2022, contact 1 of relay OD0(14), conductor 1420, contact 7 and the winding of relay ES0(14). At its contact 6, relay PG1(20) connects ground to conductor 2009, completing a circuit over contact 3 of relay SST1(25), conductor 2510, contact 3 of relay PP1(27), conductor 2710, contact 2 of relay OD0(14), conductor 1421, contact 8 of relay ES0(14) to battery through the winding of relay FS0(14). Relay FS0(14) operates, locks over its contact 6 and contact 10 of relay GS0(14) to ground on conductor 2100.

When relay PG1(20) releases at the end of the pulse period, relays ES0(14) and OD0(14) release in turn restoring the recapture circuit, after which relay SY(27) releases, relay RCD(14) reoperates, operating relay EV0(14) under the control of relay FS0(14), the recapture circuit is reset, relay RCD(14) releases, relay SY(27) reoperated and the next digit sent out.

In a similar manner the steering relays GS0(14), HS0(22), JS0(22) and KS0(22) are operated successively and the next four digits are sent out. During the sending of the seventh digit, relays LS0(22) is operated and at the end of the digit, the recapture circuit is connected with the L register. In this register, relay L7(8) is operated alone as a start indication and therefore only relays RT7(21) and RR7(21) are operated and no circuit is closed for relay SY(27), but a circuit is closed from ground on conductor 2100, contact 1 of relay RR0(21), contact 4 of relay RR1(21), contact 7 of relay RR2(21), contact 6 of relay RR4(21), contact 4 of relay RR7(21), contact 7 of relay RT7(21), conductor 2102, contact 5 of relay RST1(4), conductor 408, contact 2 of relay OSC(14), conductor 1408, contact 8 of relay KP(24), conductor 2419 to battery through the winding of relay SST1(25). Relay SST1(25) operates in this circuit and at its contact 1 connects conductor 1408 to ground on conductor 1030 to provide a locking circuit for itself. At its contact 8, relay SST1(25) connects ground over conductor 2511 to the winding of relay SY(27) operating the latter relay.

The operation of relay SY(27) permits relay PG(20) and relay PG1(20) to operate. With relays SST1(25) and PG1(20) operated, the input windings of hybrid coil MF(24) are connected as above traced to conductors 2004 and 2005 and over contact 4 and 6 of relay SST1(25), conductors 2127 and 2702, contact 8 of relay MF3(20) and contact 7 of relay MF2(20) to conductors 2017 and 2020 leading to the multifrequency supply, thereby transmitting a pulse comprising frequencies 1500~ and 1700~ as a start pulse.

With relay SST1(25) operated, the operation of relay PG1(20) also closes a circuit from ground over its contact 6, conductor 2009, contact 2 of relay SST1(25), conductor 2512 to battery through the winding of relay FP(27). Relay FP(27) operates in this circuit and locks over its contact 1, conductor 2711 to ground at contact 9 of relay OP2(25). When relay PG1(20) releases at the end of the pulse period, a circuit is closed from ground over contact 5 of relay PG1(20), conductor 2023, contact 3 of relay SY(27), contact 2 of relay FP(27) to conductor 2001 to prevent further pulsing. At the same time, a circuit is closed from ground on conductor 242 over contact 3 of relay PG1(20), conductor 2024, contact 2 of relay PS(27), contact 3 of relay FP(27), conductor 2712, contact 5 of relay MF1(26), conductor 2613 to battery through the winding of relay AV(10).

Relay AV(10) operates in this circuit and locks over its contact 2 and conductor 1037 to ground at contact 3 of relay MRL1(2). Relay AV(10) closes a circuit from battery through the winding of relay AV1(10), contact 1 of relay AV(10), conductor 1038, contact 6 of relay RST2(4), contact 4 of relay SYN(4), conductor 409 to ground at contact 9 of relay S(10). Relay AV1(10) locks over its contact 2 and conductor 1906 to ground at contact 2 of relay S(10). Relay AV1(10) opens the circuit of relay SP(2) in the sender and relay SP(1) in the trunk circuit and these two relays release.

The release of relay SP(2) opens the circuit of relay SP1(2) and that relay releases, in turn releasing relays ON(10) and ON1(2), thereby opening the various off-normal grounds and permitting the sender to restore to normal. Relay ON1(2) is made slow to release to insure that relay SP(1) will release and assume control over the incoming and outgoing trunk link switches before the sender removes the holding ground.

With relay SP(1) released, outgoing conductors 122 and 123 are disconnected from the sender and are extended over contacts 1 and 6 of relay SP(1) through the windings of retard coil A(1) over contacts 1 and 4 of relay IR(1), resistances LOA(1) and LOB(1) over contact 2 of relay C0(1) to conductor 119 for pad control purposes. Outgoing conductors 124 and 125 are connected over contacts 11 and 15 of relay SP(1), windings of retard coil B(1), resistances SV(1), contact 6 of relay C0(1) to battery through the winding of supervisory relay SV(1). Conductor 118 over which the switches are held, is connected over contact 16 of relay SP(1) to ground at contact 1 of relay C0(1).

In the outgoing trunk of Fig. 15, conductors 1502 and 1503, to which conductors 122 and 123 are connected, extend through the windings of retard coil B(15) windings of relay R(15), contact 1 or relay SL(15) to conductor 1513 for pad control purposes. Conductors 1504 and 1505, to which conductors 124 and 125 are connected, extend through the windings of retard coil A(15) through the upper and middle windings of relay L0(15) and over contact 12 of relay OS (15), resistance SV(15), contact 9 of relay SL(15) to conductor 1508. Until the sender 2508 at the distant office has completed its functions, battery remains connected to conductor 1508, relay SV(1) remains unoperated and ground remains connected to conductor 105 leading to the toll board.

The equipment at the distant toll office functions in a manner similar to that described for the near toll office to connect the incoming trunk of Fig. 23 over trunk link switches 2312 to an outgoing trunk 2313 and thence to the wanted local office 2301 where the connection to the wanted line 2300 is established, relay SV(23) remaining unoperated until the called subscriber answers. The operation of relay SV(23), in response to the off-hook signal, connects battery to conductor 2303, causing the composite signaling circuit 1520 to operate relay SV(1) which in turn connects battery to conductor 105 to transmit the off-hook signal to the toll board 102.

If the call is terminated first by the subscriber at substation 2300, relay SV(23) is released, connecting ground to conductor 2303 leading to the composite signaling circuit 1520, which in turn connects battery to conductor 1508 to release relay SV(1). Relay SV(1) connects ground to conductor 105 as an on-hook signal to the toll board 102.

When the connection is released at the originating office, ground is removed from conductor 104, releasing relay LC(1). With relay LC(1) released, a circuit is closed from battery through the winding of relay IR(1), contact 9 of relay SP(1), contact 6 of relay LC(1) to ground at contact 6 of relay IN(1). Condenser TM(1) now charges in a circuit from +130-volt battery through resistance lamp B(1), contact 1 of relay IN(1), contact 1 of relay LC(1), resistance B(1), condenser TM(1), resistance TM(1) to ground. Condenser TM(1) is connected across the control gap of tube TM(1) to ground through the upper winding of relay IN(1), while +130-volt battery is connected to the other side of the main gap of tube TM(1). When the potential on condenser TM(1) builds up to the point where tube TM(1) fires, the current flow through the main gap and the upper winding of relay IN(1) is sufficient to overcome the current flow through the lower winding of that relay and relay IN(1) releases, quenching the tube.

Relay IN(1) opens the locking circuit of relay C0(1) and the operating circuit of relay IR(1) releasing both relays. Relay C0(1) opens the simplex circuits to conductors 122, 123, 124 and 125 and then disconnects ground from conductor 118 permitting the trunk link switches to release.

The removal of ground from conductor 118 and the release of the trunk link switches, releases relay OS(15) in the outgoing trunk. Relay OS(15) opens the operating circuit for relay G(15) but that relay is locked as previously described. With relay OS(15) released, the +130-volt supply is connected over contact 4 of relay G(15) and contact 1 of relay OS(15) to one side of the main gap of tube TM(15), the other side of which is connected to ground through the upper winding of relay G(15). This +130-volt battery is also connected through resistance B(15) to condenser TM(15) which is also connected through resistance A(15) to the control gap of tube TM(15). Condenser TM(15) charges and when the potential on condenser TM(15) reaches the breakdown potential of the control gap, the tube TM(15) fires. The current flow in the upper winding of differential relay G(15) overcomes the flow through the lower winding and relay G(15) releases.

With relay OS(15) released, ground is connected over contact 8 of relay OS(15), contact 1 of relay L0(15), contact 2 of relay G(15), contact 5 of relay L0(15) to conductor 1501 to continue to mark the trunk busy to the marker until relay G(15) releases. At its contact 9, relay OS(15) opens the locking circuit of relay SL(15) and that relay releases. At contact 10, relay OS(15) removes battery from conductor 1507 leading to the composite signaling circuit and at contact 11, connects ground to that conductor as a disconnect signal to the distant toll office.

When relay G(15) releases it quenches tube TM(15), removes ground from the individual busy conductor 1501 and recloses ground to the group busy conductor 1500.

The removal of battery from conductor 1507 causes the composite signal circuit to remove ground from conductor 2302 leading to the incoming trunk circuit at the distant toll office and that circuit releases in substantially the manner described for the trunk circuit of Fig. 1, in turn releasing the trunk link switches 2312, the outgoing trunk 2313 and the equipment at the local office 2301.

*Multifrequency call to local cross-bar office—unguarded trunk*

If a call is to be terminated at a local cross-bar office, for example office 1600, the operation of the incoming trunk and sender link and the seizure of the sender will be the same as previously described. However, the designation registered will be a seven-digit designation, the three office code digits being registered on the A, B and C registers of Fig. 5, the four numerical digits being registered on the D, E, F and G registers of Figs. 6 and 7 and the start signal on the H register of Fig. 7. The code digits are transferred to the marker which translates the designation and operates route relay XB(18). With relay XB(18) operated the marker determines that multifrequency pulses are required and that an unguarded trunk will be selected and therefore operates relays in the code conversion register and class register which in turn ground conductors 1308, 2400 and 2601, resulting in the operation of relays SK3(13), MF(24) and DLC(26).

Figure 16:
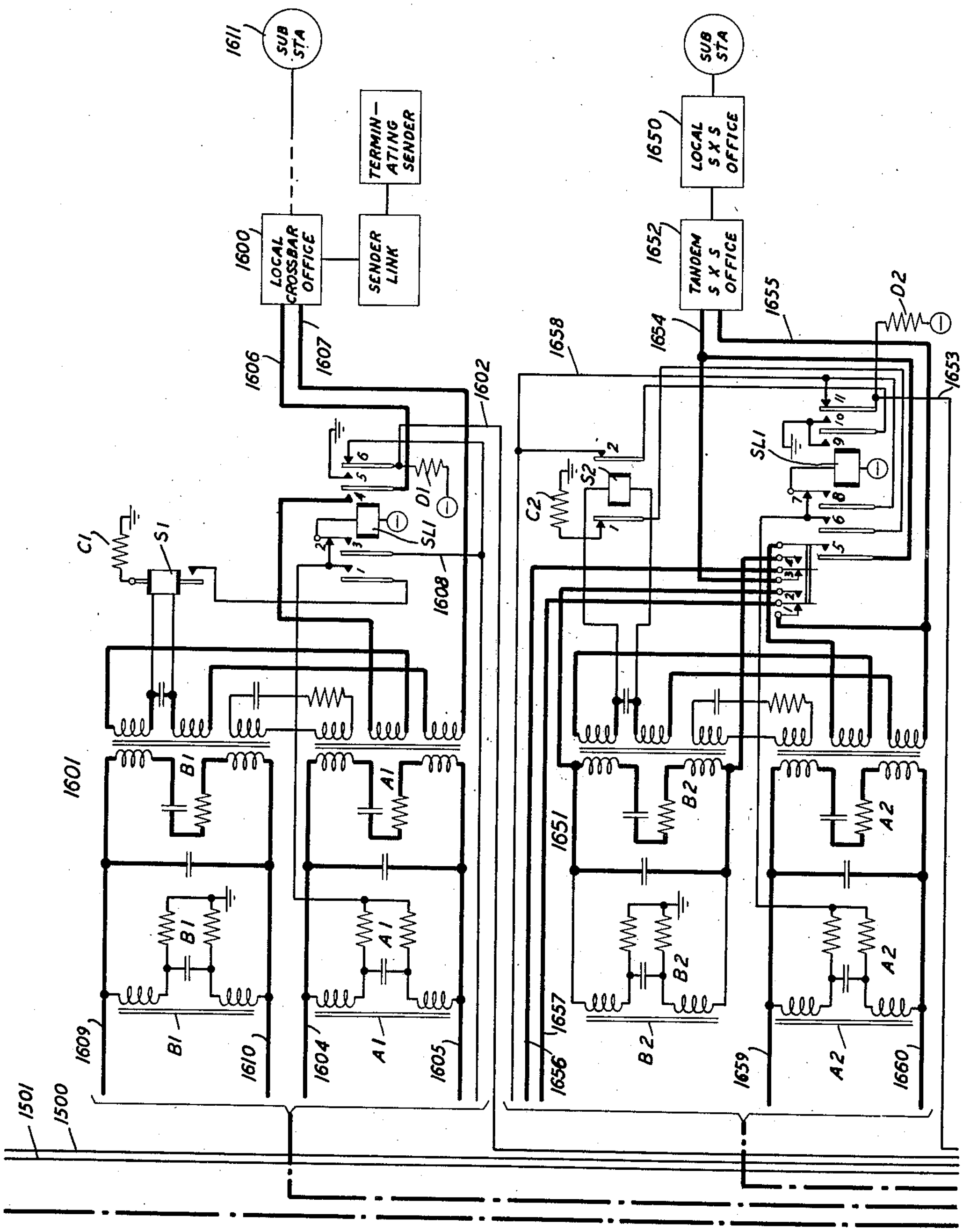
Fig. 16 shows an outgoing trunk leading to a cross-bar local office and an outgoing trunk leading to a local step-by-step office.

A trunk circuit 1601 outgoing to office 1600 is shown in Fig. 16 which is marked idle to the marker by the connection of battery through resistance D1(16) to conductor 1602. Assuming that trunk circuit 1601 is selected by the marker, it will be connected with the trunk circuit of Fig. 1 under the control of the marker in the manner described for connecting the trunk circuit of Fig. 15 with the trunk circuit of Fig. 1. As soon as this connection is closed, ground on conductor 118 is extended over the trunk switches to conductor 1603 and over contact 6 of relay S4(16) to conductor 1602 to mark trunk 1601 busy.

In the sender, the operation of relay MF(24) causes the operation of relays MF1(20), MF2(20) and MF3(20) as previously described.

When the marker has selected trunk circuit 1601, relay TKS(26) is operated, initiating the trunk guard timing operation previously described.

With relays DLC(26) and MF1(26) operated, the operation of relay MRL(2) to indicate that the marker has completed its functions, connects ground to conductor 242 which is extended over contact 6 of relay DLC(26) and contact 6 of relay MF1(26) to conductor 2626. When relay TC5(24) operates, at the end of a 500-millicycle interval, ground from conductor 2626 is extended to conductor 2405 to start the supplementary timing interval at the end of which relay TKS2(23) operates as previously described, in turn operating relay TCA(26), followed by relay KP(24).

As soon as relay TCA(26) operates, the circuit through the left winding of relay SL(25) is closed, extending as previously traced to conductors 124 and 125 outgoing from the trunk circuit of Fig. 1, and through the trunk link switches to conductors 1604 and 1605 of the trunk circuit 1601 through the windings of retard coil A1(16) and resistances A1(16) over contact 2 of relay SL1(16) to battery through the winding of relay SL1(16). Relay SL(25) operates, in turn operating relay SL1(25), which locks under the control of relay TKS(26) and closes the circuit through the right winding of relay SL(25) to operate relay SL1(16) in the trunk circuit. Relay SL1(16) when operated locks over its contact 3, to conductor 1603 which extends through the trunk link switches to conductor 118 and thence as traced for the previously described call to ground at contacts 3 and 4 of relay ON1(2). Relay SL1(16) connects direct ground to conductor 1602 to hold the busy marking on that conductor. Relay SL1(16) extends the circuit of relay SL(25) to the contact of relay S1(16) and connects relay S1(16) through the right windings of repeating coils A1(16) and B1(16) over contact 4 of relay SL1(16) to conductors 1606 and 1607 leading to the local cross-bar office 1600 as a calling signal to that office. The local office 1600 supplies battery and ground in the direction to operate relay S1(16) as an off-hook signal and the closure of ground through resistance C1(16) to the circuit of relay SL(25) causes that relay to release.

With relay SL(25) released and relay SL1(25) operated, relays OP(25) and OP1(25) are operated. The operation of relay OP1(25) causes the release of relay MF7(25) to measure a time interval and transfers the supervisory simplex circuit as previously described to the lower windings of hybrid coil MF(24) in parallel with retard coil MF2(24) and to battery through the windings of relays TG(29) and OF(29). With relay DLC(26) operated, the operation of relay OP2(25) is made to depend on the successive reception of an off-hook signal and an on-hook signal. If the off-hook signal is not received the sender cannot complete its operation. With relay S1(16) operated as an off-hook signal, relay OF(29) operates, closing a circuit from ground over its contact 1, conductor 2904, contact 6 of relay XDD(26), conductor 2614, contact 4 of relay TG1(29), conductor 2905, contact 1 of relay OP2(25), conductor 2513, contact 12 of relay MF1(26), conductor 2615 to battery through the right winding of relay OF1(29). Relay OF1(29) operates in this circuit and closes a locking circuit for itself from battery through its left winding and over its contact 3, conductor 2906, contact 13 of relay MF1(26), contact 8 of relay DLC(26), conductor 2406 to ground at contact 1 of relay MRL1(2).

When the local cross-bar office has called in a terminating sender and is ready to receive pulses, it reverses the connection of battery and ground to relay S1(16) as an on-hook signal and that relay releases, in turn releasing relay OF(29). A circuit is now closed from ground, over contact 2 of relay OF(29), conductor 2903, contact 1 of relay MF1(26), conductor 2616, contact 2 of relay OF1(29), conductor 2611, contact 1 of relay MFT(25), contact 7 of relay OP1(25), contact 3 of relay FL(25), to battery through the winding of relay OP2(25).

With relay OP2(25) operated the multifrequency pulsing circuit and the balancing circuit are closed as previously traced, extending in trunk circuit 1601 through the windings of repeating coils A1 and B1 to conductors 1606 and 1607 leading to the cross-bar office 1600. The transmission of the designation to the cross-bar office takes place as described for the intertoll call except that, since the start signal is recorded on the H register, only four digits are sent out. The release of the sender and the operation of the trunk circuit of Fig. 1 are the same as for the intertoll call. The equipment at the cross-bar office completes the connection to the called line, for example to substation 1611.

The pad control simplex circuit of the trunk of Fig. 1 extending to conductors 122 and 123 is terminated at trunk circuit 1601 over conductors 1609 and 1610, windings of retard coil B1(16), resistances B1(16) and ground. The supervisory simplex circuit extending from the winding of relay SV(1) to conductors 124 and 125 of the trunk circuit of Fig. 1 is terminated at trunk circuit 1601 over conductors 1604 and 1605, windings of retard coil A1, resistances A1, contact 1 of relay SL1(16) to contact of relay S1(16). When the subscriber at substation 1611 answers, relay S1(16) operates to connect ground through resistance C1(16) to the supervisory circuit, operating relay SV(1) which connects battery through resistance lamp A(1) to conductor 105 to inform the originating office that the call has been answered.

Disconnection at the cross-bar office 1600 releases relay S1(16) which in turn releases relay SV(1) and causes the connection of ground to conductor 105 as a disconnect signal. Disconnection at the originating office brings about the release of the trunk circuit of Fig. 1 in the manner previously described. The removal of ground from conductor 118 releases relay SL1(16) which immediately removes ground from conductor 1602 to make the trunk reselectable and opens the circuit of relay S1(16) to release the equipment at the local cross-bar office 1600. The time measured by the sender permits the local office to restore to normal, in the case of an immediate reseizure, before the sender connects with the trunk.

*Dial pulse call to local step-by-step office—unguarded trunk*

If a call is to be terminated at a local step-by-step office, for example office 1650, the operation of the incoming trunk and the sender link, the seizure of the sender and the registration of the designation will take place as for the local cross-bar call.

When the code digits have been registered, the marker is seized and the code transferred to the marker. The marker having translated the code, operates the corresponding route relay SXS(18). Since this is a terminating call the registration set up by route relay SXS(18) on the code conversion register will cause the grounding of conductor 1308 to operate relay SK3(13). Assuming that office 1650 is reached through the tandem step-by-step office 1652, a preliminary digit is required to operate the selector at office 1652 which is provided by the code conversion register by grounding two of the conductors 1300 to 1307, for example, conductors 1301 and 1304 thereby operating relays CU1(13) and CU4(13). Relays CU1(13) and CU4(13), with relay SK3(13) operated close a circuit from ground at their contacts 3 over conductor 1312, contact 1 of relay SK3(13) to battery through the winding of relay CC(13) operating the latter relay.

Assuming that the trunk to be selected is unguarded and is arranged for loop dialing, the registration set up in the class register will cause conductors 2601 and 2800 to be grounded, operating relays DLC(26) and LPD(28). To further illustrate the operation of the sender, it will also be assumed that office 1650 is of the community dial type, employing common control equipment, and that a delay may be expected before that office is ready to receive pulses. On that assumption the class register will also ground conductor 2891, operating relay XSG(28). Relay LPD(28) operated, connects ground over its contact 7 to conductor 2808, operating relays DP(28) and DP1(28). At its contact 8, relay LPD(28) connects ground to conductor 2809, completing a circuit over contact 1 of relay LSS(30), contact 4 of relay SXR(30) to battery through the winding of relay R(30).

The marker proceeds to test for an idle trunk. Trunk circuit 1651 is marked idle by the connection of battery through resistance D2(16) to conductor 1653. Assuming that trunk circuit 1651 is selected, the marker will operate the trunk link switches, connecting trunk circuit 1651 to the trunk circuit of Fig. 1. When this connection has been completed, ground connected to conductor 118 from the sender is extended through the trunk link switches to conductor 1658 and over contact 11 of relay SL2(16) to conductor 1653 to inform the marker that the connection has been completed.

As previously described, as soon as trunk circuit 1651 is selected, the marker operates relay TKS(26) in the sender and when the connection is completed and the marker is ready to release, it operates relay MRL(2) which in turn operates relay MRL1(2).

The operation of relay TKS(26) initiates the trunk guard timing operation as previously described. However the relays DLC(26) and LPD(28) operated, the timing continues for 700 milli-seconds, that is, until relay PC6(31) has operated, after which the supplementary interval terminates in the operation of relay TKS2(28).

Relay TKS2(28) operates relay TCA(26) the circuit extending from battery through the winding of relay TCA(26), conductor 2806, contact 3 of relay TKS(28), contact 3 of relay LPD(28), conductor 2807, contact 6 of relay DLC(26), conductor 242 to ground at contact 1 of relay MRL(2).

With relay MRL1(2) operated, ground connected to conductor 1312 by relays CU1(13) and CU4(13) is extended by way of brackets 2—13, contact 4 of relay MRL1(2), conductor 243 through brackets 2—13, contact 6 of relay SK3(13) to battery through the winding of relay CC1(13). With relays CC(13) and CC1(13) operated, a circuit is closed for out-steering relay CSO(14) which may be traced from battery through the winding of relay CS0(22), conductor 2204 through brackets 13—22C, contact 7 of relay CC(13), contact 6 of relay CC1(13), contact 6 of relay CB(13), contact 7 of relay CB1(13), contact 6 of relay CA(13), contact 7 of relay CA1(13), contact 7 of relay SK3(13), contact 6 of relay NSK(13), conductor 1310, contact 5 of relay OSC(14), conductor 1400, contact 12 of relay DP1(20), conductor 2006 to ground at contact 2 of relay MRL1(2). Relay CS0(22) operates in this circuit and locks over its contact 6 and contact 2 of relay DS0(22), conductor 2100 to ground at contact 11 of relay ON(10).

Relay RCD(14) is operated as previously described to check that the recapture circuit is normal. Therefore, when relay CS0(22) operates, a circuit is closed for relay OD0(14) extending from battery through the winding of relay OD0(14), contact 4 of relay EV0(14), contact 1 of relay RCD(14), conductor 1409, contact 3 of relay CS0(22) to ground on conductor 2100. Relay OD0(14) operates and locks over its contact 3 to conductor 1409 independent of relay RCD(14).

With relays OD0(14), CS0(22), CC(13), and CC1(13) operated, the recapture relays are connected over contacts 5 to 9 of relay OD0(14), contacts 8 to 12 of relay CS0(22) by way of brackets 13—22C, contacts 1 to 5 of relay CC1(13) to conductors 1320 to 1327 which are grounded by the operated ones of relays CU0(13) to CU7(13). Since it was assumed relays CU1(13) and CU4(13) were operated, conductors 1321 and 1324 will be grounded, operating relays RT1(21), RT4(21), RR1(21) and RR4(21) in the recapture circuit. As soon as these relays operate, relay RCD(14) releases.

Figure 20:
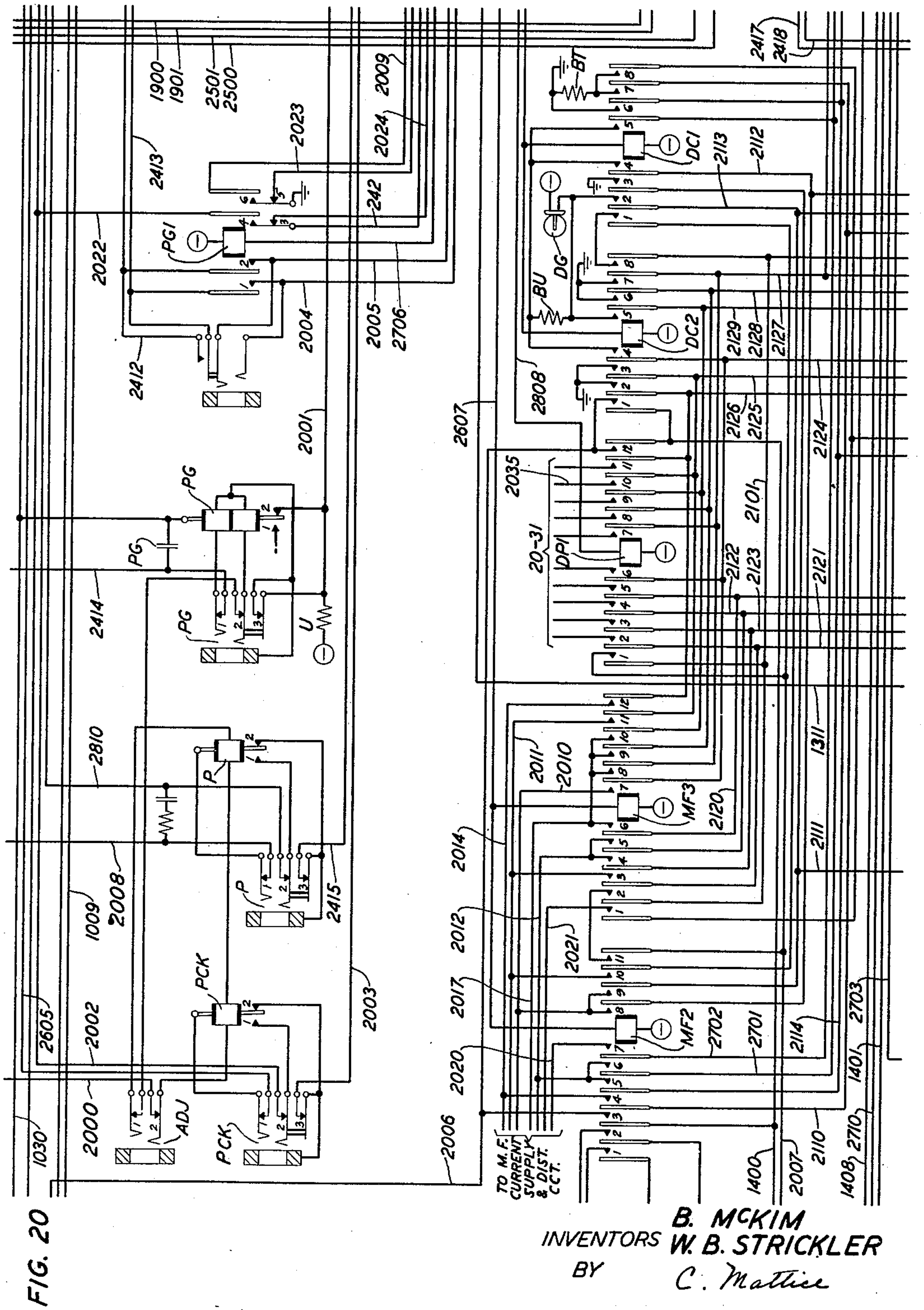
Figure 21:
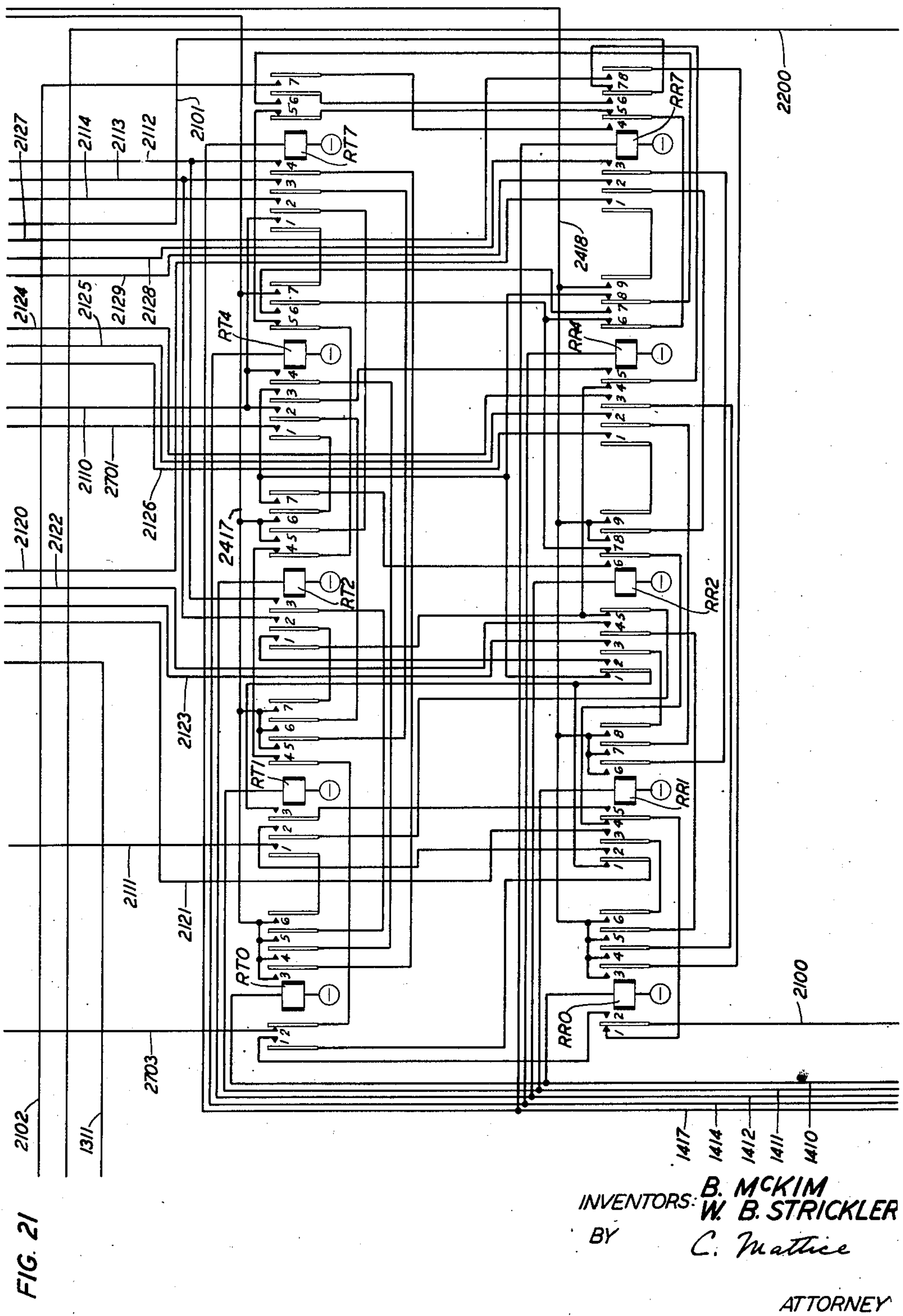
Figure 22:
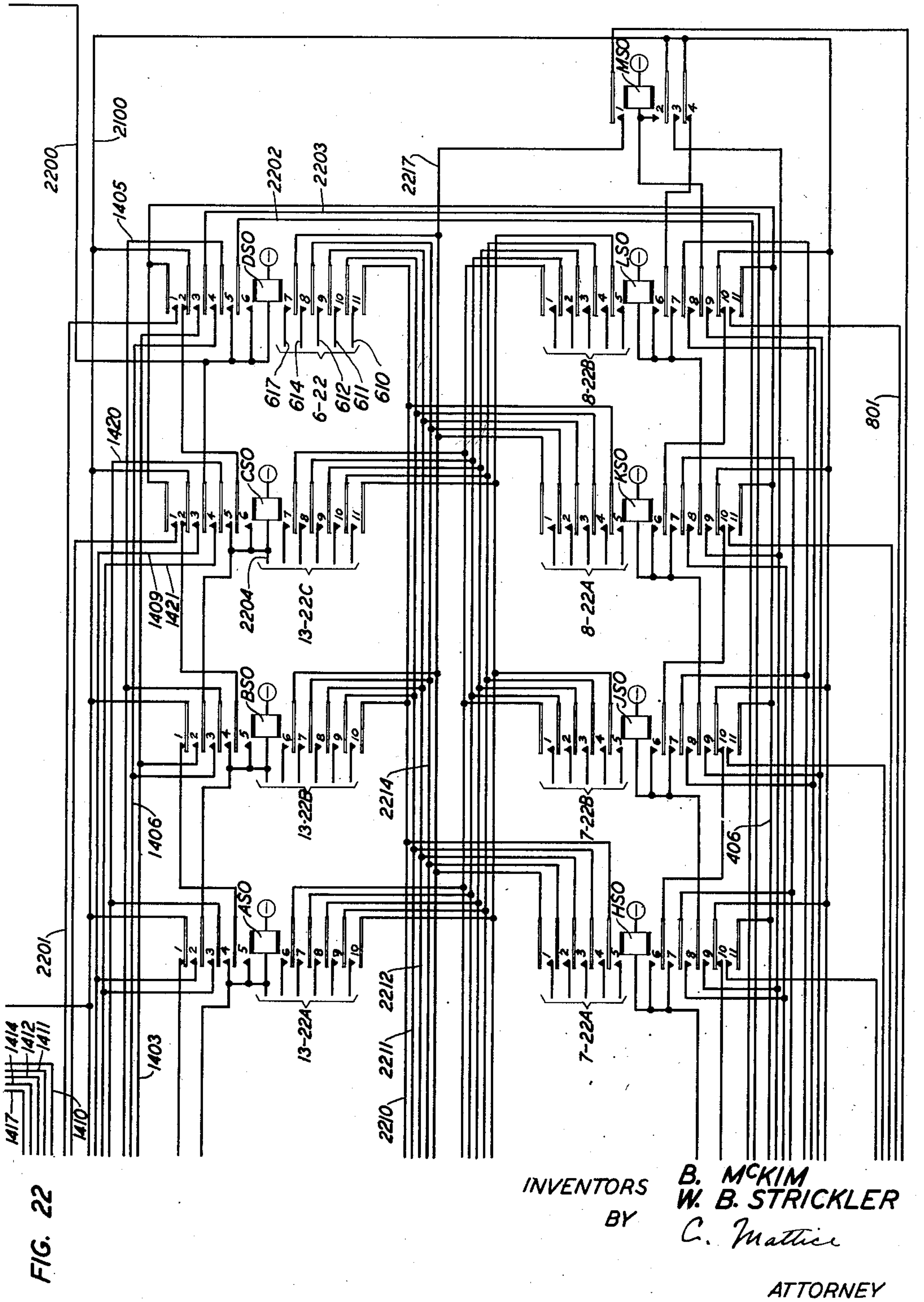

For this type of call, since relay KP(24) is not operated, the pulsing relays of Fig. 20 are operated in the same circuit as for the timing cycle, ground being connected to conductor 2001 under the control of relay SY(27) as previously traced to energize these relays in a direction to hold their contacts 1 closed.

As soon as relay TCA(26) operates, the sender establishes a circuit with the outgoing trunk to determine whether the step-by-step office is ready to receive pulses. This circuit may be traced from conductor 1654 leading to office 1652 over contact 3 of relay SL2(16), conductor 1656, connected over the trunk link switches to conductor 122, contact 4 of relay SP(1), conductor 117, through the sender link to conductor 1017, contact 6 of relay MT(19), conductor 1909, contact 3 of relay TCA(26), conductor 2617, contact 1 of relay 20C1(30), conductor 3004, contact 10 of relay LPD(28), conductor 2810, contact 8 of relay BD(29), conductor 2420, contact 1 of relay LPD(28), resistance AN(28), conductor 2901 through the windings of relays TG(29) and OF(29), in parallel with resistance AP and contact 2 of relay LPD(28), and thence over conductor 2408, contact 2 of relay FL1(29), conductor 2907, contact 9 of relay LPD(28), conductor 2811, contact 3 of relay 20C1(30), conductor 3005, contact 2 of relay TCA(26), conductor 1910, contact 8 of relay MT(19), conductor 1016 through the sender link to conductor 116, contact 5 of relay SP(1), conductor 123, through the trunk link switches to conductor 1657, contact 1 of relay SL2(16) and conductor 1655 to office 1652. Office 1652 connects battery and ground to conductors 1654 and 1655 in a direction to operate relay TG(29) but not relay OF(29).

Relay TG(29) operates, closing a circuit from ground over contact 2 of relay OF(29), contact of relay TG(29), conductor 2908, contact 1 of relay DP(28), conductor 2812, contact 2 of relay XDD (26), conductor 2618, contact 5 of relay FL(25), conductor 2514, contact 1 of relay SG1(28), conductor 2812 to battery through the winding of relay TG1(29). Relay TG1(29) operates in this circuit and locks over its contact 2 and conductor 2909 to ground at contact 6 of relay DP(28).

When the recapture circuit has been operated the circuit of relay OSC(14) is closed, extending from battery through the winding of relay OSC(14) and over its contact 3, conductor 2007, contact 1 of relay DP1(20), conductor 2101, contact 7 of relay RR7(21), contact 5 of relay RR4(21), contact 3 of relay RT4(21), contact 1 of relay RR2(21), contact 3 of relay RT1(21), contact 5 of relay RR1(21), contact 1 of relay RR0(21) to ground over conductor 2100. Relay OSC(14) operates and locks over its contact 4, conductor 1400, contact 12 of relay DP1(20), conductor 2006 to ground at contact 2 of relay MRL1(2). With relay OSC(14) operated, ground supplied through the recapture circuit to conductor 2007 as above traced is extended over contact 6 of relay OSC(14), contact 4 of relay RCD(14), conductor 1404, contact 10 of relay SK3(13) to conductor 1311. When relay TG1(29) is operated, this ground is extended over contact 1 of relay TG1(29), conductor 2509, contact 1 of relay KD(27), conductor 2511 to battery through the winding of relay SY(27). Relay SY(27), in operating, disconnects ground from conductor 2001 permitting the pulsing relays to start operating.

The armature of relay PCK(20) is grounded for this type of call over contact 1 of jack PCK(20), conductor 2605, contact 2 of relay DP(28), conductor 2604 and contact 3 of relay TKS(26). With contact 1 of relay PCK(20) closed, the circuit previously traced for relay PA(31) is closed and that relay operates, locking through the winding of relay PB(31) as before, relay PB(31) remaining unoperated.

When pulsing starts, the first opening of contact 1 of relay PCK(20) permits relay PB(31) to operate. When relay PCK(20) recloses its contact 1, ground connected to conductor 2002 by that contact is extended in the manner previously described to the winding of relay PC(31) operating that relay. Relay PC(31) locks through the left winding of relay PE(31) as previously described, relay PE(31) remaining unoperated.

When relay PC(31) operates, it closes a circuit from battery through the winding of relay BD(29), conductor 2910, contact 1 of relay PC(31), conductor 3110, contact 4 of relay W(30), conductor 3013, contact 10 of relay TCA(26), conductor 2619, contact 1 of relay DE1(30), conductor 3006 to ground at contact 7 of relay DP(28). Relay BD(29) operates in this circuit, locking over its contact 5 to ground over conductor 3110 as above traced.

When relay BD(29) operates it closes a shunt around the windings of relays OF(29) and TG(29) and opens a shunt around contact 1 of pulsing relay P(20) so that a pulsing circuit is established leading to office 1652, which extends as previously traced from office 1652 to conductor 2810, over contact 2 of jack P(20), contact 1 of relay P(20), contact 1 of jack P(20), conductor 2008, contact 12 of relay KP(24), conductor 2420, contact 7 of relay BD(29), contact 2 of relay FL1(29) to conductor 2907 and thence as traced to office 1652. At this time contact 1 of relay P(20) is closed.

When relay P(20) opens its contact 1, it transmits a simulated dial pulse to office 1652. At the same time relay PCK(20) opens its contact 1 to permit relay PE(31) to operate. With relay PE(31) operated, relay PC1(31) is operated to count the first pulse, as previously described, ground being supplied to the contacts of relay PE(31) for this purpose over conductor 2802, contact 2 of relay BD(29), conductor 3002, contact 4 of relay DE2(30) and conductor 2605.

The subsequent pulses transmitted by relay P(20) to the distant office are counted by the operation of relays PC1(31) to PC6(31) under the control of relay PCK(20) in the same manner as described for the timing operation. Since relays RR1(21) and RR4(21) are operated in the recapture circuit, when relay PC5(31) is operated to count the fifth pulse, a circuit is closed from ground at contact 9 of relay TCA(26), conductor 2620, contact 3 of relay Z(30), conductor 3007, contact 4 of relay DP(28), conductor 2418, contact 7 of relay RR1(21), contact 2 of relay RR4(21), conductor 2125, contact 10 of relay DP1(20), conductor 2035 through brackets 20—31, contact 6 of relay PC5(21), contact 4 of relay PC6(31), conductor 3109 to battery through the winding of relay DE1(30).

At this time contact 2 of relay PCK(20) is closed and relay DE1(30) cannot operate, but at the end of the pulse when relay PCK(20) opens its contact 2 and closes its contact 1, relay DE1(30) operates, connecting the winding of relay DE2(30) to conductor 2804. As soon as relay DE1(30) operates it opens the locking circuit of relay BD(29) and that relay releases, closing the previously traced circuit through the windings of relays TG(29) and OF(29) and in shunt of the contact of relay P(20) so that no more pulses can be sent out although the pulsing relays continue to operate. At the beginning of the next pulse, relay DE2(30) operates, closing a locking circuit for relay DE1(30), over its contact 1 and contact 5 of relay DE1(30) to conductor 2804 and opening the locking circuit for the counting relays PC1(31) and PC5(31), for relays PA(31) and PB(31) and for relays PC(31) and PE(31). Relay PB(31) in releasing opens the operating circuit for relays PC(31) and PD(31).

With relay DE1(30) operated, a circuit is closed from battery through the winding of relay W(30), contact 2 of relay WR(30), contact 2 of relay W(30), conductor 3008, contact 2 of relay TKS2(28), conductor 3003, contact 3 of relay DE1(30) to ground on conductor 1030. Relay W(30) operates in this circuit, further opening the circuit of relay BD(29) and locks over contact 2 of relay WR(30), contact 3 of relay W(30), conductor 3009, to ground at contact 5 of relay TKS(26). Relay W(30) also closes a circuit from battery through resistance AM(30), winding of relay Z(30), contact 3 of relay W(30) to conductor 3009 but relay Z(30) is shunted over its contact 5 by the operating circuit of relay W(30).

The release of the counting relays opens the operating circuit of relay DE1(30) and when relay PCK(20) opens its contact 2, relays DE1(30) and DE2(30) release, permitting relay Z(30) to operate. At the same time relay PCK(20) reoperates relay PA(31), and relays PA(31), PB(31), PC(31), PE(31) and PD(31) are operated as previously described to measure the interdigital interval.

Figure 31:
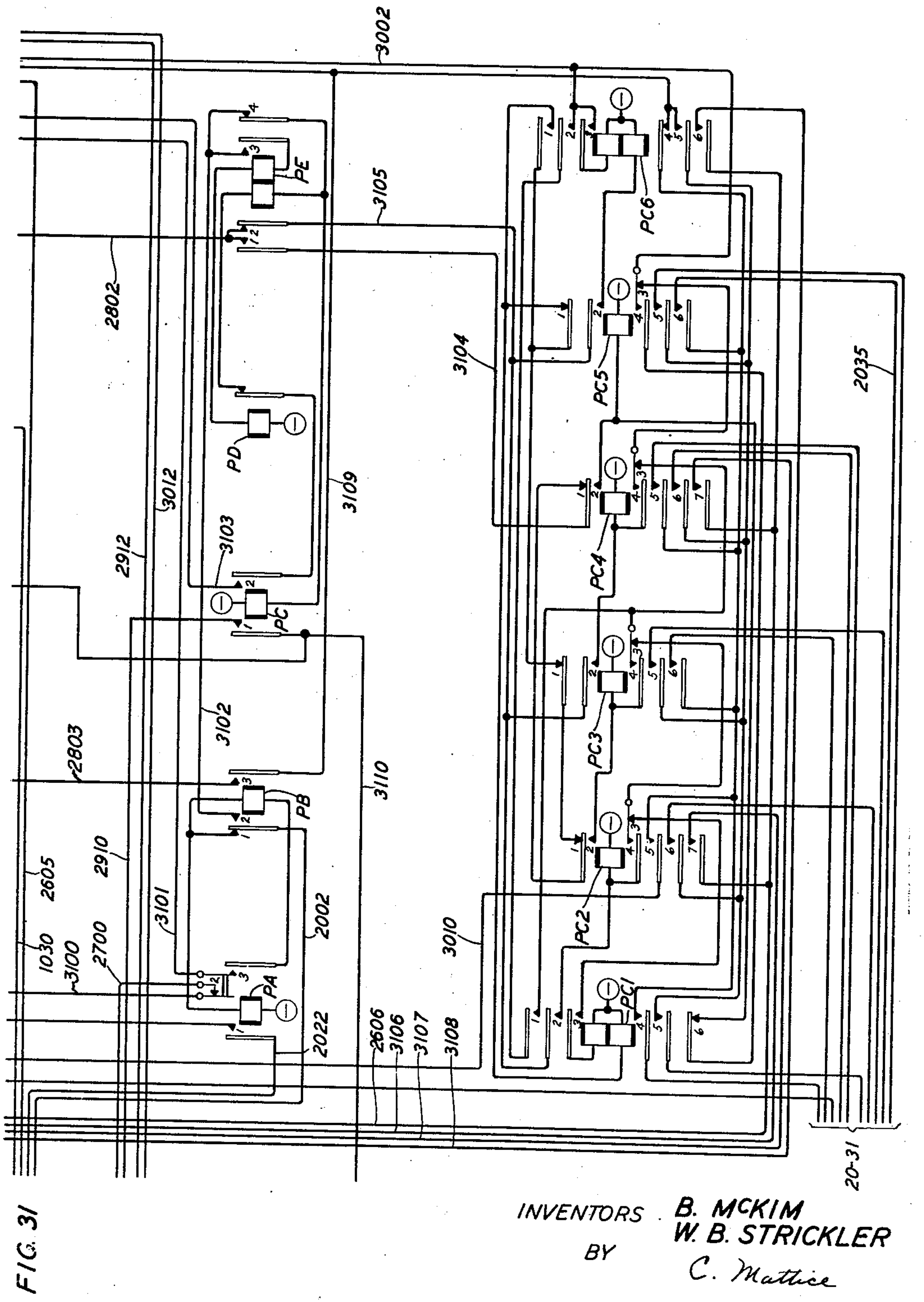

At this time since relay BD(29) is released a substitute operating circuit for the counting relays is provided, which extends to contacts 1 and 2 of relay PE(31) over conductor 2802, contact 1 of relay W(30), contact 1 of relay WR(30), contact 6 of relay Z(30), conductor 3002, contact 4 of relay DE2(30) from ground on conductor 2605. With relay Z(30) operated, the operation of relay PC2(31) closes a circuit from ground at contact 9 of relay TCA(26), conductor 2620, contact 2 of relay Z(30), conductor 3010, contact 5 of relay PC2(31), contact 4 of relay PC6(31), conductor 3109 to battery through the winding of relay DE1(30). When relay PCK(20) opens its contact 2, relay DE1(30) operates as before, closing a circuit from ground on conductor 1030, contact 3 of relay DE1(30), conductor 3003, contact 2 of relay TKS2(28), conductor 3008, contact 4 of relay Z(30) to battery through the winding of relay WR(30). Relay WR(30) operates opening the counting relay operating circuit and the locking circuit of relay W(30) which now releases, but relay Z(30) remains operated over contact 2 of relay W(30) and conductor 3008 under the control of relay DE1(30). Relay DE1(30) in turn operates relay DE2(30) to release counting relay PC2(31) and the other pulse responsive relays of Fig. 31.

When relay PCK(20) opens its contact 2, relays DE1(30), DE2(30), Z(30) and WR(30) release. If relay SY(27) has not been operated at this time, ground is connected to conductor 2001 to stop the pulsing relays.

When relay BD(29) operated at the beginning of the transmission of the first digit as above described, it closed a circuit from ground over its contact 3 to conductor 2022, contact 1 of relay OD0(14), conductor 1420, contact 5 of relay CS0(22) to battery through the winding of the latter relay, to hold that relay operated. At its contact 4, relay BD(29) connects ground to conductor 2710, completing a circuit over contact 2 of relay OD0(14), conductor 1421, contact 4 of relay CS0(22) to battery through the winding of relay DS0(22). Relay DS0(22) operates and locks as previously described under the control of relay ES0(14) and opens one locking circuit for relay CS0(22).

Figure 13:
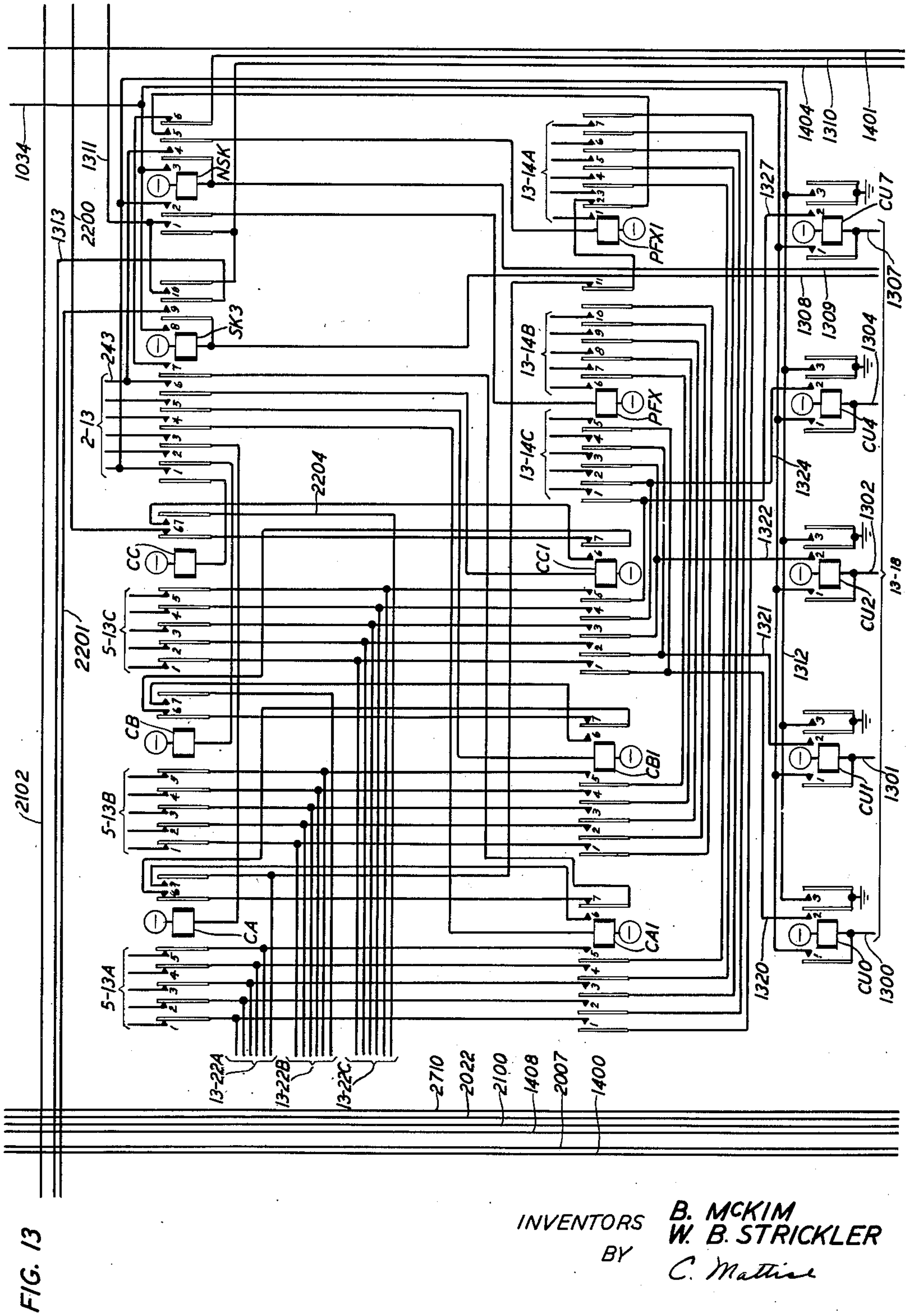
Figure 14:
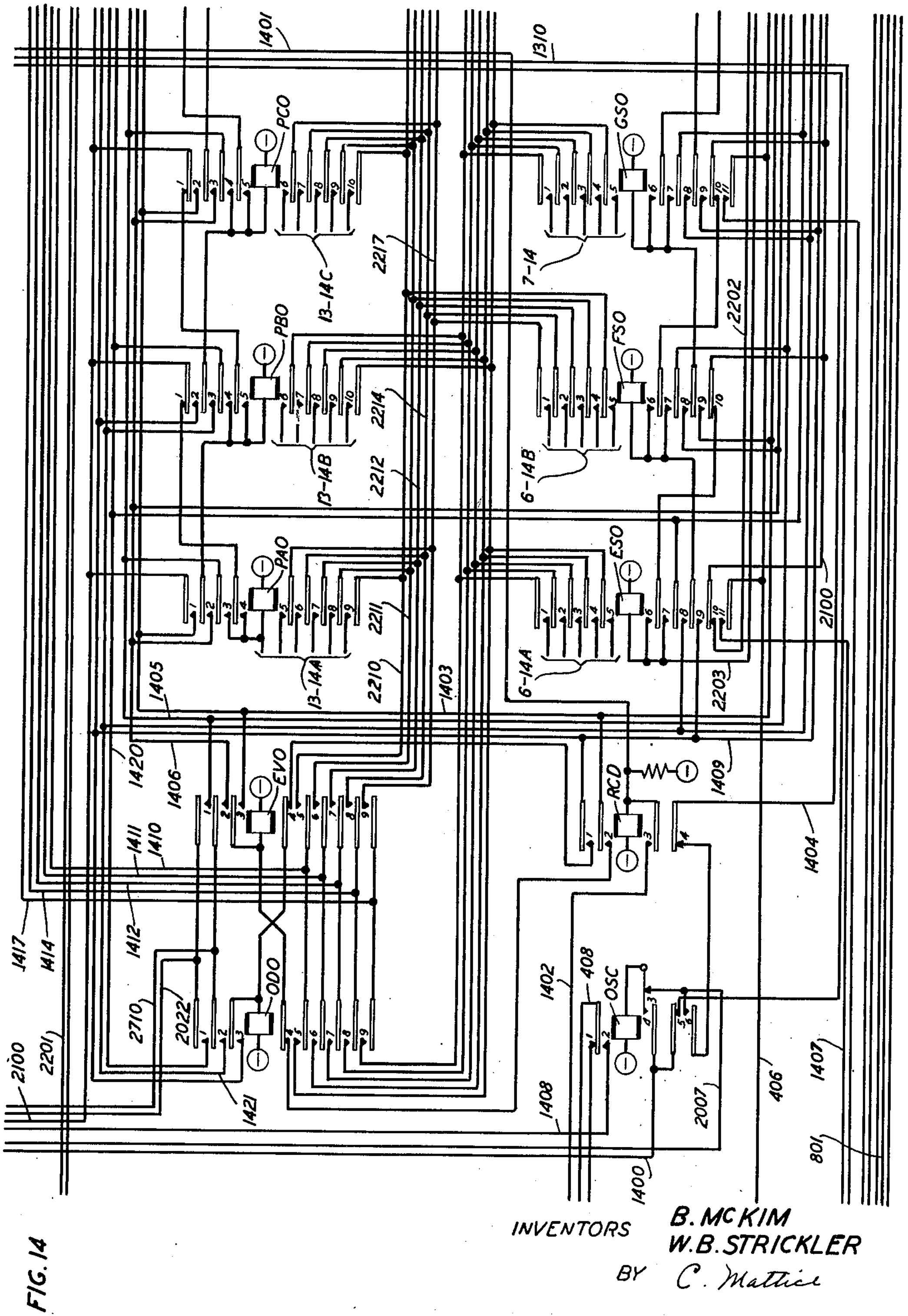

When relay BD(29) releases at the end of the digit, relay CS0(22) releases, in turn releasing relay OD0(14), thereby disconnecting the recapture circuit from the code conversion register relays of Fig. 13 and causing that circuit to restore and release relay SY(27) but with relays W(30) and DE1(30) operated the release of relay SY(27) does not stop pulsing. When the recapture circuit is normal, relay RCD(14) reoperates, in turn operating relay EV0(14), which, with relay DC0(22) operated connects the recapture circuit to the D register of Fig. 6. When the recapture circuit has been set, relay RCD(14) releases and relay SY(27) operates as previously described.

It will be remembered that office 1650 was of the community dial type which connects a reversed battery stop dial indication to the pulsing circuit until it is ready to receive pulses. Therefore, when relay BD(29) is released following the first digit and relays OF(29) and TG(29) are connected into the pulsing circuit, the current flow is of such a direction that relay OF(29) operates. Relay OF(29) closes a circuit from ground over its contact 1, conductor 2904, contact 6 of relay XDD(26), conductor 2614, contact 3 of relay TG1(29), conductor 2911, contact 2 of relay XSG(28), contact 5 of relay SG2(28), to battery through the winding of relay SG1(28). Relay SG1(28) operates and locks over its contact 4 and conductor 2909 to ground at contact 6 of relay DP(28). Relay SG1(28) at its contact 5 connects conductor 2001 over contact 1 of relay SG2(28) to conductor 2700, so that the operation of relay SY(27) is ineffective to restart pulsing.

When office 1650 is ready to receive pulses it restores the connection of battery and ground to the pulsing circuit so that relay OF(29) releases and relay TG(29) operates. A circuit is then closed from ground over contact 2 of relay OF(29), contact of relay TG(29), conductor 2998, contact 1 of relay DP(28), conductor 2812, contact 2 of relay XDD(26), conductor 2618, contact 5 of relay FL(25), conductor 2514, contact 2 of relay SG1(28) to battery through the winding of relay SG2(28). Relay SG2(28) operates, locking to conductor 2909, and opening the connection between conductors 2001 and 2700 so that the next digit may start at once if relay SY(27) is operated.

The remaining digits are transmitted in a similar manner, with an interdigital interval between them. When the last digit has been sent and the recapture circuit is connected to the H register of Fig. 7, in which only relay H7(7) is operated, relays RR7(21) and RT7(21) are operated as previously described. With only one RR and one RT relay operated, relay SY(27) cannot reoperate.

At the time that the trunk of Fig. 1 is connected to trunk circuit 1650, the circuit through the left winding of relay SL(25) is closed, extending as previously traced from ground at contact 7 of relay TCA(26) to conductors 124 and 125 and thence through the trunk link switches to conductors 1659 and 1660, through the windings of retard coil A2(16), resistances A2(16), contact 7 and winding of relay SL2(16) to battery. Relay SL(25) operates, in turn operating relay SL1(25). Relay SL2(16) does not receive sufficient current to operate in series with the left winding of relay SL(25).

Figure 7:
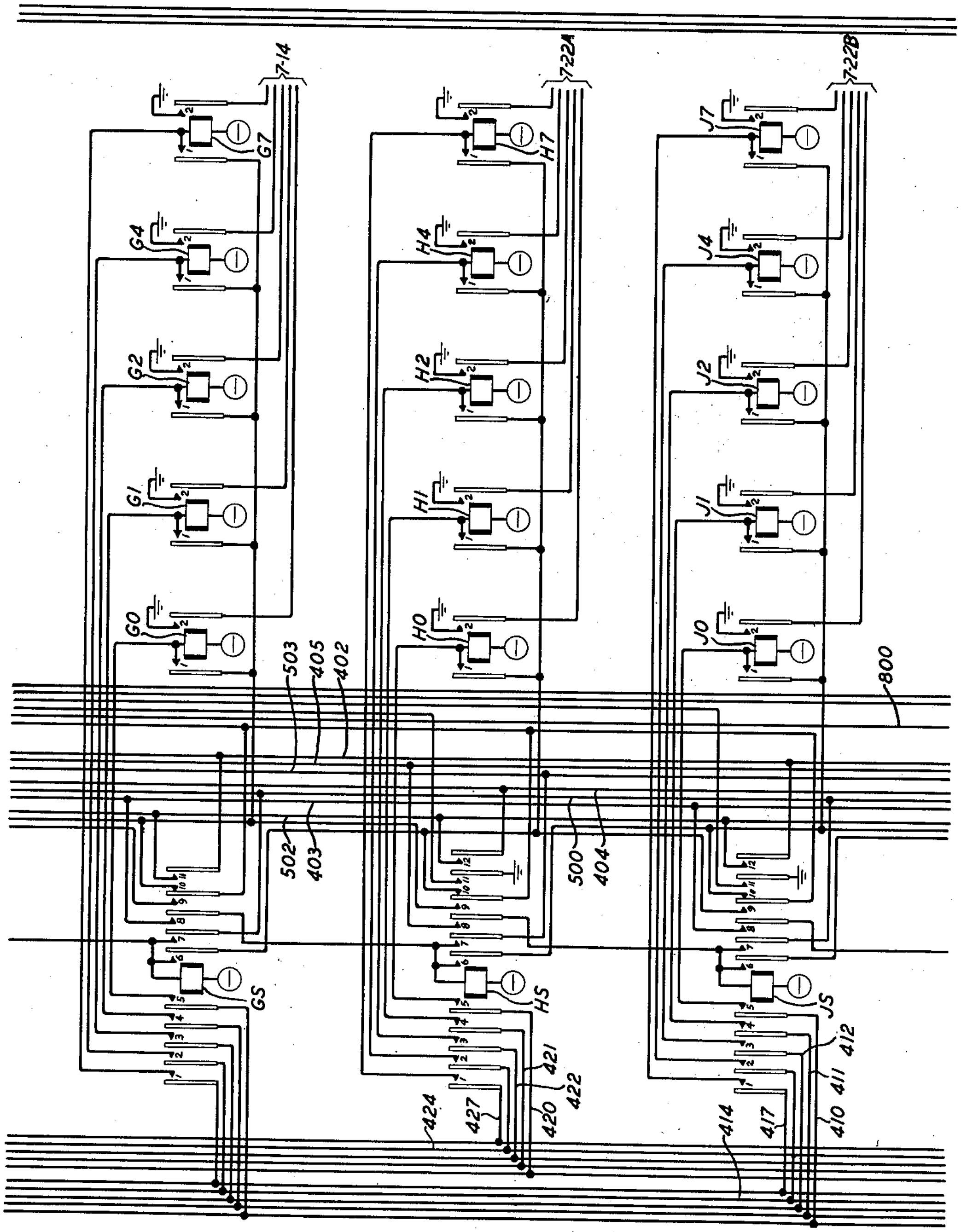
Figure 8:
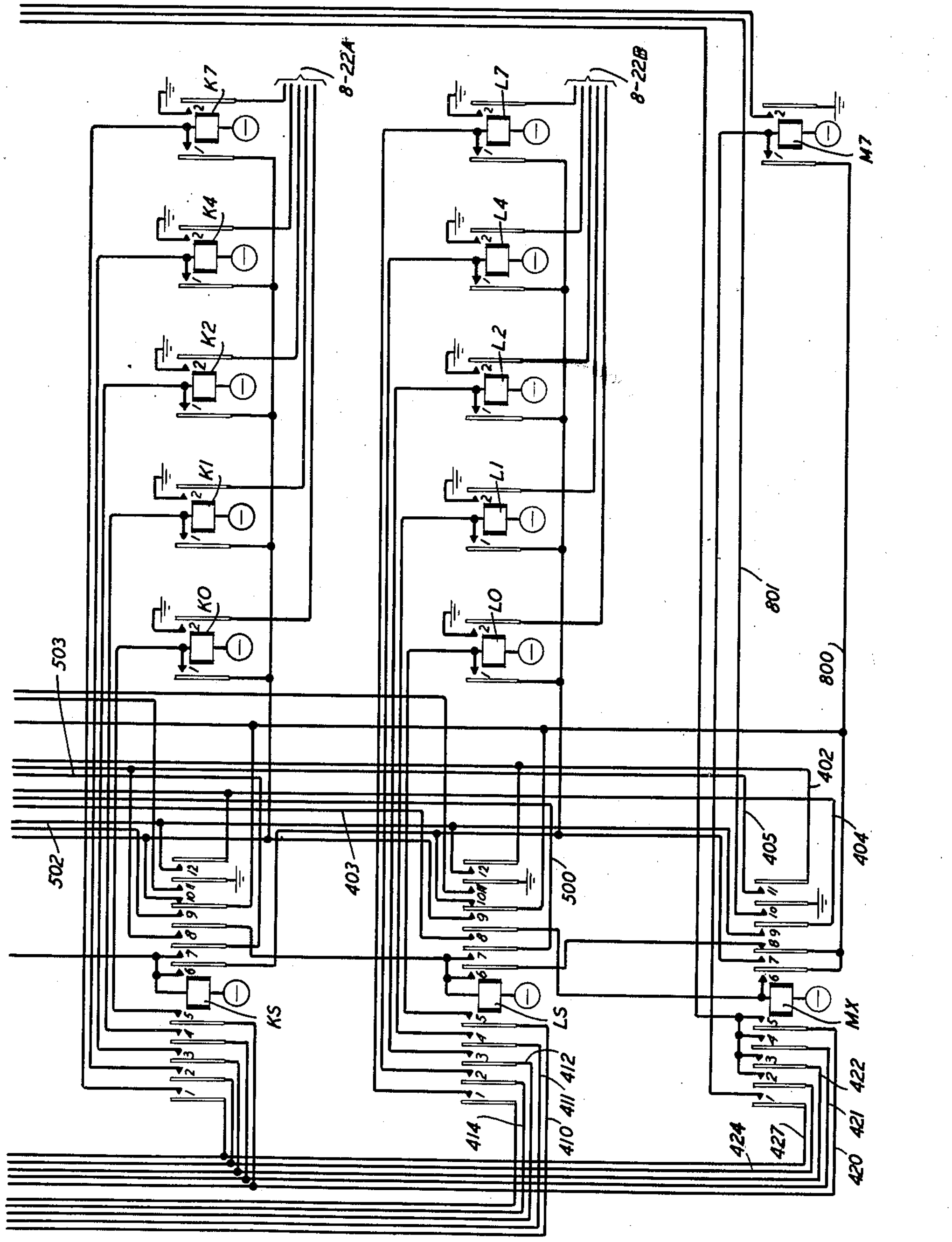

When the recapture circuit has been set by the start registration on register H of Fig. 7, the low resistance winding of relay SL(25) is connected over contact 3 of relay SL1(25), conductor 2503, contact 3 of relay DP(28), conductor 2990, contact 1 of relay SXR(30), contact 6 of relay 20C(30), conductor 3011, contact 6 of relay LPD(28), conductor 1408, contact 2 of relay OSC(14), conductor 408, contact 5 of relay RST1(4), conductor 2102, contact 7 of relay RT7(21), contact 4 of relay RR7(21), contact 6 of relay RR4(21), contact 7 of relay RR2(21), contact 4 of relay RR1(21), contact 1 of relay RR0(21), conductor 2100 to ground at contact 11 of relay ON(10). Relay SL2(16) now operates and locks over its contact 8 to ground on conductor 1658.

Relay SL2(16), when operated, disconnects conductor 1653 from conductor 1658 and connects ground to the former conductor to continue to mark the trunk busy to markers. At its contact 9 it connects ground to contact 2 of relay S2(16). At its contacts 1 and 3 it disconnects conductors 1656 and 1657 from conductors 1654 and 1655 leading to office 1652 and at its contacts 2 and 4 connects them to the left windings of repeating coil B2(16) in parallel with the windings of retard coil B2(16) and resistances B2, which are grounded. At its contact 5 it connects the supervisory relay S2(16) through the right windings of repeating coils B2(16) and A2(16) to conductors 1654 and 1655 leading to office 1652, thereby establishing the talking and supervisory circuit. Relay S2(16) is operated from office 1652 until the call is completed. At its contact 7, relay SL2(16) disconnects its own winding from conductors 1659 and 1660 and extends the simplex circuit including the latter conductors over its contact 6 to contact 1 of relay S2(16).

The transfer of the circuit of relay SL(25) from battery through the winding of relay SL2(16) to ground through resistance C2(16) causes relay SL(25) to release, operating relay OP(25). Relay OP(25) in turn operates relay OP1(25) which releases relay MFT(25). With relay DP(28) operated, the operation of relay OP1(25) closes a circuit from ground at contact 8 of relay ON(10), conductor 1036, contact 5 of relay OP1(25), conductor 2515, contact 5 of relay DP(28), conductor 2613 to battery through the winding of relay AV(10). The operation of relay AV(10) brings about the release of the sender in the manner previously described. The operation of the trunk circuit of Fig. 1 is also the same as previously described.

When the called subscriber answers, relay S2(16) is released, connecting ground from contact 9 of relay SL2(16) to conductor 1658 and ground through resistance C2(16) to the supervisory simplex circuit to operate relay SV(1), which signals the toll board.

When the called subscriber disconnects, relay S2(16) is reoperated, releasing relay SV(1) to give a disconnect signal to the toll board. Disconnection by the toll board releases the connection and relay SL2(16) to restore the trunk 1651 to normal. If the toll board disconnects first, relay S2(16) released holds relay SL2(16) and the trunk link switches operated until the called subscriber disconnects.

*Call to panel office—direct-current key pulsing*

In addition to the offices adapted to receive designations by dial type pulses or multifrequency pulses, calls to which have been described, there are offices requiring revertive pulse control, such as panel type offices and certain crossbar type offices, offices requiring what is known as call indicator code pulses, etc. For calls to these offices, the toll system being described uses outgoing senders, equipped to send the required types of pulses, which are attached to the outgoing trunks and are set by direct-current key pulsing from the incoming sender. As a typical example, a call to a panel type office will be described.

The seizure of the trunk of Fig. 1, the connection of that trunk with the sender, the registration of the designation and the transfer of the code to the marker all take place as previously described. The designation will include seven digits, with the start signal recorded on register H as for the step-by-step call.

Figure 17:
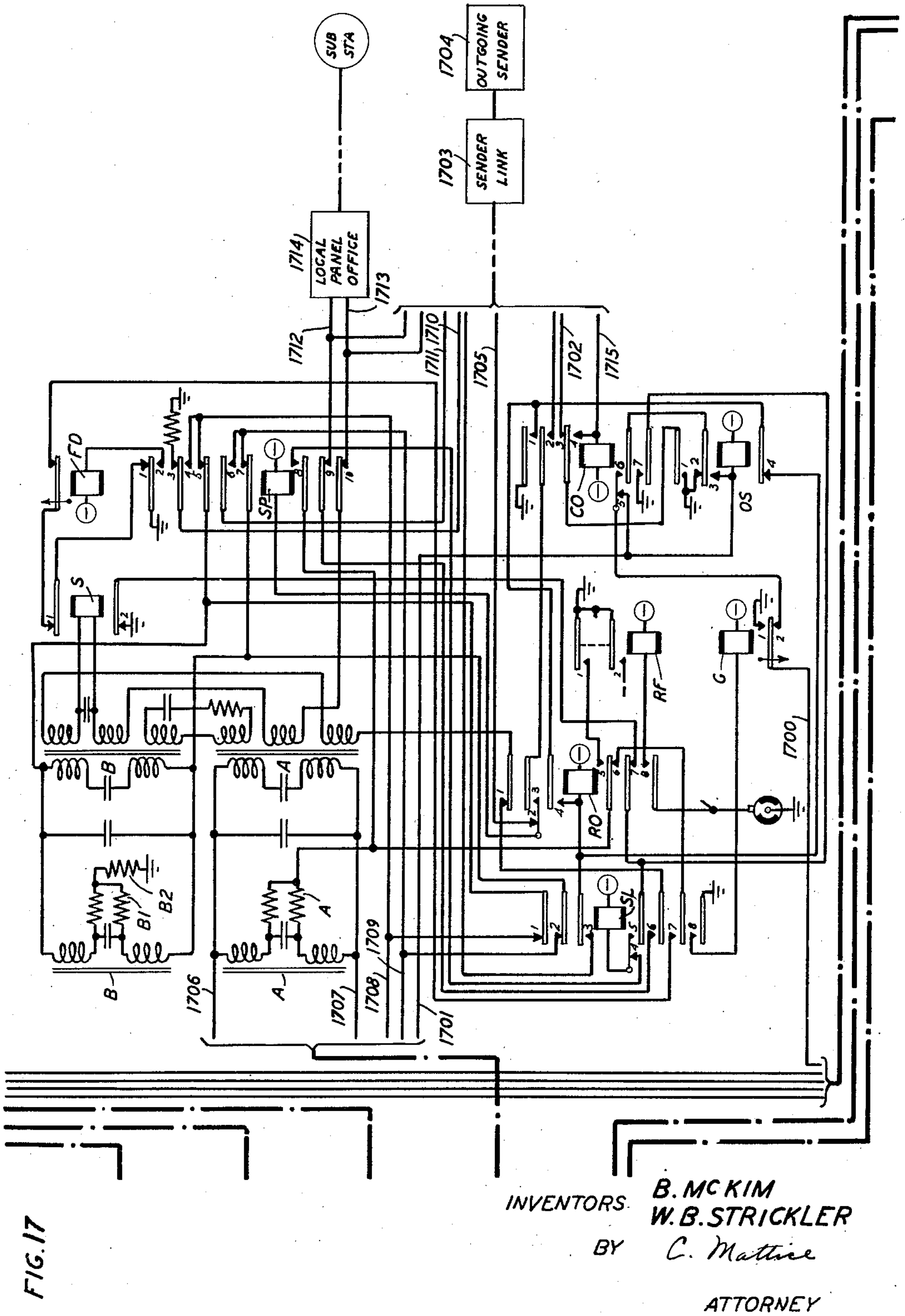
Fig. 17 shows an outgoing trunk leading to a local panel office.
Figure 18:
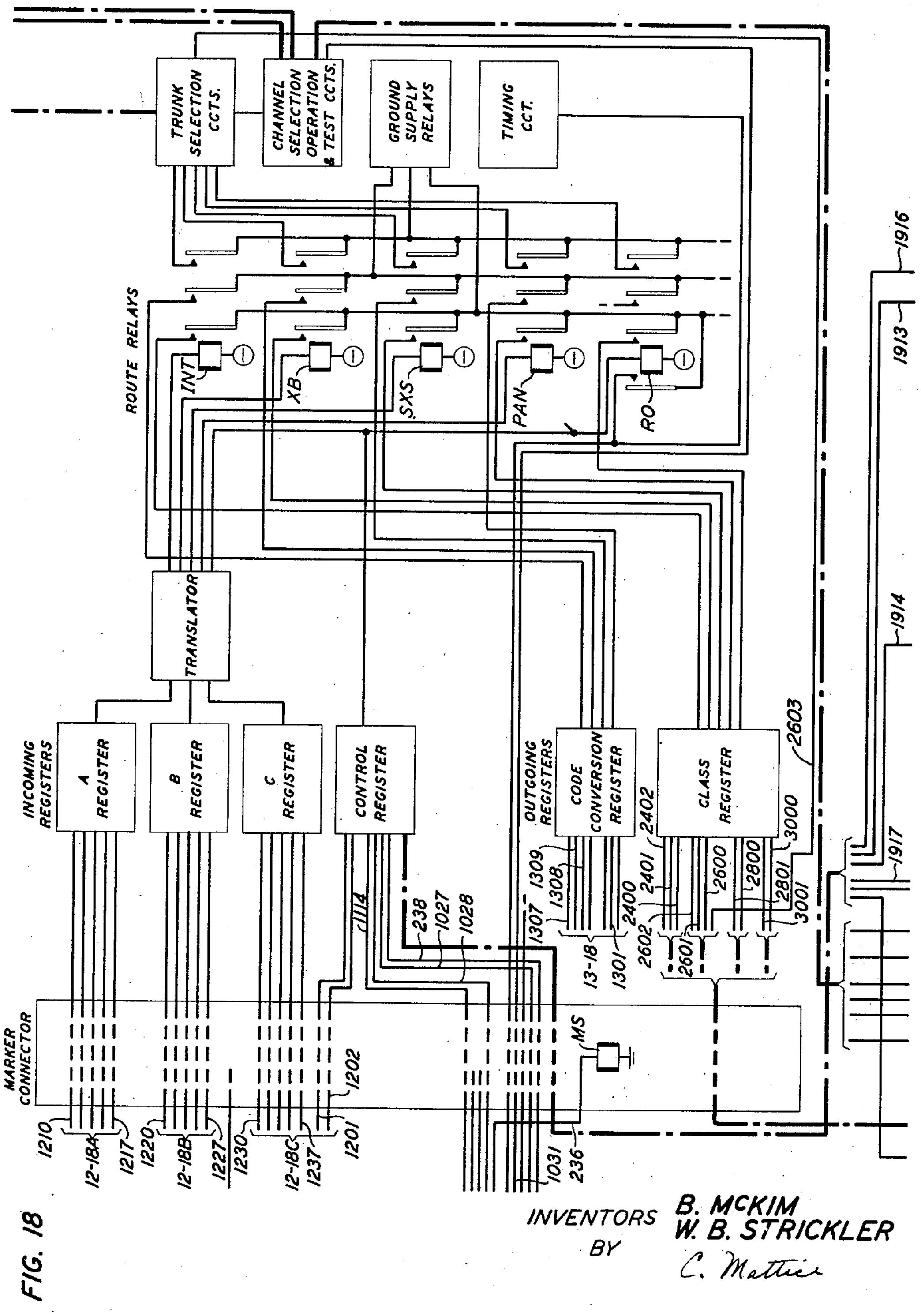
Fig. 18 shows in schematic form certain of the circuits of the marker.
Figure 19:
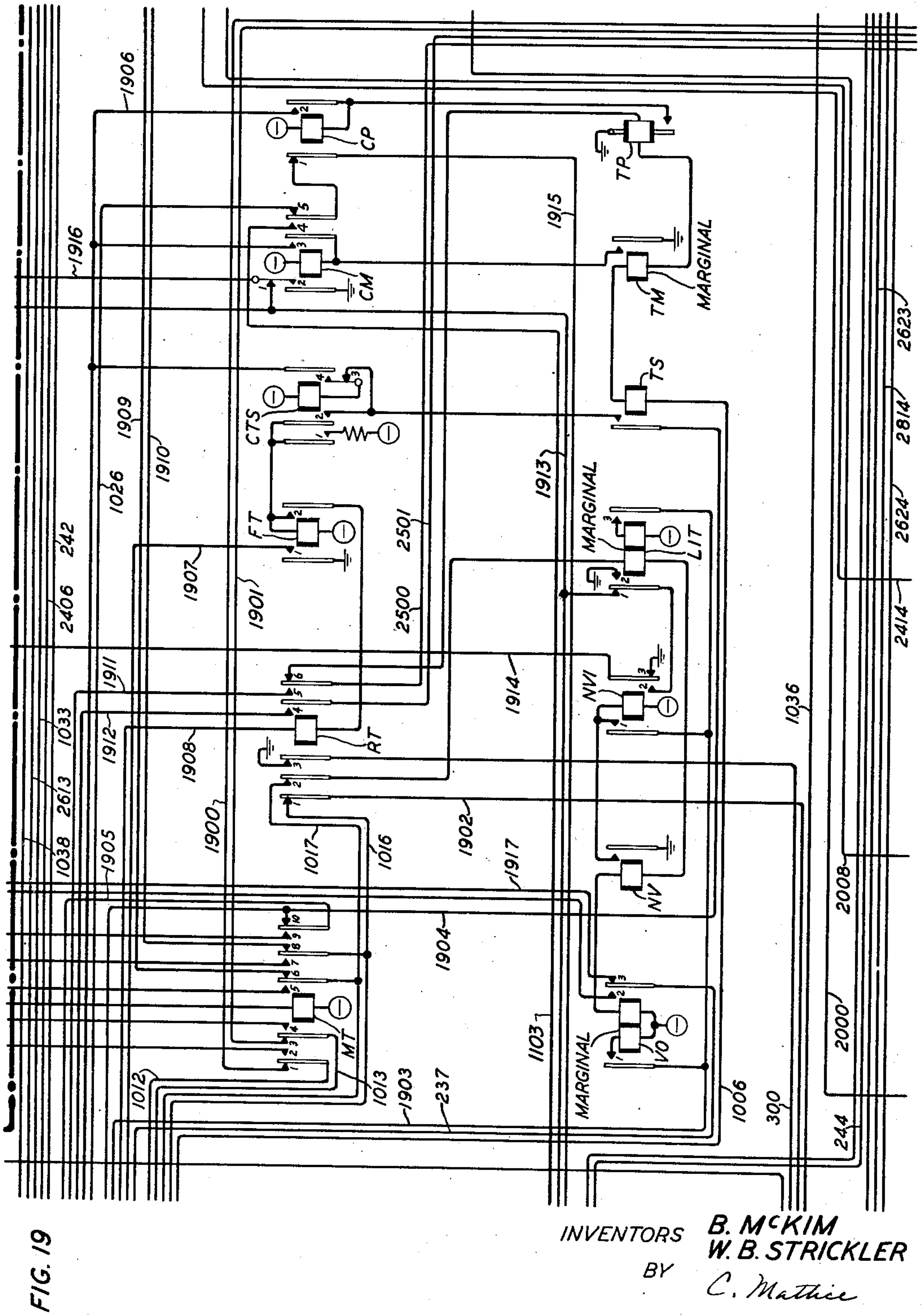

The marker operates route relay PAN(18) which controls the selection of an idle trunk circuit, for example the trunk circuit of Fig. 17, which is marked idle by the connection of battery through the winding of relay OS(17) over contact 5 of relay C0(17) and contact 2 of relay G(17) to conductor 1700. Route relay PAN(17) sets up registrations in the code conversion register which causes the operation of relay SK3(13) in the sender and in the class register which causes the operation of relay DC(24) in the sender. Relay DC(24) operates relays DC1(20) and DC2(20). The trunks used for this type of call are guarded and therefore relay DLC(26) is not operated.

As soon as the marker selects the trunk it operates relay TKS(26) to start the trunk guard timing operation and when the marker has completed its functions it operates relay MRL(2) as previously described, relay MRL(2) in turn operating relay MRL1(2). With relay DC(24) operated and relay DLC(26) not operated, the operation of relay MRL(2) closes a circuit from ground at its contact 1, conductor 242, contact 5 of relay DLC(26), conductor 2621, contact 1 of relay DC(24) to conductor 2405 to start the supplementary time interval, independent of the stage reached by the trunk guard timing relays. At the end of the supplementary time interval, relays TKS1(28), TKS2(28) and TCA(26) operate. Relay TCA(26) closes a circuit from ground over its contact 6, conductor 2609, contact 12 of relay DC(24) to battery through the winding of relay KP(24) operating the latter relay. Relay KP(24) transfers the circuit for the pulsing relays from the dial pulse potentiometer to the key pulse potentiometer as described for multifrequency key pulsing.

When the marker selects the trunk of Fig. 17 it operates relay OS(17) and when the trunk of Fig. 17 is connected to the trunk of Fig. 1, ground connected to conductor 118 from the sender is extended through the trunk link switches to conductor 1701 and the winding of relay OS(17), to hold that relay operated. A branch of this circuit extends over contact 5 of relay C0(17) and and contact 2 of relay G(17) to conductor 1700 to inform the marker that the connection has been completed, to permit the marker to release.

Relay OS(17) at its contact 1 connects ground over contact 3 of relay C0(17) to conductor 1702 to start the sender link 1703, which operates to connect an idle outgoing sender, such as sender 1704 with the trunk.

When the sender link has operated, a class indication is given to the sender 1704 in a manner similar to that described for Fig. 1, after which the sender grounds conductor 1705, completing a circuit over contact 2 of relay R0(17) to battery through the winding of relay SP(17). Relay SP(17) removes the class indications and connects conductors 1706 and 1707 in simplex through the windings of retard coil A(17) and resistances A(17), contact 8 of relay SP(17), contact 4 and winding of relay SL(17) to battery. Relay SP(17) also connects conductors 1708 and 1709 over its contacts 4 and 6 to conductors 1710 and 1711 leading through the sender link 1703 to the sender 1704 to prepare for pulsing. These conductors are also connected in simplex to ground over contacts 1 and 2 of relay SL(17), windings of retard coil B(17), resistances B1(17) and resistances B2(17). Conductors 1712 and 1713 outgoing to the local panel office 1714 are disconnected by relay SP(17) from repeating coils A(17) and B(17) but these conductors are connected through the sender link 1703 to the sender 1704 to initiate the operation of the panel office 1714 and to prepare for outpulsing between the sender 1704 and the panel office 1714. Relay SP(17) also operates relay FD(17).

The sender 1704 also grounds conductor 1715 to operate C0(17) which locks over its contact 4 to ground at contact 1 of relay OS(17). Relay C0(17) also provides a substitute connection between conductors 1701 and 1700 over its contact 6 and contact 3 of relay OS(17).

As soon as relay TCA(26) operates, the circuit through the left winding of relay SL(25) is closed, extending as previously traced in simplex to conductors 124 and 125 and thence through the trunk link switches to conductors 1706 and 1707 and as above traced to battery through the winding of relay SL(17). Relay SL(25) operates, but relay SL(17) does not receive sufficient current to operate. Relay SL(25) operates relay SL1(25). With relay DC(24) operated, the operation of relay SL1(25) extends a circuit from the right winding of relay SL(25) over contact 3 of relay SL1(25), conductor 2503, contact 1 of relay OF1(29), conductor 2900, contact 7 of relay DC(24), conductor 2406 to ground at contact 1 of relay MRL1(2). This circuit increases the current flow through relay SL(17) enough to permit that relay to operate. Relay SL(17) locks over is contact 5, to ground at contact 7 of relay C0(17) and also over contact 7 of relay R0(17) to ground at contact 2 of relay S(17). Relay SL(17) at its contacts 1 and 2 disconnects retard coil B(17) from conductors 1708 and 1709, and at its contact 8 closes a circuit for relay G(17). With relay G(17) operated, direct ground is connected to conductor 1700.

Relay SL(17) at its contact 4 opens its operating circuit and, thereby, the operating circuit of relay SL(25) causing the latter relay to release. Relays OP(25) and OP1(25) operate as before, in turn releasing relay MFT(25). With relay DC(24) operated, relay OP2(25) operates at once in a circuit from battery through its winding, contact 3 of relay FL(25), contact 7 of relay OP1(25), conductor 2516 to ground at contact 3 of relay DC(24).

As soon as relay OP2(25) operates, 24-volt battery through resistance S(27) is connected over contact 2 of relay SA1(27), conductor 2713, contact 11 of relay DC(24), conductor 2411, contact 4 of relay OP2(25), conductor 1910, contact 8 of relay MT(19), conductor 1016 through the sender link switches to conductor 116, contact 5 of relay SP(1), conductor 123, through the trunk link switches to conductor 1709, contact 6 of relay SP(17) to conductor 1711 leading to the outgoing sender. This circuit operates a relay which responds by connecting 24-volt battery to conductor 1710, completing a circuit over contact 4 of relay SP(17), conductor 1708, through the trunk line switches to conductor 122, contact 4 of relay SP(1), conductor 117, through the sender link switches to conductor 1017, contact 6 of relay MT(19), conductor 1909, contact 6 of relay OP2(25), conductor 2410, contact 10 of relay DC(24), conductor 2714, contact 1 and winding of relay SA(27), conductor 2715, to ground at contact 5 of relay DC(24). Relay SA(27) operates and locks over its contact 1 to battery through resistance S(27), opening its operating circuit at its contact 1. At its contact 3, relay SA(27) closes a circuit for relay SA1(27) which disconnects conductor 2713 from battery through resistance S(27) and connects conductors 2713 and 2714 to conductors 2412 and 2413 and contacts of relay PG1(20) in preparation for outpulsing.

With relay DC(24) operated, ground is connected over contact 4 of relay DC(24) and conductor 2421 to battery through the windings of relays PP1(27) and PP(27) in series, operating these relays.

Since relay SK3(13) has been operated and no preliminary digit registered on the pulse conversion register of Fig. 13, steering relay DS0(22) is operated, the circuit extending as traced for the multifrequency call to conductor 1400 and thence over contact 1 of relay DC2(20) and conductor 2006 to ground at contact 2 of relay MRL1(2). Relay RCD(14) is operated with the recapture circuit normal, so that the operation of relay DS0(22) in turn operates relay EV0(14). With relays EV0(14) and DS0(22) operated, the recapture circuit is connected to the D register of Fig. 6. When the recapture circuit has operated, relay RCD(14) releases, and relay OSC(14) operates in a circuit from battery through its winding and over its contact 3, conductor 2007, contact 1 of relay DC1(20), contact 8 of relay DC2(20), conductor 2101 and thence through the recapture circuit to ground on conductor 2100. Relay OSC(14) opens the operating circuit for relay DS0(22), which has locked under the control of relay ES0(14), and locks over its contact 4 and conductor 1400 to ground over the operating circuit for relay DS0(22). Relay OSC(14) extends its operating circuit over its contact 6, contact 4 of relay RCD(14), conductor 1404, contact 10 of relay SK3(13), conductor 1311, contact 8 of relay OP2(25), conductor 2509, contact 1 of relay KD(27), conductor 2511 to battery through the winding of relay SY(27). Relay SY(27) opens one of the connections of ground to conductor 2001 which is preventing the operation of the pulsing relays and closes a circuit from battery through the winding of relay PS(27), conductor 2705, contact 8 of relay PP1(27), contact 4 of relay SA1(27), conductor 2612, contact 4 of relay SY(27) to ground on conductor 242. Relay PS(27) operates, locks over its contact 3 to ground on conductor 242 and at its contact 5 opens the second connection of ground to conductor 2001, permitting the pulsing relays to operate, and closes the circuit for operating relay PG1(20) under the control of relay P(20).

At each operation, relay PG1(20) connects conductors 2412 and 2413, which are connected with the outgoing sender as above traced, over its contacts 2 and 1, conductors 2005 and 2004, contacts 7 and 5 of relay SST1(25), conductors 2508 and 2507, contacts 5 and 7 of relay PP1(27), conductors 2709 and 2708, contacts 5 and 7 of relay KP(24), conductors 2418 and 2417 to the recapture circuit.

Assuming that the digit 5 was registered on the D register and that, therefore relays D1(6) and D4(6) were operated, relays RT1(21), RT4(21), RR1(21) and RR4(21) will have been operated. Therefore conductor 2418 is extended over contact 7 of relay RR1(21), contact 2 of relay RR4(21), conductor 2125, contact 3 of relay DC2(20) to ground and conductor 2417 is extended over contact 6 of relay RT1(21), contact 2 of relay RT4(21), conductor 2110, contact 8 of relay DC1(20) through resistance BT(20) to ground.

Following is a table showing the setting of the recapture circuit for each digit, the conductors to which each of the pulsing conductors is extended and the resulting pulse generated:

| Digit | Recapture Relays Operated | Conductors 2417 and 2418 Connected to Conductors— | Pulses Transmitted |
|---|---|---|---|
| 0 | RT4, RT7 | 2110 | High resistance ground. |
| | RR4, RR7 | 2120 | Open. |
| 1 | RT0, RT1 | 2111 | Low resistance ground. |
| | RR0, RR1 | 2121 | Open. |
| 2 | RT0, RT2 | 2112 | High resistance battery. |
| | RR0, RR2 | 2122 | Open. |
| 3 | RT1, RT2 | 2113 | Low resistance battery. |
| | RR1, RR2 | 2123 | Open. |
| 4 | RT0, RT4 | 2110 | High resistance ground. |
| | RR0, RR4 | 2124 | High resistance battery. |
| 5 | RT1, RT4 | 2110 | High resistance ground. |
| | RR1, RR4 | 2125 | Low resistance ground. |
| 6 | RT2, RT4 | 2701 | Do. |
| | RR2, RR4 | 2126 | Do. |
| 7 | RT0, RT7 | 2112 | High resistance battery. |
| | RR0, RR7 | 2127 | Low resistance ground. |
| 8 | RT1, RT7 | 2113 | Low resistance battery. |
| | RR1, RR7 | 2128 | Low resistance ground. |
| 9 | RT2, RT7 | 2114 | High resistance ground. |
| | RR2, RR7 | 2129 | Low resistance battery. |

Relay PG1(20) controls the advance of the steering circuit and the release and resetting of the recapture circuit as previously described. When the last digit has been sent and the recapture circuit is set from the start registration, the usual circuit for operating relay SY(27) is open, but the circuit previously traced for relay SST1(25) is closed and that relay operates and locks. At its contact 8, relay SST1(25) closes a circuit for operating relay SY(27) to permit the pulsing relays to send out a start pulse. With relay SST1(25) operated the pulsing circuit extends from contacts 1 and 2 of relay PG1(20), to conductors 2004 and 2005, contacts 4 and 6 of relay SST1(25), to conductors 2127 and 2702, conductor 2127 extending over contact 7 of relay DC2(20) to ground and conductor 2702 extending over contact 5 of relay DC1(20) through resistance BU(20) to battery through resistance lamp DG(20). With relay SST1(25) operated, the operation of relay PG1(20) closes the previously traced circuit for relay FP(27), which operates and locks under the control of relay OP2(25). At the end of the pulse period ground is connected to conductor 2001 to stop the interrupter relays.

The pulsing circuit is also connected, in parallel with the contacts of relay PG1(20), over contacts 8 and 9 of relay DC(24), and conductors 2422 and 2423 to 24-volt battery through the windings of polarized relays R1(27) and T1(27). When the outgoing sender 1704 has received the start pulse, it connects 48-volt battery to both of the pulsing conductors. This battery is in the proper direction for operating relays T1(27) and R1(27). With both of these relays operated a circuit is closed from battery through the winding of relay KD(27), contact of relay R1(27), contact 1 of relay T1(27), contact 2 of relay PS(27), conductor 2024, contact 3 of relay PG1(20) to ground on conductor 242. Relay KD(27) operates in this circuit and locks over its contact 3, conductor 2715, to ground at contact 5 of relay DC(24). At its contact 2, relay KD(27) connects ground to conductor 2422, releasing relay R1(27) and transmitting a ground signal to the outgoing sender 1704, which responds by opening the pulsing circuit and releasing relay T1(27).

With relay T1(27) released, ground connected to the armature of relay T1(27) as above traced is connected over contact 2 of relay T1(27), contact 4 of relay KD(27), conductor 2613, to battery through the winding of relay AV(10). Relay AV(10) in operating brings about the restoration of the sender to normal in the manner previously described. The establishment of the talking circuit in the trunk circuit of Fig. 1 has already been described.

The outgoing sender 1704 controls the equipment at the panel office 1714 over conductors 1712 and 1713 and when it has completed its functions releases relay SP(17). With relay SP(17) released, conductor 1712 is connected over contact 9 of relay SP(17), contact 6 of relay SL(17), contact 1 of relay R0(17), through the right windings of repeating coils A(17) and B(17) and the winding of supervisory relay S(17), contact 10 of relay SP(17) to conductor 1713. Relay S(17) is operated from office 1714 soon after this circuit is closed. Conductors 1708 and 1709 are connected over contacts 5 and 7 of relay SP(17) to the left windings of repeating coil B(17) for talking purposes and the simplex termination to ground through the windings of retard coil B(17), resistances B1(17) and resistance B2(17). Conductors 1706 and 1707 are connected to the left windings of repeating coil A(17) for talking and over a simplex circuit through the windings of retard coil A(17) and resistances A(17) and thence over contact 6 of relay R0(17), contact 7 of relay SL(17) to the contact of relay FD(17). The circuit of relay FD(17) is opened when relay SP(17) releases, but relay FD(17) is slow to release so that the above-traced supervisory circuit remains open at the contact of relay FD(17) until it has been opened by the operation of relay S(17).

When the called subscriber answers, relay S(17) releases and the supervisory circuit is extended over the contact of relay FD(17), contact 1 of relay S(17) to ground at contact 1 of relay SP(17), thereby operating supervisory relay SV(1) in the incoming trunk circuit which connects battery to conductor 105 to indicate to the toll board that the call has been answered.

Disconnection at the panel office reoperates relay S(17) which disconnects ground from the supervisory simplex circuit, releasing relay SV(1) which disconnects battery from conductor 105 as a disconnect signal.

Disconnection at the toll board restores the trunk of Fig. 1 in the manner previously described and releases the trunk link switches, thereby releasing relay OS(17) which in turn releases relay C0(17). If the called subscriber has disconnected, relay S(17) is operated and both locking circuits of relay SL(17) are open so that relay SL(17) also releases, in turn releasing relay G(17). Relay G(17) is slow to release and provides a guarding interval before opening its contact 1 and removing ground from conductor 1700 to mark the trunk available to the markers.

*Other types of call*

The sender is also arranged to control connections to manual offices and to step-by-step offices over trunks requiring simplex dial pulsing which have not been shown.

For calls to manual offices, the marker operates relay M(24). If a guarded trunk is used the supplementary time interval is started as soon as the marker operates relay MRL(2) to ground conductor 242. Ground on conductor 242 is extended over contact 5 of relay DLC(26), conductor 2621, contact 6 of relay M(24) to conductor 2405. If an unguarded trunk is used, the trunk guard timing proceeds until relay TC5(24) has operated, at which time ground on conductor 242 is extended over contact 6 of relay DLC(26), conductor 2807, contact 5 of relay M(24) and contact 1 of relay TC5(24) to conductor 2405.

As soon as the supplementary time interval is completed and relay TCA(26) operates, the supervisory checking circuit through the left winding of SL(25) is closed, relay SL(25) operating, in turn operating relay SL1(25) which extends the circuit through the right winding of relay SL(25) over contact 3 of relay SL1(25), conductor 2503, over contact 1 of relay OF1(29), conductor 2900, contact 3 of relay M(24), conductor 1038, contact 6 of relay RST2(4), contact 4 of relay SYN(4), conductor 499 to ground at contact 9 of relay S(10). When the associated trunk relay has operated, relay SL(25) releases and a circuit is closed from ground at contact 2 of relay MFT(25), contact 2 of relay SL(25), contact 1 of relay SL1(25), conductor 2504, contact 2 of relay M(24), conductor 2613 to battery through the winding of relay AV(10). The further release of the sender is the same as previously described.

Trunks requiring simplex dialing are of the guarded intertoll type, requiring a trunk guard interval sufficient for the seizure signal to be transmitted and responded to, as described for the trunk of Fig. 15. The marker operates relay SXD(26), but since the trunk is guarded, does not operate relay DLC(26). The trunk guard timing takes place as previously described, the supplementary timing being started with relay TC3(24) operated by the connection of ground on conductor 242 over contact 5 of relay DLC(26), conductor 2621, contact 11 of relay SXD(26), conductor 2608, contact 2 of relay TC3(24) to conductor 2405. Relay SXD(26) operates relay DP(28) and relay DP1(28). In general, the operation is the same as for loop dialing, except that conductors 1017 and 1016 over which the pulsing circuit extends to the sender link, are now connected over contacts 6 and 8 of relay MT(19), conductors 1909 and 1910, contacts 3 and 2 of relay TCA(26) and contacts 9 and 10 of relay SXD(26) and thence in parallel to conductor 2907 and over contact 2 of relay FL1(29) to conductor 2408. During trunk test, conductor 2408 extends through the windings of relays OF(28) and TG(29), conductor 2901, contact 6 of relay BD(29), conductor 2902 over contact 1 of relay SXD(26) to battery through resistance A1(26) and through resistance B(26) to ground, resistances A1(26) comprising a voltage divider to supply the proper potential for the circuit. During pulsing, with relay BD(29) operated, conductor 2408 is extended over contact 7 of relay BD(29), conductor 2420, contact 12 of relay KP(24), conductor 2008, contact 1 of jack P(20), contact 2 of relay P(20), contact 3 of jack P(20), conductor 2415, contact 6 of relay SXD(26) to ground through resistance G(26).

To summarize, following is a table showing the relationship between the class of call, the type of trunk and the time intervals measured during the trunk guard timing interval:

| Class of Call | Type of Trunk | Time Interval Measured | Class Relays Operated |
|---|---|---|---|
| MF pulsing | Guarded | 375 MS | MF(24). |
| Do | Unguarded | 575 MS | MF(24). DLC(26). |
| Loop dialing | do | 775 MS | LPD(28). DLC(26). |
| DC key pulsing | Guarded | 75 MS | DC(24). |
| Manual | do | 75 MS | M(24). |
| Do | Unguarded | 575 MS | M(24). DLC(26). |
| Simplex dialing | Guarded | 375 MS | SXD(26). |

*Ringing*

Certain loop dialing trunks require ringing control, that is, may require a pulse of 20-cycle ringing current or a simplex ringing signal.

If the trunk requires a pulse of 20-cycle ringing current, the marker operates relay 20C(30). Relay 20C(30) closes a circuit from ground at contact 8 of relay LPD(28), conductor 2809, contact 1 of relay LSS(30), contact 5 of relay 20C(30) to battery through the winding of relay R(30). Relay R(30) operates in this circuit. With relay 20C(30) operated, the circuit through the right winding of relay SL(25) is open and the sender waits for a line seizure signal from the distant office, which causes the operation of relay OF(29). Relay OF(29) connects ground to conductor 2904. With relay XDD(26) normal the circuit is extended over contact 6 of relay XDD(26), conductor 2614 and contact 3 of relay TG1(29) to conductor 2911. With relay XDD(26) operated the circuit may be traced over contact 5 of relay XDD(26), conductor 2622 and contact 5 of relay TG1(29) to conductor 2911. With relay XSG(28) normal conductor 2911 is connected to conductor 2813 over contact 1 of relay XSG(28). With relay XSG(28) operated, which has resulted in the operation of relays SG1(28) and SG2(28) as previously described, conductor 2911 is connected to conductor 2813 over contact 2 of relay XSG(28) and contact 4 of relay SG2(28). Conductor 2813 is connected over contact 2 of relay 20C(30) to battery through the winding of relay LSS(30). Relay LSS(30) operates and locks over conductor 2809 to ground under the control of relay LPD(28). Relay LSS(30) connects ground on conductor 2809 over its contact 3, contact 4 of relay 20C(30), contact 2 of relay R(30), to battery through the winding of relay 20C1(30). Relay 20C1(30) operates and connects ringing current and ringing ground over its contacts 2 and 4 to conductors 3005 and 2617 which extend to the outgoing trunk as traced for the loop dialing call. Relay LSS(30) opens the operating circuit of relay R(30) and that relay releases after an interval determined by its slow releasing character, in turn releasing relay 20C1(30) to terminate the pulse of ringing current. With relays 20C1(30) and R(30) released the circuit through the right winding of relay SL(25) is closed as traced for the loop dialing call to conductor 2900 and thence over contact 5 of relay 20C1(30), contact 1 of relay R(30), contact 4 of relay 20C(30), contact 3 of relay LSS(30) to ground on conductor 2809. The sender then proceeds to release as described.

If a simplex ringing signal is required, the marker operates relay SXR(30), which also operates relay R(30) to open the circuit through the right winding of relay SL(25). When the recapture circuit is set from the start registration, grounding conductor 1408 as previously traced, a circuit is closed from ground on conductor 1408, over contact 6 of relay LPD(28), conductor 3011, contact 6 of relay 20C(30), contact 2 of relay SXR(30) to battery through the winding of relay LSS(30) which operates and locks. Relay LSS(30) connects ground on conductor 2809, over its contact 3, contact 5 of relay SXR(30), contact 3 of relay R(30) to battery through the winding of relay SXR1(30). Relay SXR1(30) operates in this circuit and connects +130-volt battery through resistance lamp N(29) and resistance N(29), conductor 2912, contact 2 of relay SXR1(30), conductor 3012 and thence through the windings of relays OF(29) and TG(29) in parallel over the two sides of the pulsing circuit to the distant office. Relay LSS(30) opens the circuit of relay R(30) which releases slowly, to release relay SXR1(30) and terminate the simplex ringing signal. When relay SXR1(30) has released, conductor 2900 is connected over contact 1 of relay SXR1(30), contact 4 of relay R(30), contact 5 of relay SXR(30), contact 3 of relay LSS(30) to ground on conductor 2809 to bring about the release of the sender.

*Timing*

In order to provide means for disposing of calls that meet with trouble in the sender, a stuck sender timing circuit is provided. This timing circuit is arranged to measure a 30–50-second time interval. However the timing may be completed at the end of a 10–30-second interval if the first digit is not received, and is restarted on receipt of the first digit and on the calling in of the marker.

Timing is started by the operation of relay S(10), which connects ground over conductor 1005 to interrupter TM(3) and operates relay TM0(3) as previously described. When interrupter TM(3) closes its contact, it completes a circuit over contact 4 and through the winding of relay TM1(3) to battery through resistance BL1(3). Relay TM1(3) operates and locks over its contact 5 to ground on conductor 1005. It also closes a circuit from battery through resistance BL2(3) through the winding of relay TM2(3) over contact 5 of relay TM1(3) to ground on conductor 1005, but relay TM2(3) cannot operate, being shunted by ground over conductor 1005, contact of interrupter TM(3) and contact 5 of relay TM2(3). When the interrupter TM(3) opens its contact, relay TM2(3) operates. At the next closure of the interrupter contact, ground is connected over contact 4 of relay TM2(3) in shunt of the winding of relay TM1(3), causing that relay to release, relay TM2(3) being held operated over the interrupter contact and contact 4 of relay TM1(3). When relay TM1(3) releases, a circuit is closed from ground on conductor 301, contact 3 of relay TM2(3), contact 7 of relay TM1(3), contact 5 of relay TM4(3) to battery through the winding of relay TM3(3). Relay TM3(3) operates and locks through the winding of relay TM4(3), contact 3 of relay TM3(3) to ground on conductor 1005. Relay TM4(3) is shunted by the operating circuit of relay TM3(3) and does not operate. When the interrupter opens its contact, relay TM2(3) releases, opening the operating circuit of relay TM3(3) so that relay TM4(3) now operates. A further closure and opening of the interrupter contact reoperates relays TM1(3) and TM2(3).

The foregoing describes the maximum operation of the timing relays, but a time-out may be indicated prior to the maximum operation under a number of different conditions as will be pointed out.

While waiting for the first digit to be registered, relay ADR(10) is not operated and the operation of relay TM2(3) will close a circuit for the time-out relay TM5(11) which may be traced from battery through the winding of relay TM5(11), conductor 1105, contact 7 of relay ON1(2), conductor 244, contact 2 of relay TM8(11), conductor 1106, contact 1 of relay TM0(3), contact 2 of relay TM2(3) to ground on conductor 301. Relay TM5(11) locks over its contact 4 to ground on conductor 301 and performs other functions which will be described hereinafter.

As previously described, the operation of relay ADR(10) restores the timing relays and operates relay TM9(11) when the timing relays are normal. With relay TM9(11) operated, conductor 1005 is again grounded over contact 1 of relay TM9(11), conductor 1102, contact 1 of relay MS2(10) and conductor 301. Under this condition, the operation of relay TM2(3) will also operate relay TM5(11).

When the sender operates relay MS2(10) to call in a marker, ground is removed from conductor 1005, and the timing relays are again restored. With the timing relays normal and relay MS2(10) operated, a circuit is closed from battery through the winding of relay TM8(11), conductor 1107, contact 3 of relay MS2(10), contact 6 of relay ADR(10), conductor 1023, contact 4 of relay TM0(3), contact 1 of relay TM2(3), contact 1 of relay TM1(3), contact 1 of relay TM3(3) to ground on conductor 301. Relay TM8(11) operates in this circuit and locks over its contact 3 and contact 3 of relay TM9(11) to ground on conductor 301.

With relays TM8(11) and TM9(11) operated, conductor 1005 is connected over contact 1 of relay TM9(11) and contact 4 of relay TM8(11) to ground on conductor 301 and timing starts again. With these relays operated, the previously traced circuit for operating relay TM5(11) is opened. Under this condition, when relay TM4(3) operates a circuit is closed from battery through the winding of relay TM5(11), conductor 1105, contact 7 of relay ON1(2), conductor 244, contact 7 of relay RCT(11), conductor 1108, contact 1 of relay TM4(3), contact 2 of relay TM0(3) to ground on conductor 301.

After the marker has been selected, timing may be stopped and restarted if required by the nature of the call being handled. This is brought about by the operation of relay RCT(11). It will be remembered that for a multifrequency call over an unguarded trunk, relay OF(29) is operated when the connection to the outgoing trunk is established and remains operated until the distant office is ready to receive pulses. With relay OF(29) operated, a circuit is closed from ground over contact 1 of relay OF(29), conductor 2904, contact 6 of relay XDD(26), conductor 2614, contact 4 of relay TG1(29), conductor 2905, contact 1 of relay OP2(25), conductor 2513, contact 11 of relay MF1(26), conductor 2623, to battery through the right winding of relay RCT(11), operating the latter relay. With relay RCT(11) operated, the operating circuit for relay TM5(11) is opened. A circuit is closed from battery through the winding of relay RCG(3), conductor 303, contact 4 of relay RCT(11), conductor 2624 to ground at contact 1 of relay TKS(26). When relay OF(29) releases, relay RCT(11) releases, but relay RCG(3) which is slow to release holds its contacts closed for an interval, thereby closing a circuit from ground on conductor 2624 over contact 1 of relay RCT(11), conductor 1109, contact 2 of relay RCG(3), conductor 304 to battery through resistance BG(11) in shunt of the winding of relay TM9(11) causing relay TM9(11) to release, in turn releasing relay TM8(11) and the timing relays. When relay RCG(3) and the timing relays have released, relay TM9(11) reoperates and timing starts again.

In the case of loop dialing calls on which a delay is expected before dialing can start, relay XDD(26) is operated by the marker and relay OF(29) is operated until the distant office is ready to receive pulses. When relay TKS(26) operates, grounding conductor 2624, a circuit is completed over contact 3 of relay RCT(11), conductor 1110, to battery through the winding of relay RCS(3). When relay OF(29) operates a circuit is closed from ground at contact 1 of relay OF(29), conductor 2904, contact 5 of relay XDD(26), conductor 2622, contact 6 of relay TG1(29), conductor 2623 to battery through the right winding of relay RCT(11). Relay RCT(11) operates and opens the circuit of relay RCS(3), but that relay is slow to release and during its release time connects ground on conductor 2624 over contact 2 of relay RCT(11), conductor 1111, contact of relay RCS(3), conductor 304 to battery through resistance BG(11) in shunt of the winding of relay TM9(11) to recycle the timing.

On calls where a stop dialing signal is received between digits, the operation of relay SG1(28) closes a circuit from ground over contact 2 of relay SG2(28), contact 3 of relay SG1(28), conductor 2814, to battery through the left winding of relay RCT(11). Relays RCT(11) and RCS(3) cooperate to recycle the timing.

When relay TM5(11) is operated under any of the above conditions, it calls in a marker and directs the marker to route the call to a reorder trunk. Before relay TM5(11) operates, a circuit is closed from ground at contact 7 of relay ON(10), conductor 1039, contact 10 of relay TM5(11) over contact 2 of relay OE(11) or contact 1 of relay ROR1(11) to battery through the winding of relay TM7(11). Relay TM7(11) closes a circuit from ground at its contact 2, contact 10 of relay ROR1(11) to battery through the winding of relay R0(11). Relay TM7(11) also closes a circuit from ground on conductor 301 over its contact 3, conductor 1112 to battery through the winding of relay CTA(3). When relay TM5(11) operates, it releases relay TM7(11), in turn releasing relay R0(11) and relay CTA(3). Relays TM7(11) and R0(11) are slow to release and measure an interval after which a circuit is closed from ground on conductor 1039, contact 9 of relay TM5(11), contact 1 of relay R0(11), conductor 1113, contact 8 of relay CTA(3), conductor 407 to battery through the winding of relay MS(10). Relay MS(10) functions to connect the sender with a marker as previously described. With relay TM5(11) operated, ground is connected over contact 6 of relay TM5(11), to conductor 1114 and over contact 7 of relay TM5(11), conductor 1104, contact 1 of relay TN1(10) to conductor 1028 to inform the marker that a reorder trunk is required. Relay TM5(11) also controls the chain lock-out arrangement for operating relay CH(3) which is described and claimed in Patent No. 2,396,797 to H. D. MacPherson, March 19, 1946.

*Operator codes*

As previously mentioned, operator codes consist of four digits, namely the digits one-one followed by two digits which may be any digit from 2 to 9. Assuming, for example, that the code 1129 is pulsed into the sender, register relays A0(5), A1(5), B0(5), B1(5), C0(5), C2(5), D2(6) and D7(6) will be operated followed by the start registration on relay E7(6).

As soon as relays A0(5), A1(5), B0(5) and B1(5) operate, ground is connected to conductors 510, 511, 520 and 521, operating relays AA0(12), AA1(12), AB0(12) and AB1(12). With the latter relays operated, a circuit is closed from ground over the contacts of these relays to battery through the winding of relay TX(12). With relay TX(12) operated, the operating circuit for the marker start relay MS(10) may be traced from battery through the winding of that relay, conductor 407, contact 7 of relay RST(4), conductor 1200, contact 5 of relay TX(12), conductor 1203, contact 7 of relay MRL(2), conductor 2201 to ground at contact 11 of relay ES(6) so that the marker will not be called in until all of the digits have been recorded.

Figure 5:
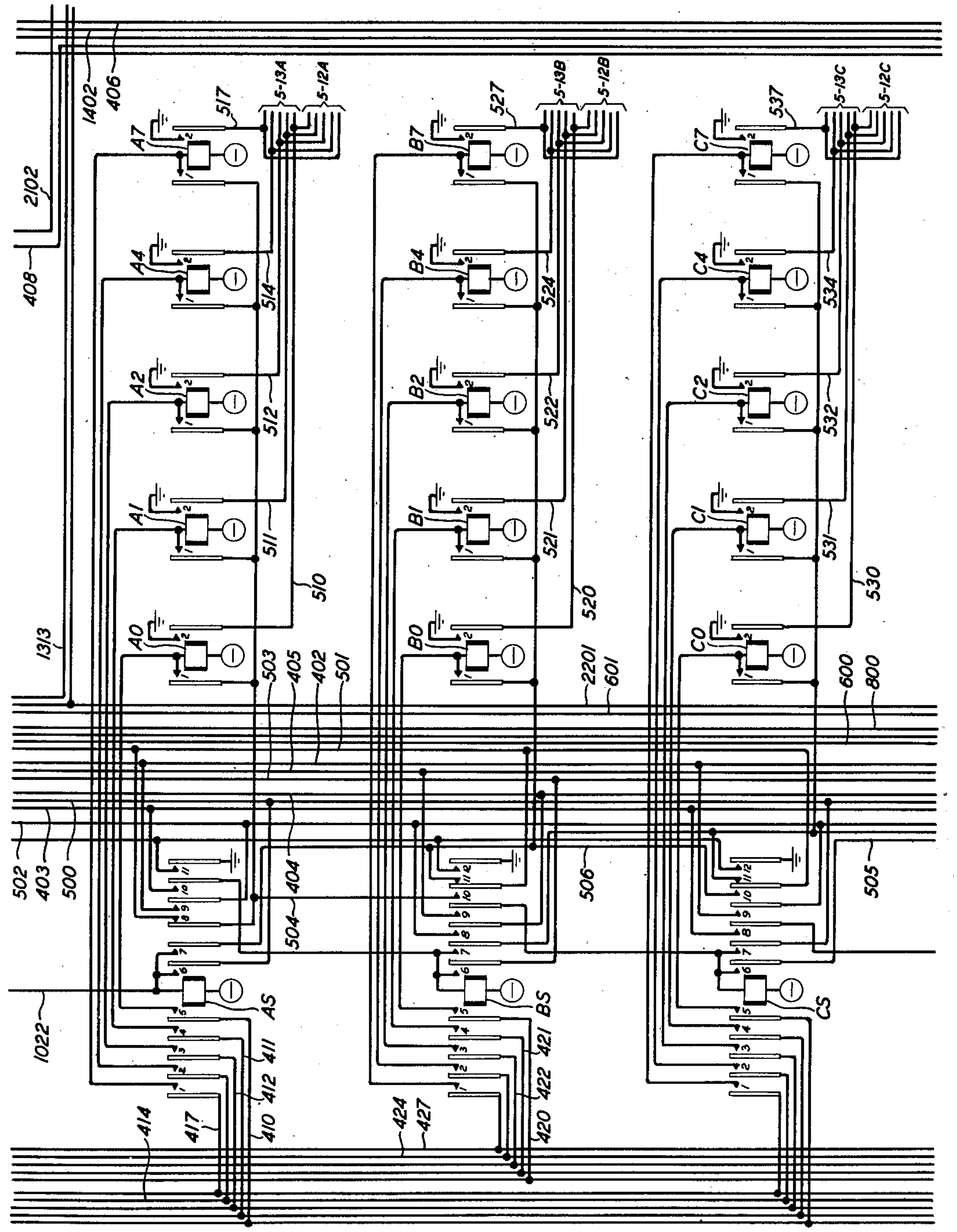
Figure 6:
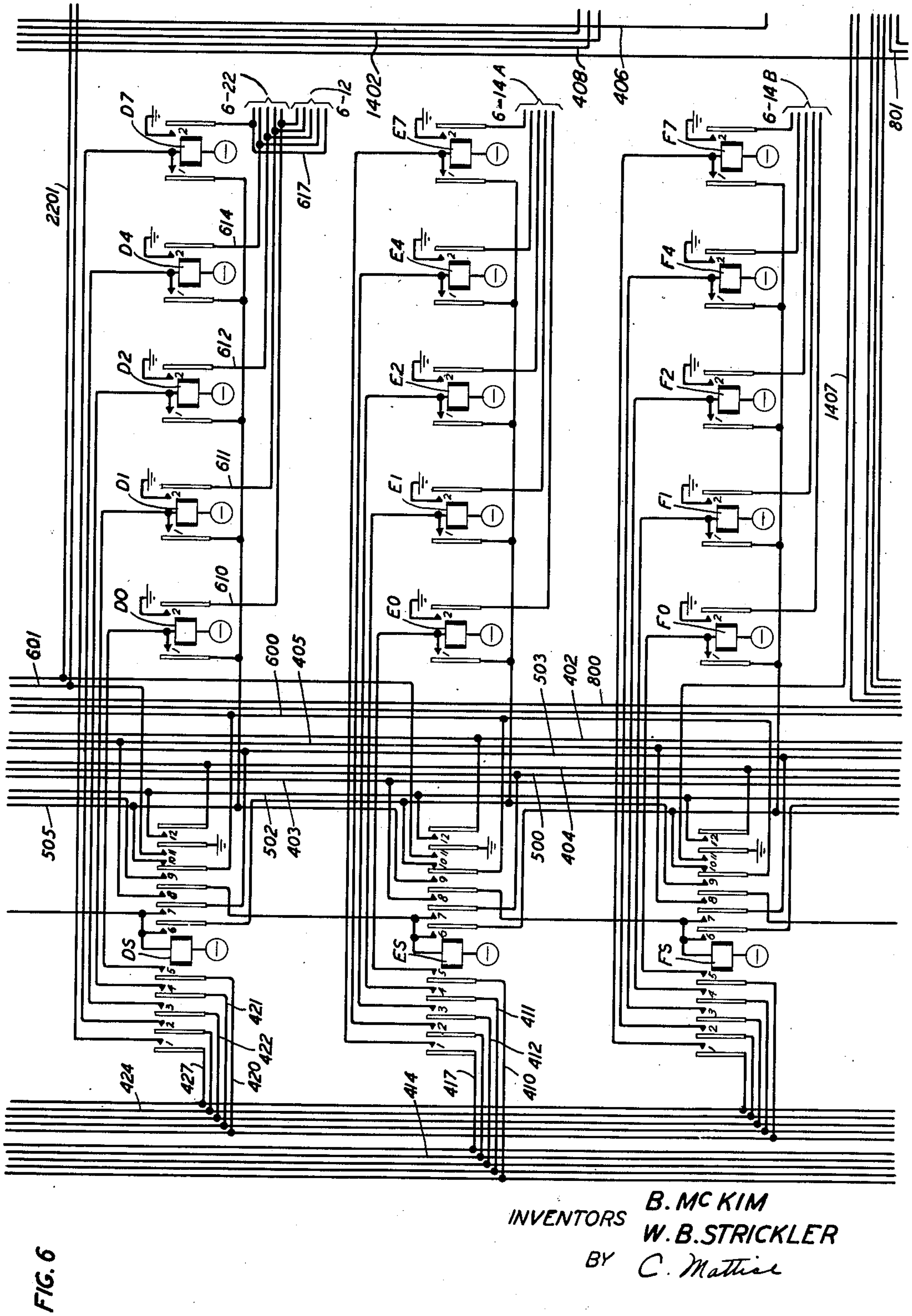

Relay MS(10) closes a circuit from ground over its contact 5, conductor 1026, contact 4 of relay TX(12) to battery through the winding of relay TXA(12). With relay TXA(12) operated, conductors 530 to 537, grounded by the C register of Fig. 5 are connected to conductors 1210 to 1217 leading to the A register of the marker, conductors 610 to 617, grounded by the D register of Fig. 6, are connected to conductors 1220 to 1227 leading to the B register of the marker and ground is connected over contacts 11 and 12 of relay TXA(12) to conductors 1234 and 1237 leading to the C register of the marker to register the digit zero thereon. Relay TX(12) also grounds conductor 1201 to inform the marker that this is a TX call.

The call is completed as a manual call.

What is claimed is:

1. In a telephone system, a first office, a plurality of other offices, each requiring the use of a different type of pulse, trunk circuits for connecting said first office with said other offices, means for selecting one of said trunk circuits, said trunk circuits requiring different time intervals after selection to prepare for transmitting pulses, a register sender, a plurality of pulse generating means in said sender corresponding to said required pulse types, a plurality of time measuring means in said sender corresponding to said required time intervals, means to connect said sender with said trunk selecting means, means in said sender operated by said trunk selecting means in accordance with a selected trunk to indicate the pulse type and the time interval required, means to connect said sender with the selected trunk, and means responsive to said connection to render the pulse generating means corresponding to said pulse type indication and the time measuring means corresponding to said time interval indication effective.

2. In a telephone system, a first office, a plurality of other offices, each requiring the use of a different type of pulse, trunk circuits for connecting said first office with said other offices, means for selecting one of said trunk circuits, said trunk circuits requiring different time intervals after selection to prepare for transmitting pulses, a register sender, a plurality of pulse generating means in said sender corresponding to said required pulse types, a plurality of time measuring means in said sender corresponding to said required time intervals, means to connect said sender with said trunk selecting means, means in said sender operated by said trunk selecting means in accordance with a selected trunk to indicate the pulse type required, the time interval required and the time of selecting said trunk, means responsive to said time of selecting indication to initiate the operation of said time measuring means, means to connect said sender with the selected trunk, means responsive to said connection to render the pulse generating means corresponding to said pulse type indication and the time measuring means corresponding to said time interval indication effective, and means responsive to the operation of said effective time measuring means to initiate the operation of said pulse generating means.

3. In a telephone system, a first office, a plurality of other offices, each requiring the use of a different type of pulse, trunk circuits for connecting said first office with said other offices, means for selecting one of said trunk circuits, said trunk circuits requiring different time intervals after selection to prepare for transmitting pulses, a register sender, a plurality of pulse generating means in said sender corresponding to said required pulse types, timing means, a plurality of means for stopping said timing means to measure a plurality of different time intervals, means to connect said sender with said trunk selecting means, means in said sender operated by said trunk selecting means in accordance with a selected trunk to indicate the pulse type required, the time interval required and the time of selection of said trunk, means responsive to said time of selection indication to initiate the operation of said timing means, means to connect said sender with the selected trunk, and means responsive to said connection to render the pulse generating means corresponding to said pulse type indication and the stopping means corresponding to said required time interval effective.

4. In a telephone system, a first office, a plurality of other offices, each requiring the use of a different type of pulse, trunk circuits for connecting said first office with said other offices, each trunk being either guarded or unguarded, means for selecting one of said trunk circuits, a register sender having a plurality of pulse generating means corresponding to said required pulse types and trunk guard timing means, a plurality of means for stopping said timing means to measure a plurality of different time intervals, means to connect said sender with said trunk selecting means, means in said sender operated by said trunk selecting means in accordance with the trunk circuit selected to indicate the pulse type required, whether said selected trunk is guarded or unguarded and the time of selecting said trunk, means responsive to said time of selecting indication to initiate the operation of said timing means, one of said stopping means normally effective to stop said timing means at the end of one predetermined interval in response to an indication that the trunk is guarded, another of said stopping means normally effective to stop said timing means after a predetermined longer interval in response to an indication that the trunk is unguarded, and means under the control of said pulse type indication to cause others of said stopping means to be effective to vary the interval measured by said timing means.

5. In a telephone system, a first office, a plurality of other offices, each requiring the use of a different type of pulse, trunk circuits for connecting said first office with said other offices, each trunk being either guarded or unguarded, means for selecting one of said trunk circuits, a register sender having a plurality of pulse generating means corresponding to said required pulse types and trunk guard timing means, a plurality of means for stopping said timing means to measure a plurality of different time intervals, means to connect said sender with said trunk selecting means, means in said sender operated by said trunk selecting means in accordance with the trunk circuit selected to indicate the pulse type required, whether said selected trunk is guarded or unguarded and the time of selecting said trunk, means responsive to said time of selecting indication to initiate the operation of said timing means, one of said stopping means normally effective to stop said timing means at the end of one predetermined interval in response to an indication that the trunk is guarded, another of said stopping means normally effective to stop said timing means after a predetermined longer interval in response to an indication that the trunk is unguarded, means under the control of said pulse type indication to cause others of said stopping means to be effective to vary the interval measured by said timing means, and means responsive to the stopping of said timing means to render said indicated pulse generating means effective.

6. In a telephone system, one office, automatic switches at said one office, a plurality of other offices also including switching apparatus, the apparatus at different offices being controlled by pulses of different characters, trunk circuits connecting said one office with each of said other offices, a register sender in said one office including means for registering telephone designations, means for generating pulses of said different characters and means for measuring a plurality of time intervals, a switch controlling marker in said one office, means for transmitting a portion of said registered designation to said marker, means in said marker operated in accordance with said portion of said registered designation to select one of said trunk circuits and to operate said automatic switches to connect said register sender with one of said other offices over said selected trunk circuit, means in said marker to transmit to said register sender an indication of the class of the selected trunk circuit and the time of its selection, means in said register sender operated in accordance with said class indication to select one of said pulse generating means and one of said time intervals, means responsive to said time of selection indication to start said time measuring means and means responsive to the completion of the selected time interval to render said selected pulse generating means effective.

7. In a telephone system, one office, automatic switches at said one office, a plurality of other offices also including switching apparatus, the apparatus at different offices being controlled by pulses of different characters, trunk circuits connecting said one office with each of said other offices, a register sender in said one office including means for registering telephone designations, means for generating pulses of said different characters and means for measuring a plurality of time intervals, a switch controlling marker in said one office, means for transmitting a portion of said registered designation to said marker, means in said marker operated in accordance with said portion of said registered designation to select one of said trunk circuits and to operate said automatic switches to connect said register sender with one of said other offices over said selected trunk circuit, means in said marker to transmit to said register sender an indication of the class of the selected trunk circuit, the time of selection of said trunk and the time of operation of said switches, means in said register sender operated in accordance with said class indication to select one of said pulse generating means and one of said time intervals, means responsive to said time of selection indication to start said time measuring means and means responsive to the completion of the selected time interval and said switch operation time indication to render said selected pulse generating means effective.

8. In a telephone system, a first toll office, trunks incoming to said toll office, register senders in said first toll office, means for connecting a register sender with one of said incoming trunks, switches at said toll office, other offices including a second toll office, local offices operated by dial pulses, and local offices operated by multifrequency pulses, outgoing trunks connecting said first toll office with each of said other offices, a switch controlling marker, means in said marker to select any one of said outgoing trunks, means under the control of said marker to operate said switches to set up telephone connections from said one incoming trunk to any one of said other offices including one of said outgoing trunks, means to mark a trunk unselectable while included in a connection, certain of said trunks being unguarded and having means to mark them selectable immediately following the termination of a connection thereover, others of said trunks being guarded and having means to delay marking them selectable until after a definite time following the termination of the connection thereover, means in said register sender for generating dial pulses, means in said register sender for generating multifrequency pulses, means to connect said marker with said sender, means in said marker to register the designation of a wanted one of said offices, means under the control of said recorded designation to control said trunk selecting means and to transmit to said sender an indication of the type of pulses required by said office, an indication of whether said trunk is guarded or unguarded, a trunk selected indication when said selecting means selects said trunk, and a marker release indication when said marker has operated said switches to connect said sender with said selected outgoing trunk by way of said incoming trunk, trunk guard timing means in said sender, means responsive to said trunk selected signal to start the operation of said trunk guard timing means, a supplementary timing means, means normally under the control of said trunk guarded indication and said marker release indication to start said supplementary timing means, means normally under the control of said trunk unguarded indication and said marker release indication to start said supplementary timing means only after a predetermined period of operation of said trunk guard timing means, means under the control of certain of said type of pulse indications to increase said period of operation of said trunk guard timing means, means also under the control of said type of pulse indication to select the corresponding pulse generating means, and means responsive to the operation of said supplementary timing means to initiate the operation of said selected pulse generating means.

9. In a telephone system, a first toll office, trunks incoming to said toll office, register senders in said first toll office, means for connecting a register sender with one of said incoming trunks, switches at said toll office, other offices including a second toll office, local offices operated by dial pulses, and local offices operated by multifrequency pulses, outgoing trunks connecting said first toll office with each of said other offices, a switch controlling marker, means in said marker to select any one of said outgoing trunks, means under the control of said marker to operate said switches to set up telephone connections from said one incoming trunk to any one of said other offices including one of said outgoing trunks, means to mark a trunk unselectable while included in a connection, certain of said trunks being unguarded and having means to mark them selectable immediately following the termination of a connection thereover, others of said trunks being guarded and having means to delay marking them selectable until after a definite time following the termination of the connection thereover, means in said register sender for generating dial pulses, means in said register sender for generating multifrequency pulses, means to connect said marker with said sender, means in said marker to register the designation of a wanted one of said offices, means under the control of said recorded designation to control said trunk selecting means and to transmit to said sender an indication of the type of pulses required by said office, an indication of whether said trunk is guarded or unguarded, a trunk selected indication when said selecting means selects said trunk, and a marker release indication when said marker has operated said switches to connect said sender with said selected outgoing trunk by way of said incoming trunk, trunk guard timing means in said sender, means responsive to said trunk selected signal to start the operation of said trunk guard timing means, a supplementary timing means, means normally under the control of said trunk guarded indication and said marker release indication to start said supplementary timing means, means normally under the control of said trunk unguarded indication and said marker release indication to start said supplementary timing means only after a predetermined period of operation of said trunk guard timing means, means responsive to a type of pulse indication requiring the use of multifrequency pulses to prevent the start of said supplementary timing means under the control of said trunk guarded indication means until after a different predetermined period of operation of said trunk guard timing means, means responsive to a type of pulse indication requiring the use of dial pulses to increase the period of operation of said trunk guard timing means under the control of said trunk unguarded indication for an additional period, means under the control of said type of pulse indication to select the corresponding pulse generating means, and means responsive to the operation of said supplementary timing means to initiate the operation of said selected pulse generating means.

BURTON McKIM.
WALTER B. STRICKLER.

REFERENCES CITED

The following references are of record in the file of this patent:

UNITED STATES PATENTS

| Number | Name | Date |
|---|---|---|
| 1,724,142 | Ostline | Aug. 13, 1929 |
| 2,467,490 | McClew | Apr. 19, 1949 |